United States Patent [19]

Hibi et al.

[11] Patent Number: 5,546,191
[45] Date of Patent: Aug. 13, 1996

[54] RECORDING AND REPRODUCING APPARATUS

[75] Inventors: Taketoshi Hibi; Kenji Maeno; Kihei Ido; Ken Onishi; Shinobu Ueda; Akiyoshi Hirano; Keiji Hatanaka; Takashi Shiroshita, all of Nagaokakyo, Japan

[73] Assignee: Mitsubishi Denki Kabushiki Kaisha, Tokyo, Japan

[21] Appl. No.: 20,593

[22] Filed: Feb. 22, 1993

[30] Foreign Application Priority Data

| Feb. 25, 1992 | [JP] | Japan | 4-037601 |
| Aug. 6, 1992 | [JP] | Japan | 4-232878 |
| Aug. 25, 1992 | [JP] | Japan | 4-225899 |
| Oct. 1, 1992 | [JP] | Japan | 4-289664 |

[51] Int. Cl.$^6$ .............. H04N 5/76; H04N 9/79; H04N 5/445

[52] U.S. Cl. ............. 358/335; 358/311; 348/564

[58] Field of Search ............... 358/335, 342, 358/310; 360/32; 348/563, 564, 565, 567, 568, 588, 589

[56] References Cited

U.S. PATENT DOCUMENTS

| 4,575,772 | 3/1986 | Shimada et al. | |
| 4,858,012 | 8/1989 | Hino et al. | 358/210 |
| 4,858,032 | 8/1989 | Okada et al. | |
| 4,905,077 | 2/1990 | Ishii | 348/564 |
| 4,908,713 | 3/1990 | Levine | 358/335 |
| 4,956,725 | 9/1990 | Kozuki et al. | |
| 4,977,455 | 12/1990 | Young | |
| 4,994,911 | 2/1991 | Nakayama et al. | |
| 5,040,067 | 8/1991 | Yamazaki | 348/565 |
| 5,050,003 | 9/1991 | Horii et al. | 358/342 |
| 5,225,946 | 7/1993 | Uchiumi | |

FOREIGN PATENT DOCUMENTS

| 0363653 | 4/1990 | European Pat. Off. |
| 0461649 | 12/1991 | European Pat. Off. |
| 0472806 | 3/1992 | European Pat. Off. |
| 0545727 | 6/1993 | European Pat. Off. |
| 62-183281 | 8/1987 | Japan . |
| 63-004478 | 1/1988 | Japan . |
| 63-102092 | 5/1988 | Japan . |
| 63-158984 | 7/1988 | Japan . |
| 63-221778 | 9/1988 | Japan . |
| 1-229483 | 9/1989 | Japan . |
| 2-035662 | 2/1990 | Japan . |
| 2-121143 | 5/1990 | Japan . |
| 2-189779 | 7/1990 | Japan . |
| 2-270185 | 11/1990 | Japan . |
| 3-217179 | 9/1991 | Japan . |
| 5-014845 | 1/1993 | Japan . |
| 5-037893 | 2/1993 | Japan . |

OTHER PUBLICATIONS

"Mitsubishi Video User's Manual" HV-V36.

*Primary Examiner*—Thai Q. Tran
*Assistant Examiner*—Robert Chevalier

[57] ABSTRACT

In program retrieval using a magnetic tape in which programs are classified by index signals recorded on the tape, an image at the beginning of each program is displayed in a list on a multi-screen, and a desired program is directly selected using a count value of index signals. In recording, an index signal is recorded at a starting point of recording. When preparing a multi-screen at the time of reproducing, an image reproduced a predetermined time after detection of an index signal is reduced and stored in a memory.

40 Claims, 41 Drawing Sheets

Fig. 5
Prior Art

| ADR. 1 | ADR. 2 | ADR. 3 |
|--------|--------|--------|
| ADR. 4 | ADR. 5 | ADR. 6 |
| ADR. 7 | ADR. 8 | ADR. 9 |

Fig. 7

| MODE | TAPE FORMAT | SWITCH CONDITION IN Fig. 6 | | | | | | FUNCTION |
|---|---|---|---|---|---|---|---|---|
| | | 45 | 46 | 47 | 48 | 49 | 50 | |
| M1 | F1 | a | a | | | | | ORDINAL RECORD |
| M2 | AUTOMATIC CHANGE-OVER OF F1 OR F2 | | | a | a | | | REPRODUCTION |
| M3 | — | | a | | | a | | WRITING OF VIDEO DATA IN MEMORY |
| M4 | — | a | | | | | a | WRITING OF AUDIO DATA IN MEMORY |
| M5 | — | a | a | | | a | a | WRITING OF VIDEO AND AUDIO DATA IN MEMORY |
| M6 | AUTOMATIC CHANGE-OVER OF F1 OR F2 | | | a | | b | | WRITING OF REPRODUCED VIDEO DATA IN MEMORY |
| M7 | AUTOMATIC CHANGE-OVER OF F1 OR F2 | | | | a | | b | WRITING OF REPRODUCED AUDIO DATA IN MEMORY |
| M8 | AUTOMATIC CHANGE-OVER OF F1 OR F2 | | | a | a | b | b | WRITING OF REPRODUCED VIDEO AND AUDIO DATA IN MEMORY |
| M9 | F2 | | b | | | | | RECORD OF VIDEO DATA ON TAPE |
| M10 | F2 | b | | | | | | RECORD OF AUDIO DATA ON TAPE |
| M11 | F2 | b | b | | | | | RECORD OF VIDEO AND AUDIO DATA ON TAPE |
| M12 | — | | | | b | | | REPRODUCTION OF VIDEO DATA IN MEMORY |
| M13 | — | | | b | | | | REPRODUCTION OF AUDIO DATA IN MEMORY |
| M14 | — | | | b | b | a | b | REPRODUCTION VIDEO AND AUDIO DATA IN MEMORY |

NOTE.
a : CONNECTION BETWEEN c AND a
b : CONNECTION BETWEEN c AND b
BLANK : OPTIONAL
F1 : PRIOR ART TAPE FORMAT
F2 : SECOND TAPE FORMAT
— : OPTIONAL

Fig. 12

| ADDRESS | | DATA | | |
|---|---|---|---|---|
| A6~A4 | A3~A0 | D15........D8 | D7........D0 | |
| 0 | 0 | HOUR (0~9) | | } PROGRAM No. 1 |
| | 1 | MINUTE (0~59) | SECOND (0~59) | |
| | 2 | HOUR (0~9) | | } PROGRAM No. 2 |
| | 3 | MINUTE (0~59) | SECOND (0~59) | |
| | ... | ... | ... | |
| | E | YEAR (0~9) | MONTH (1~12) | DAY (1~31) } RECORD DATE |
| | F | NUMBER OF PROGRAMS | TAPE No. | |

Fig. 13

| ADDRESS | | DATA | | | | |
|---|---|---|---|---|---|---|
| A6~A4 | A3~A0 | D15 ········ D8 | D7 ········ D0 | | | |
| 0 | 0 | HOUR (0~9) | SECOND (0~59) | MINUTE (0~59) | } PROGRAM No. 1 |
| | 1 | HOUR (0~9) | SECOND (0~59) | MINUTE (0~59) | } PROGRAM No. 2 |
| | 2 | HOUR (0~9) | SECOND (0~59) | MINUTE (0~59) | } PROGRAM No. 3 |
| | ······ | ······ | ······ | | |
| | E | YEAR (0~9) | MONTH (1~12) | DAY (1~31) | } RECORD DATE |
| | F | NUMBER OF PROGRAMS | | TAPE No. | |

Fig. 16(a)

```
        CASSETTE SELECTION SCREEN

CASSETTE No.   DATE       CLASS    CONTENT
                                   (CHARACTER DATA)

1         '92/1/15    SKI
    2         '92/2/11    TRAVEL   HAWAII
    3         '92/3/30    MOVIE    SHOGUN
    4         '92/7/7     PARTY
    5
    ▲
```

Fig. 25(a)

| | |
|---|---|
| 1 | 2 |
| 3 | 4 |

Fig. 25(b)

| | | |
|---|---|---|
| 1 | 2 | 3 |
| 4 | 5 | 6 |
| 7 | 8 | 9 |

Fig. 25(c)

| | | | |
|---|---|---|---|
| 1 | 2 | 3 | 4 |
| 5 | 6 | 7 | 8 |
| 9 | 10 | 11 | 12 |
| 13 | 14 | 15 | 16 |

Fig. 29(a)

| CASSETTE No. | NUMBER OF PROGRAMS |
|---|---|
| 1 START ADDRESS | NUMBER OF SUB INDEXES |
| 2 START ADDRESS | NUMBER OF SUB INDEXES |
| 3 START ADDRESS | NUMBER OF SUB INDEXES |
| 4 START ADDRESS | NUMBER OF SUB INDEXES |
| 5 START ADDRESS | NUMBER OF SUB INDEXES |
| 6 START ADDRESS | NUMBER OF SUB INDEXES |
| 7 START ADDRESS | NUMBER OF SUB INDEXES |
| 8 START ADDRESS | NUMBER OF SUB INDEXES |
| 9 START ADDRESS | NUMBER OF SUB INDEXES |
| 10 START ADDRESS | NUMBER OF SUB INDEXES |
| 11 START ADDRESS | NUMBER OF SUB INDEXES |
| 12 START ADDRESS | NUMBER OF SUB INDEXES |

Fig. 29(b)

| 18 | 7 |
|---|---|
| 1 0000 | 3 |
| 2 0500 | 2 |
| 3 1500 | 3 |
| 4 2500 | 5 |
| 5 4000 | 0 |
| 6 5000 | 2 |
| 7 5500 | 4 |
| 8 — | — |
| 9 — | — |

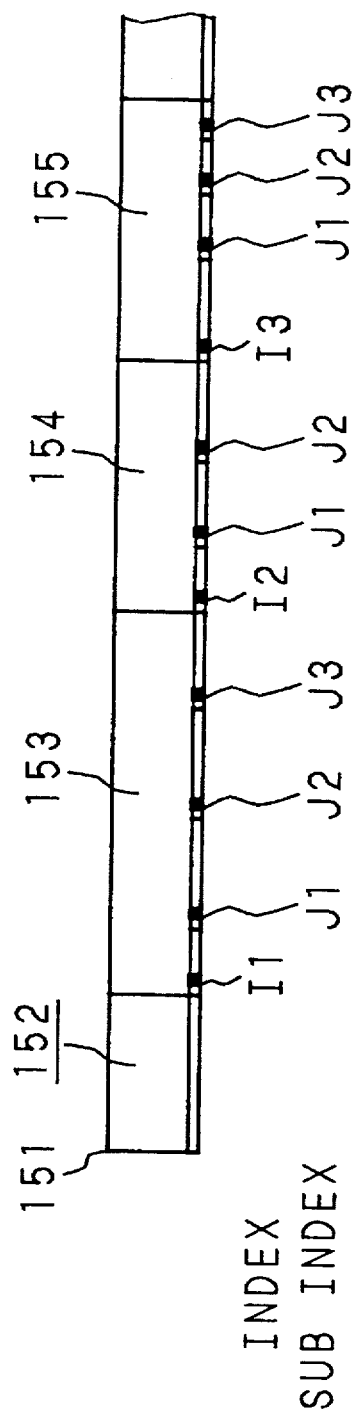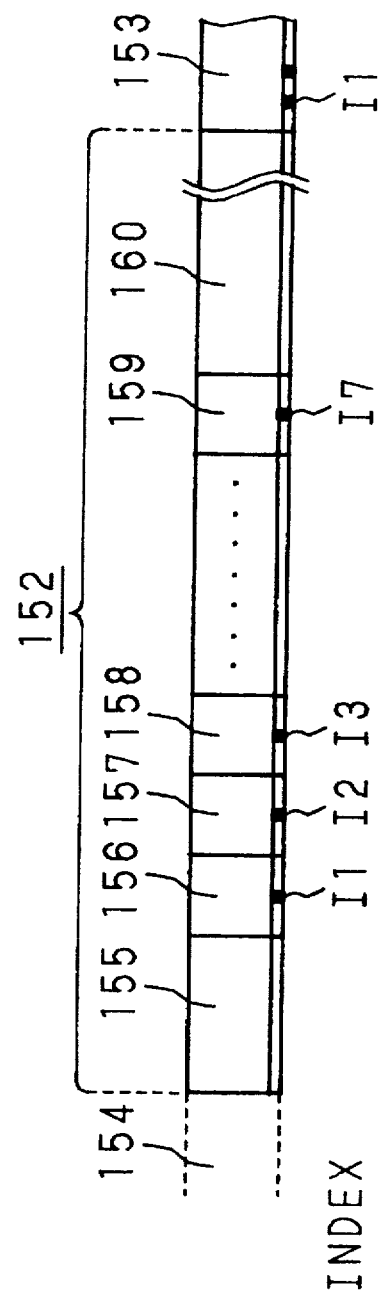

Fig. 33

| COLUMN↓ / ROW → | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 1 | | | | | | | | | T | I | T | L | E | | | | | | | |
| 2 | ▲ | | | | | ▲ | | | | | ▲ | | | | | ▲ | | | | |
| 3 | | 1 | | | | | 2 | | | | | 3 | | | | | 4 | | | |
| 4 | | | | | | | | | | | | | | | | | | | | |
| 5 | ▲ | | | | | ▲ | | | | | ▲ | | | | | ▲ | | | | |
| 6 | | 5 | | | | | 6 | | | | | 7 | | | | | 8 | | | |
| 7 | | | | | | | | | | | | | | | | | | | | |
| 8 | ▲ | | | | | ▲ | | | | | ▲ | | | | | ▲ | | | | |
| 9 | | 9 | | | | | 10 | | | | | 11 | | | | | 12 | | | |
| 10 | | | | | | | | | | | | | 1 1 | | | | | | | |
| 11 | | C | A | S | E | T | T | E | | N | o | . | | | | | 1 8 | | | |
| 12 | | | | | | | | | | | | | | | | | | | | |

```
               ROW   195
                →   /
              1 2 3 4 5 ···
COLUMN↓  1 | 1 | 2 | 3 | 4 | 5 |—196
         2 | 6 | 7 | 8 | 9 |   |
 194—    3 | C | A | S | S | E |
         4 | T | T | E |[ ]|   |—197
         5 | P | R | O | G | R |
         6 | A | M | ▶ | ▲ |   |—198
         7 | T | I | T | L | E |
         8 |┌┐ |┌┐ | T |┬  |   |
         ⋮              \
                         199
```

Fig. 35

| VIDEO RAM ADDRESS || CHARACTER CODE ||
|---|---|---|---|
| COLUMN | ROW | COLUMN | ROW |
| 1 | 9 | 7 | 1 |
| 1 | 10 | 7 | 2 |
| 1 | 11 | 7 | 3 |
| 1 | 12 | 7 | 4 |
| 1 | 13 | 7 | 5 |
| 2 | 1 | 6 | 3 |
| 2 | 3 | 1 | 1 |
| ⋮ | ⋮ | ⋮ | ⋮ |
| 2 | 1 | 4 | 4 |
| 2 | 6 | 6 | 3 |
| ⋮ | ⋮ | ⋮ | ⋮ |

201 (rows 1–7), 202 (last two rows)

5,546,191

RECORDING AND REPRODUCING APPARATUS

BACKGROUND OF THE INVENTION

1. Field of the Invention

The present invention relates to a digital recording and reproducing apparatus (digital VTR) for recording and reproducing video signals, audio signals and others.

2. Description of the Background Art

One known digital VTR is disclosed in Japanese Patent Application Laid-Open No. 3-217179 (1991), in which data associated with the recording contents stored on a tape are recorded in a start end part of the tape. Reference is made to FIG. 1 for explaining the record format of a magnetic tape and the arrangement of recording regions for various record signals throughout the magnetic tape, according to the above prior art. FIG. 1(a) shows the arrangement of recording signals stored within one track of the magnetic tape. One track is divided into several regions. Specifically, inward from the start end of the track are a video data region, audio data region, servo-pilot signal region and sub code region. The sub code region is further divided into several regions, that is, a region for data detection synchronization (SYNC), a region for-track numbers etc. (ID), a region for symbol and character data etc. (addition data) and a recording region (parity) for error-correcting codes. FIG. 1(b) shows the location of the recording regions for record signals in the entire tape. Specifically, (P1) through (Pn) denote recording regions for recording n-number of programs composed of video and audio signals, and (A1) through (An) denote recording regions for recording addition data for the above n-number of programs. The tape is also divided width-wise into a region (S1) for recording video and audio data and a region (S2) for recording addition data, and divided lengthwise into a region (A) for recording addition data collected from respective programs and an ordinary recording region. During reproducing, information on the recording contents is obtained, by obtaining addition data from the region (A).

As a prior art in which data for the recording contents of a tape are stored in a start end of the tape, the following analog VTR adopting the VHS method is known. In this prior art, by the use of an A/D converter, reproducing video signals for one screen are converted into digital data and stored in a memory, and when a plurality of screens are stored, those screens are all reduced in size so as to be stored and displayed in one screen (multi-screen). Then, such a multi-screen is recorded in the start end of the tape by insertion. In reproducing, the multi-screen thus recorded by insertion is reproduced in order to obtain information on the recording contents.

There is known still another prior art, of which idea can be easily imagined from the above two conventional examples. In a digital VTR according to this method, a part of the video and audio data of each program to be recorded on a tape is stored in the start end of the tape using the same format as that of the program.

Japanese Patent Application Laid-Open 3-217179 (1991) teaches a method as described above, and it has therefore disadvantages in that: only addition data are reproduced from the start end of the tape, but video data and audio data stored in the large part of the tape cannot be confirmed at all. In order to confirm the video and audio data, it is necessary to execute reproducing, after moving the tape based on the addition data until the position where the above data are recorded is reached. This is troublesome and requires much time. The prior art adopting the VHS method is also disadvantageous, because although video signals can be confirmed at the start end of the tape, it is hard to see screens since the size of a screen is reduced as the number of screens is increased. Another disadvantage of this method is that sound cannot be confirmed.

The method, in which a digital VTR records a part of data for each program in the start end of a tape with the same format as that of the record format used for each program, has the following problem. Generally, the contents of a video signal can be identified by reading one frame or one field, whilst the contents of an audio signal cannot be identified within the time (i.e., 1/30 second or 1/60 second), within which a video signal can be identified. In order to identify the contents of an audio signal, a couple of seconds or more are needed. It is desirable to take a time as short as possible to identify the data stored in the start end of the tape. If the recording time is set on condition that video signals can be identified, audio signals cannot be identified at all. On the other hand, if the recording time is set on condition that audio signals can be identified, much time will be wasted when identifying the contents of most video signals.

Referring to FIG. 2, a prior magnetic recording and reproducing apparatus will be hereinafter described.

In recent years, the number and contents of programs recorded by a magnetic recording and reproducing apparatus need to be written down on labels or the like, or memorized by the user. The following is a description of a method in which a program is retrieved by the use of a prior magnetic recording and reproducing apparatus. First, the operation at the time of recording will be explained. In recording, an index signal is recorded in the beginning of a program to be recorded, especially in a particular position which is intended to be retrieved when reproducing. Such an index signal is automatically recorded at the start of recording, or arbitrarily recorded at any time. In this case, the recording of an index signal is performed in such a way that the user inputs index signal recording data through an operation unit 51. The operation data from the operation unit 51 are entered in a control unit 52 and then the control unit 52 controls a CTL signal processor 53. The CTL signal processor 53 records an index signal for several seconds, the index signal being obtained by changing the duty ratio of a CTL signal (a control signal for the beginning of each program). Accordingly, one tape can be divided for storing a plurality of programs by the use of index signals.

Next, the retrieval operation will be explained. The user retrieves a program by operating index retrieval keys on the operation unit 51, the index retrieval keys consisting of a key for retrieving in the forward direction and one for retrieving in the backward direction. When depressing the forward index retrieval key for example, input data are sent through the operation unit 51 to the control unit 52 and the control unit 52 controls a running control unit 55 through a motor drive servo circuit 54, whereby the tape is rapidly traversed. The CTL signal reproduced at that time is supplied to an index discriminating circuit 56, and upon finding of an index signal, an index discovery signal is sent to the control unit 52. Upon receipt of the index discovery signal, the control unit 52 controls the motor drive servo circuit 54 and a reproducing circuit 58 as follows. After the motor drive servo circuit 54 has allowed the running control unit 55 to stop the rapid traverse and to rewind the tape up to the position where an index signal is stored, the apparatus is set in "reproducing" mode. When the apparatus is in "reproducing" mode, the reproducing circuit 58 amplifies the signal reproduced from a head and changes it back to the original video signal to release as an output. An image is produced on a TV receiver 64 based on the video signal, thereby completing the data retrieval. If the user depresses two times the index retrieval key on the operation unit 51 for example, the retrieval operation will be performed until two index signals are found. The index search in the backward direction can be performed in a similar fashion. In this case, the retrieval is performed in the direction that the tape is rewound.

Besides the above-described method, the following retrieval methods are known. In one known method, the duty ratio of a CTL signal is precisely controlled and set to be address data, and the location of each program is represented by an absolute address. In data retrieval, the program can be directly retrieved by inputting the address data by the user. Another method is such that a CTL signal is precisely controlled and set to be linear time counter data, and a recording time is recorded on the tape. In data retrieval, the user inputs a counter value of the beginning of a program, whereby the program can be directly retrieved.

Because the conventional magnetic recording and reproducing apparatus are designed as described above, they have the following disadvantages: in order to retrieve a desired program the user has to employ a troublesome procedure in that the contents of a magnetic tape must be previously memorized or written down on labels, and then the desired program is retrieved with the help of the user's memory or by referring to the labels.

In the case of the arrangement in which a program can be directly selected, an encoder and a decoder are required for dealing with address data for precisely controlling the duty ratio of a CTL signal or linear time counter data. This increases not only the scale of the circuit but also the production cost.

In recent years, apparatus for recording and reproducing video signals such as video tape recorders have been extensively used in broadcasting stations as well as for amateur use in the home. Most families use a number of cassette tapes which are a recording medium for such apparatus. Therefore, there has been a growing demand for a method and apparatus in which the recording contents of a cassette tape be easily confirmed and data retrieval can readily performed. A magnetic recording and reproducing apparatus, in which a multi-screen is prepared from video signals for the purpose of performing confirmation of the recording contents and data retrieval, is disclosed in Japanese Application Laid-Open 63-4478 (1988). The structure and operation of this apparatus will be described below.

FIG. 3 shows a block diagram of the aforesaid magnetic recording and reproducing apparatus. Firstly, in recording, an address is set by an operation unit 71 at a tape position which is intended to be detected at the start of recording or especially in reproducing, and a driving switch is turned. The switch data and address data entered through the operation unit 71 are supplied to a control unit 72, and then, the control unit 72 releases an output of conversion data to a control record signal processor 74 according to the address data The control record signal processor 74 records a control record signal on a magnetic tape in compliance with the conversion data from the control unit 72.

Thereafter, a high-speed search button on the operation unit 71 is depressed. The output of the button data from the operation unit 71 is entered in the control unit 72 and the control unit 72 sends a command to a motor drive servo circuit 76 in order to bring a running control unit 77 into its high-speed running state. The running control unit 77 starts high-speed running, being in a sub-loading condition. In the course of the high-speed running, a control signal duty discriminating circuit 73 amplifies a reproduced control signal, shapes its waveform and discriminates the duty ratio.

If address data recorded on the magnetic tape are found, they are supplied to the control unit 72. After having been supplied with the address data, the control unit 72 sends a command to the motor drive servo circuit 76 and to a reproducing circuit 75 in order to bring the running control unit 77 into its reproducing state. After the running control unit 77 has been brought into the reproducing state, the motor drive servo circuit 76 controls a motor such as a capstan motor or a cylinder motor in accordance with a reproducing control signal. In the reproducing circuit 75, a reproduced signal from the head is amplified and changed back to the original video signal. The video signal thus obtained is released to a memory circuit 79. After image data have been released, the control unit 72 sends a command to a memory control circuit 80 so that the memory control circuit 80 controls the memory circuit 79 to store the image data and the address data. In compliance with the command from the control unit 72, the memory control circuit 80 controls the memory circuit 79 so as to thin the video data and the address data and to store them at a part thereof. After the data have been reproduced for a certain period of time, the running control unit 77 is set in the high-speed running state again.

The above operation is repeated several times, thereby storing in the memory circuit 79 image data recorded in several positions whose address data are stored. The control unit 72 detects whether one field or one frame of the memory circuit 79 is fully filled with data, or whether the magnetic tape is completed. After the detection, the control unit 72 sends a command to the motor drive servo circuit 76 so as to go back to the start end of the tape. After the start end of the magnetic tape has been regained, the running control unit 77 is set in the recording state.

The contents of data in the memory circuit 79 are recorded on the magnetic tape, by connecting the memory circuit 79 to the recording circuit 82 by means of a record signal change-over switch 84 and by connecting the recording circuit 82 to the head by means of a recording/reproducing change-over switch 83. When retrieving the tape position, the start end of the magnetic tape is stored in the memory at the same time that an image is formed on a TV receiver 78 based on the reproducing video signal, and after the address of the next tape position to be retrieved has been set based on the image data and address data, high-speed running is executed. The control unit 72 allows the running control unit 77 to be in the reproducing state when the set address becomes coincident with the address data recorded on the magnetic tape. After the running control unit 77 has been set in the reproducing state, a reproducing signal change-over switch 81 is turned so that an image based on the video signal from the reproducing circuit 75 is formed on the TV receiver 78. When performing tape position retrieval again, the reproducing signal change-over switch 81 is turned, an image based on the video signal from the memory circuit 79 is formed on the TV receiver 78, an address setting for the tape position retrieval is executed, and high-speed running is executed. The tape position retrieval is thus performed with the above-described procedure.

According to the above prior magnetic recording and reproducing apparatus, index signals are manually additionally recorded on a magnetic tape in which programs have been already recorded, and video signals from positions where index signals have been recorded are reproduced for preparing a multi-screen. Therefore, in order to prepare a multi-screen, the user has to preliminarily record individual index signals, while consulting reproduced image signals for confirmation. This makes the operation very troublesome and time-consuming. According to the other known method, indexes are automatically recorded at the start of recording and data in the positions where the indexes have been recorded are successively reproduced for preparing a multi-screen. In such a method, when timer recording is performed, the positions where an index is to be recorded mostly include commercials, because commercials are generally put on the air before and after a program. As a result, the most of the screens in the multi-screen depict commercials which are not suitable for program retrieval.

There is a method for performing retrieval with the recording contents on a cassette tape being displayed, wherein images at indexed positions of a medium in which video signals have been recorded are stored in the memory and then the images thus stored in the memory are displayed on a monitor screen and used for retrieval. One example is disclosed in Japanese Patent Application Laid-Open No. 63-102092 (1988). The method disclosed in the above publication will be explained below.

FIG. 4 is a block diagram of the aforesaid prior magnetic recording and reproducing apparatus. In recording, a program search signal driving switch provided on an operation unit 101 is turned at a position which is intended to be detected at the start of recording or particularly in reproducing. The switch data entered through the operation unit 101 are supplied to a control unit 102 and the control unit 102 sends a program search signal write-in command to a control record signal processor 104. In accordance with the command, the control record signal processor 104 records, on a magnetic tape, a control record signal whose duty ratio has been changed.

During reproduction, a high-speed search button on the operation unit 101 is depressed and a counter 112 is reset at that time. After being provided with the switch data from the operation unit 101, the control unit 102 sends a command to a motor drive servo circuit 106 in order to set the running control unit 107 in its high-speed running state. The running control unit 107 starts high-speed running while being in a sub-loading condition. In the course of the high-speed running, a control signal duty discriminating circuit 103 amplifies a reproduced control signal shapes its waveform and discriminates the duty ratio. When a program search signal is detected, the control signal duty discriminating circuit 103 releases a signal to the control unit 102 indicating whether a program search signal is present or absent.

The control unit 102 receives the data as to the presence/absence of a program search signal If a program search signal is present, the control unit 102 stores a tape count value at that time from the counter 112 and sends a command to the motor drive servo circuit 106 and a reproducing circuit 105 in order to bring the running control unit 107 into its reproducing state. After the running control unit 107 has been set in the reproducing state, a reproducing signal change-over switch 111 is connected to the side of the reproducing circuit 105 and the motor drive servo circuit 106 controls, in accordance with a reproduced control signal, a motor such as a capstan motor or cylinder motor. The reproducing circuit 105 amplifies the reproduced signal from the head and changes it back to the original video signal in order to supply it to a memory circuit 109. After video data has been released, the control unit 102 sends a command to a memory control circuit 110 so as to supply the video data and address data to the memory circuit 109. The memory control circuit 110 controls the memory circuit 109 in compliance with the command from the control unit 102 such that the memory circuit 109 stores, in a part thereof, a reduced image of a large screen to be reproduced at the time of reproducing.

FIG. 5 is a diagram showing a display pattern of a TV receiver. The reduced image is stored in a part of the memory circuit 109, that is, the left top part indicated by ADR.1. After the writing of the data in the memory circuit 109 has been completed, the running control unit 107 is set in its high-running state again, and the reproducing signal change-over switch 111 is connected to the side of the memory circuit 109.

The above operation is repeatedly performed several times so that the reduced images of large screens to be reproduced at the time of reproducing are successively stored in a part of the memory circuit 109, the part being divided into an N-number of regions. Each time a reduced image is stored, a tape count value from the counter 112 is stored in the control unit 102. The control unit 102 detects whether the memory circuit 109 is fully filled with data or whether the magnetic tape is completed. After the detection, the control unit 102 sends a command to the motor drive servo circuit 106 so as to stop the running of the magnetic tape. At that time, the reproducing signal change-over switch 111 is connected to the side of the memory circuit 109 and images based on picture signals from the memory circuit 109 are formed on a TV receiver 108 as shown in FIG. 5.

In retrieving a tape position, the user specifies a tape position by depressing a corresponding ADR number switch on the operation unit 101, viewing images which have been formed on the TV receiver 108 based on the data from the memory circuit 109. Based on the switch data from the operation unit 101 and the tape count value stored in the control unit 102, the tape position is retrieved. When the apparatus is in "reproducing" mode, the switch 111 is turned so that an image based on a signal from the reproducing circuit is formed on the TV receiver 108. If tape position retrieval is again performed, the switch 111 is turned so that images based on the signals from the memory circuit 109 as shown in FIG. 5 are formed on the TV receiver 108. Then, an ADR number on the screen is read and this number is specified through the operation unit 101 for the next retrieval.

Because the prior magnetic recording and reproducing apparatus is designed as described above, the actual retrieval operation is inconvenient and time-consuming, that is, reading of an address number composed of one to five digits from the screen, and input operation of entering this number through the operation means. When the number of small screens on the multi-screen is increased, the operation becomes even more inconvenient. For example, when the number of small screens is 16, an address number composed of at least two digits needs to be read from the screen and input by means of the operation unit 101. Furthermore, since a screen becomes small in size, with an address number composed of an increased number of digits, a large part of the image is obscured because the image is behind the address number. Another known method is that operation buttons corresponding to respective small screens on the multi-screen are employed for specifying a desired image on the multi-screen. However, this method also has the following disadvantages: (i) the provision of such buttons increases the production cost; and (ii) in a case where there are a large number of small screens, the number of buttons increases as a matter of course, and therefore it becomes difficult for a user to operate the buttons corresponding to the screens.

SUMMARY OF THE INVENTION

One of the objects of the invention is therefore to provide a recording and reproducing apparatus capable of preparing a program list composed of images and sounds, even when prolonged recording is performed, by effectively storing confirmable video data and audio data which represent a characteristic feature of each program, at the start end part of a tape together with addition data.

Another object of the invention is to provide a recording and reproducing apparatus whose circuit is small in scale and which has the capability of directly selecting a program.

A further object of the invention is to provide a recording and reproducing apparatus capable of automatically preparing a multi-screen used for confirmation of the contents and retrieval, without much time and trouble. Such a multi-screen includes programs which have been already recorded as well as programs being recorded. Further, the multi-screen can be prepared in timer recording.

Still another object of the invention is to provide a recording and reproducing apparatus with which while keeping his eyes on a TV screen to see characters or codes superposed on image data used for retrieval, the user can readily retrieve and reproduce a desired recording position by easy button operation. The desired recording position corresponds to an image displayed behind the superposed characters.

According to a first embodiment form of the invention, there is provided a recording and reproducing apparatus having: (1) means for executing recording, changing from a first format that is a normal record format to a second format that differs from the first format in the proportion of audio data (or addition data) to video data, or vice versa; (2) a signal generation circuit for discriminating between the first format and the second format; and (3) a format detection circuit for discriminating between the first format and the second format based on a reproduced signal.

In the first embodiment of a recording and reproducing apparatus, a feature of the video and audio signals of each program stored in a first format region of a tape is stored in the second format in a region just after the start end of the tape, together with symbol data or character data, whereby a summary of each program stored in the first format region can be obtained within a short time.

According to a second embodiment form of the invention, there is provided a recording and reproducing apparatus having: (1) index signal recording means for recording, in recording operation, an index signal in the beginning of each program; (2) means for identifying the location of each recorded program from a reference position of the tape; (3) means for reducing the size of one screen taken from the beginning of each program to display in a list on a multi-screen which is a screen divided into several regions; (4) means for selecting one of the programs displayed on the multi-screen; (5) means for identifying the location of the reference position; and (6) means for counting index signals, wherein the program which has been selected from the list displayed on the multi-screen is automatically retrieved by counting the number of index signals from the reference position.

In the second embodiment of the recording and reproducing apparatus, the contents of each program are displayed in a list, using a multi-screen, and a desired program is retrieved by selecting one of the programs displayed on the multi-screen, whereby its operability can be improved. Further, the scale of the retrieving circuit can be minimized since the retrieval is carried out using index signals. This contributes to saving production costs.

According to a third embodiment of the invention, there is provided a recording and reproducing apparatus having means for determining whether the running direction of a tape is forward or backward, in addition to all the means described in the second recording and reproducing apparatus, of a presently accessed program from the reference position is identified.

In the third embodiment recording and reproducing apparatus, once a multi-screen is prepared, the location of a presently accessed program on the tape can be identified, so that retrieval can be performed any number of times at any program location on the tape. This contributes to an improvement in the operability.

According to a fourth embodiment of the invention, there is provided a recording and reproducing apparatus having: (1) linear time counter display means for displaying a recording time and reproducing time by counting the number of CTL signals; (2) index signal recording means for recording, in recording operation, an index signal in the beginning of each program; (3) means for storing, in retrieval operation, a linear time counter value, the value being obtained by counting starting from a reference position on a tape to the beginning of each program; (4) means for reducing the size of one screen taken from the beginning of each program to display in a list on a multi-screen which is a screen divided into several regions; (5) means for selecting one of the programs displayed on the multi-screen; and (6) means for identifying the location of the reference position, which has been selected from the programs displayed on the multi-screen is automatically retrieved using its linear time counter value obtained by counting started from the reference position and the stored linear time counter value for the beginning of each program.

In the fourth embodiment of the recording and reproducing apparatus, the contents of each program are displayed in a list, using a multi-screen, and a desired program is retrieved by selecting one of the programs displayed on the multi-screen, whereby its operability can be improved. Further, the retrieval is performed using the linear time counter for counting the number of CTL signals, which ensures high-accuracy retrieval operation. Values obtained by the linear time counter for counting the number of CTL signals are used for the retrieval so that the scale of the retrieving circuit can be minimized and production costs saved.

According to a fifth embodiment of the invention, there is provided a recording and reproducing apparatus having: (1) linear time counter display means for displaying a recording time and reproducing time by counting the number of CTL signals; (2) index signal recording means for recording, in recording operation, an index signal in the beginning of each program; (3) means for storing, in retrieval operation, a linear time counter value, the value being obtained by counting started from a reference position on a tape to the beginning of each program; (4) means for reducing the size of one screen taken from the beginning of each program to display in a list on a multi-screen (which is a screen divided into several regions); (5) means for selecting one of the programs displayed on the multi-screen; and (6) means for identifying the location of the reference position, which has been selected from the programs displayed on the multi-screen is automatically retrieved up to the vicinity of the beginning part thereof, using the linear time counter value obtained by counting from the reference position and the stored linear time counter value for the beginning of each program, and thereafter, the index signal of the selected program is detected, whereby retrieval is automatically performed.

In the fifth embodiment of the recording and reproducing apparatus, the contents of each program are displayed in a list, using a multi-screen, and a desired program is retrieved by selecting one of the programs displayed on the multi-screen, whereby operability can be improved. Further, the program is first retrieved up to its vicinity and then the program is searched using the index signal, whereby the deviation of the linear time counter caused by skipped-reading of index signals and skipped-reading of CTL signals at the time of high-speed retrieval gives little influence upon the operation so that high-accuracy retrieval can be achieved. Furthermore, retrieval is performed up to the vicinity of the beginning of each program so that the memory of the means for storing counter values can be saved. Further, the retrieval is performed utilizing the values of the linear time counter for counting index signals and CTL signals, which allows the scale of the retrieving circuit to be minimized and enables cost reduction.

According to a sixth embodiment of the invention, there is provided a recording and reproducing apparatus having: (1) memory means for storing one field or one frame of video data; (2) memory control means for thinning the video data to be written in a part of the memory, thereby preparing a multi-screen containing a plurality of video data items; and (3) control means for performing a continuous running for a predetermined time after detection of the index signal at the time of reproducing operation or high-speed running, and then reproducing the video data to store in the memory.

In the sixth embodiment of the recording and reproducing apparatus, in the case where a cassette tape in which a plurality of programs have been recorded by timer recording and each program has an index at the starting part thereof is reproduced in order to prepare a multi-screen, an image is reproduced from a tape position which is located a certain time after the index to store in the memory, whereby it is possible to prepare a multi-screen which does not include commercials which are generally on the air just before the start of a program. This eliminates the need for index input operation for preparing a multi-screen, thereby facilitating the editing and retrieval of programs in the cassette tape.

According to a seventh embodiment of the invention, there is provided a recording and reproducing apparatus having: (1) memory means for storing one field or one frame of video data; (2) memory control means for thinning the video data to be written in a part of the memory, thereby preparing a multi-screen containing a plurality of video data items; and (3) control means for automatically performing recording of an index and/or storing of a video signal in the memory, when audio mode is switched to a specified one of audio modes including stereo, monophonic and bilingual modes.

A comparatively long program such as a cinema film is generally interrupted several times by commercials and it often happens that a cinema film and a commercial film are set in different audio modes, for example, the former is in bilingual mode whilst the latter is in "stereo" mode. In the case where such a long program is recorded by timer recording according to the seventh embodiment of the reproducing apparatus, an index is recorded when the mode is changed to a specified audio mode (in the above example, the mode is changed to bilingual mode). When preparing a multi-screen according to the seventh embodiment the image at the position where the index signal has been recorded is reproduced. With the above arrangement, the image at the starting part of a program can be accurately put in the multi-screen. It is also possible to execute recording of indexes and preparation of a multi-screen at the same time that timer recording is performed. This is convenient, since if data stored in the image memory is kept, the multi-screen can be readily displayed, being read from the memory. In this case, the multi-screen is prepared using record signals so that video signals do not deteriorate compared with the case where a multi-screen is prepared from reproducing signals. This boosts signal clarity and makes the screen easier to watch.

According to an eighth embodiment of the invention, there is provided a recording and reproducing apparatus having: (1) memory means for storing one field or one frame of video data; (2) memory control means for thinning the video data to be written in a part of the memory, thereby preparing a multi-screen containing a plurality of video data items; and (3) control means for obtaining a correlation between the data stored in the memory and the data of a video signal to be recorded or reproduced, and performing recording of an index and/or storing of the video signal in the memory when the correlation is not more than a specified value.

In the eighth embodiment of the recording and reproducing apparatus, when performing recording or reproducing, a time correlation of video signals is obtained and if the correlation value is not more than a specified value, an index is recorded and/or the video signal is written in a multi-screen, judging that the contents of the signal are considerably changed, whereby a multi-screen contains an image at a turning position at which the scene of a film is changed or an image at a position where one shot taken by a video camera is linked to another. This contributes to the accurate recognition of the contents of records and easy editing operation.

According to a ninth embodiment of the invention, there is provided a recording and reproducing apparatus having: (1) memory means for storing one field or one frame of video data; (2) memory control means for thinning the video data to be written in a part of the memory, thereby preparing a multi-screen containing a plurality of video data items; and (3) control means for performing recording of an index and/or storing of a video signal in the memory each time a specified time elapses, the specified time being obtained from dividing the time required for timer recording by a number which is not more than the number of small screens contained in the multi-screen.

In the ninth embodiment of the recording and reproducing apparatus, when performing timer recording, all small screens on a given multi-screen are used for retrieval operation. Specifically, in the case where the multi-screen includes 12 small screens and the time required for timer recording is one hour for example, one hour is divided by 12 and a screen is written in the multi-screen every 5 minutes. Therefore, the contents of a program appointed for timer recording are displayed using all small screens contained in the multi-screen. Accordingly, the number of screens taken from the program is increased, which facilitates the retrieval operation.

According to a tenth embodiment of the invention, there is provided a recording and reproducing apparatus having: (1) memory means for storing one field or one frame of video data; (2) memory control means for thinning the video data to be written in a part of the memory, thereby preparing a multi-screen containing a plurality of video data items; and (3) control means for performing recording of an index and/or storing of a video signal in the memory each time a specified time elapses, the specified time being obtained from approximately dividing the recording time of a program which has been already recorded, by the number of screens contained in the multi-screen.

In the tenth embodiment of the recording and reproducing apparatus, all small screens on a given multi-screen are used for retrieving a recorded program. Specifically, in the case where the multi-screen includes 12 small screens and the recording time of the program is one hour for example, one hour is divided by 12 and a screen is written in the multi-screen every 5 minutes. Therefore, the contents of the program which has been already recorded are displayed using all small screens contained in the multi-screen. Accordingly, the number of screens taken from the program is increased, which facilitates the retrieval operation.

According to an eleventh embodiment of the invention, there is provided a recording and reproducing apparatus having: (1) memory means for storing one field or one frame of video data; (2) memory control means for thinning the video data to be written in a part of the memory, thereby preparing a multi-screen containing a plurality of video data items; and (3) control means for setting the number of small screens on the multi-screen to be no less than a value which is obtained by subtracting a specified time value from the time required for timer recording, and performing recording of an index and/or storing of a video signal in the memory each time the specified time elapses.

In the eleventh embodiment of the recording and reproducing apparatus, the number of screens on the multi-screen is altered according to the recording time, in the case where a screen is taken from a program appointed for timer recording and written in the multi-screen each time a specified time elapses. This arrangement has an advantage over the case where a multi-screen contains a fixed number of screens. Specifically, when the recording time is long, the number of screens on the multi-screen is increased so that shortage of screens can be avoided. On the other hand, when the recording time is short, the number of screens on the multi-screen is reduced so that each reduced image displayed on a small screen is made comparatively larger, which facilitates the confirmation of the recording contents and the retrieval of data.

According to a twelfth embodiment of the invention, there is provided a recording and reproducing apparatus having: (1) memory means for storing one field or one frame of video data; (2) memory control means for thinning the video data to be written in a part of the memory, thereby preparing a multi-screen containing a plurality of video data items; and (3) control means for setting the number of small screens on the multi-screen to be no less than a value which is obtained by subtracting a specified time value from the recording time of a program which has been already recorded, and performing recording of an index and/or storing of a video signal in the memory each time the specified time elapses.

In the twelfth embodiment of the recording and reproducing apparatus, the number of screens on the multi-screen is altered according to the time used for recording a program, in the case where a screen is taken from the program which has been already recorded and written in the multi-screen each time a specified time elapses. This arrangement has an advantage over the case where a multi-screen contains a fixed number of screens. Specifically, when the recording time is long, the number of screens on the multi-screen is increased so that shortage of screens can be avoided. On the other hand, when the recording time is short, the number of screens on the multi-screen is reduced so that each reduced image displayed on a small screen is made comparatively larger, which facilitates the confirmation of the recording contents and the retrieval of data.

In the sixth to twelfth embodiments of the recording and reproducing apparatus, a timer recording function is further included and upon completion of a timer recording, a specified control means is operated and then the power source is turned off.

This arrangement allows a specified means to prepare a multi-screen from a program which has been recorded, during an idle time after completion of timer recording, so that if the contents of the memory is kept, the multi-screen can be readily utilized when the apparatus is operated later on. In prior apparatus, the power source is turned off in such an idle time. The above arrangement is particularly advantageous in view of time saving when a multi-screen is prepared from a program appointed for timer recording and a program which has been already recorded, and when the multi-screen has a large number of screens.

According to a thirteenth embodiment of the invention, there is provided a recording and reproducing apparatus having: (1) recording and reproducing means for video signals; (2) recording and reproducing means for indexes; (3) a field memory or a frame memory; (4) a data memory; (5) character generating and displaying means; (6) a microcomputer for controlling etc., characterized by control means for performing, based on positional data of characters superposed on a video signal on a screen, a specified operation on the recording position of the video signal.

According to a fourteenth embodiment of the invention, there is provided a recording and reproducing apparatus having: (1) recording and reproducing means for video signals; (2) recording and reproducing means for indexes; (3) a field memory or a frame memory; (4) multi-screen preparing means; (5) data memory; (6) character generating and displaying means; (7) a microcomputer for controlling etc., characterized by control means for performing, based on positional data of characters superposed on a video signal in a small screen of a multi-screen, a specified operation on the recording position of a video signal which corresponds to the small screen.

In the thirteenth and fourteenth embodiment of the recording and reproducing apparatus, when recording video signals (hereinafter referred to as "program") composing a program such as a TV program, an index used for program retrieval is recorded at the start of the program recording, and indices (hereinafter referred to as "sub-index") used for retrieval of scenes are recorded in the program. The position of the index and the number of sub-indices are stored in the data memory. When preparing a reduced image used for retrieval, the image at the recording position of the index is stored in the memory and recorded at the start end of the tape. In the case where there are a plurality of indices, a plurality of images corresponding to those indices are recorded at the start end of the tape. When performing retrieval, the start end of the tape is reproduced and reproduced images are stored in the memory, while being displayed on the screen. The data stored in the data memory are displayed in characters, being superposed on the respective reproduced images. When a screen corresponding to one index is displayed, characters, the number of which is the same as the number of sub-indexes in the program, are displayed in a line. One of the characters is selected by a movable button, thereby performing retrieval and reproducing. When images at a plurality of indexed positions are reduced and combined in a multi-screen, the small screens of the multi-screen respectively have a character displayed thereon. One of the small screens is selected by moving the corresponding character with the movable button, whereby a desired program can be retrieved and reproduced. Accordingly, the user can retrieve a desired program easily only by operating a movable button for characters, while watching the screen. In the case where there are a number of indices, or where there are sub-indices, the same effects can be achieved by the same operation, so that there is no need to increase the number of buttons or the number of digits contained in an address number like the prior apparatus.

The present invention will become more fully understood from the detailed description given hereinbelow and the accompanying drawings which are given by way of illustration only, and thus are not limitative of the present invention.

BRIEF DESCRIPTION OF THE DRAWINGS

FIG. 5 is a diagram showing a display pattern of a prior TV receiver;

FIG. 7 is a table showing the relation between the mode, tape format and switch condition of the recording and reproducing apparatus shown in FIG. 6;

FIG. 12 is a diagram showing one example of the stored contents in a linear time counter memory;

FIG. 13 is a diagram showing another example of the stored contents in the linear time counter memory;

FIG. 16(a) is a diagram showing a screen;

FIG. 25(a) is a diagram showing a multi-screen;

FIG. 25(b) is a diagram showing a multi-screen;

FIG. 25(c) is a diagram showing a multi-screen;

FIG. 29(a) is a diagram showing the stored content in a data memory;

FIG. 29(b) is a diagram showing the stored content in a data memory;

FIG. 31(a) is a diagram of a recording pattern;

FIG. 31(b) is a diagram of a recording pattern;

FIG. 33 is a diagram showing the data structure of the video RAM shown in FIG. 32;

FIG. 34 is a diagram showing the data structure of the character ROM shown in FIG. 32;

FIG. 35 is a diagram showing one example of a serial data of the control unit shown in FIG. 28;

DESCRIPTION OF THE PREFERRED EMBODIMENTS

Figure 1A:
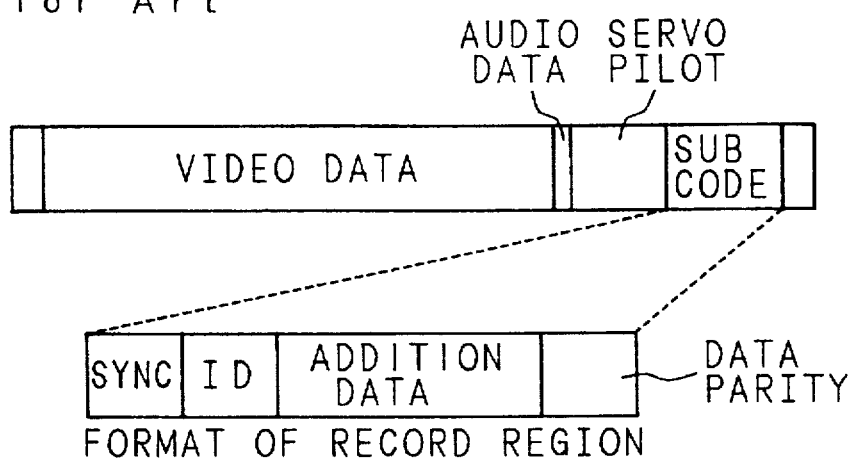
FIG. 1(a) is a diagram showing an arrangement of recording regions in a prior art system.
Figure 1B:
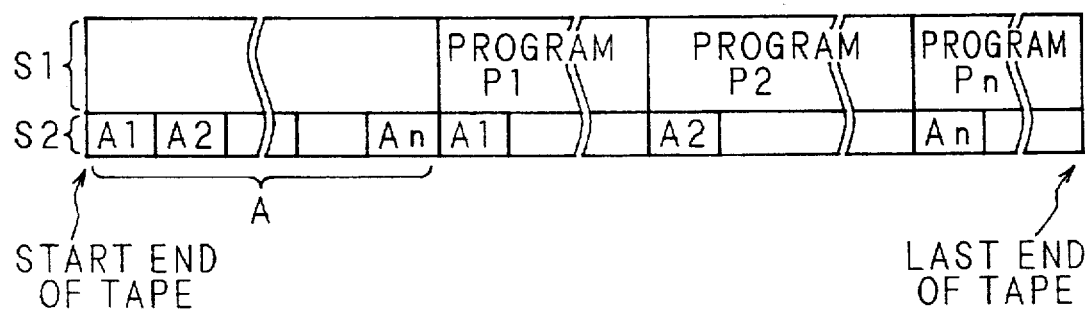
FIG. 1(b) is a diagram showing a location of recording regions in a prior art system.

Referring now to the drawings, embodiments of the invention will be hereinafter described.

(Embodiment 1)

Figure 6A:
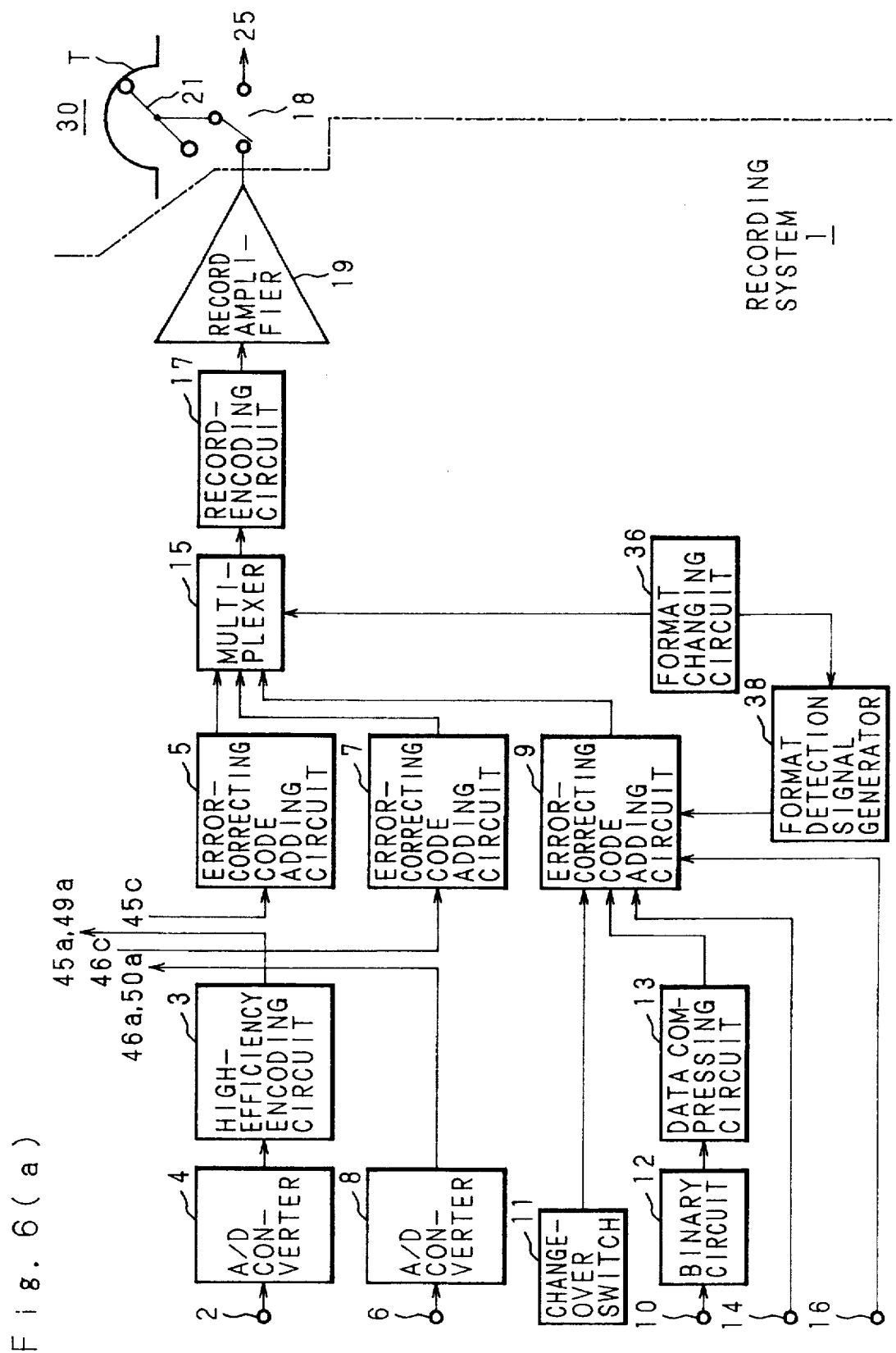
FIG. 6(a) is a circuit block diagram of a part of a recording and reproducing apparatus according to the invention.

A first embodiment of the invention will be described with reference to the drawings. FIG. 6(a) is a circuit block diagram of an apparatus of the invention, and FIG. 7 shows the relation between the mode, tape format and switch connection of the apparatus of FIG. 6(a).

When recording is performed with a first format, in a recording system 1 shown in FIG. 6(a), a video signal in analog form entered from an input terminal 2 is converted into a digital signal by an A/D converter 4, and the data amount of the signal is reduced by a high-efficiency encoding circuit 3. The signal then passes through a switch 45, and an error-correcting code to be used in a reproducing system 20 is added to the signal by means of an error correcting code adding circuit 5. An analog audio signal entered from an input terminal 6 is converted into a digital signal by an A/D converter 8, and then passes through a switch 46. Thereafter, an error-correcting code is added to the signal by means of an error-correcting code adding circuit 7. Sent to an error-correcting code adding circuit 9 are addition data (i.e., a signal obtained by converting an analog signal entered from an input terminal 10 into symbol data of binary image by a binary circuit 12, and reducing its data amount by a data compressing circuit 13); a character code signal entered from an input terminal 14; a signal such as a time code signal entered from an input terminal 16; and a signal indicating a format, which is released from a format detection signal generator 38 upon receipt of an instruction from a format changing circuit 36. In addition to the above signals, a control signal from a change-over switch 11 is sent to the error-correcting code adding circuit 9. The change-over switch 11 has a switching function to determine whether or not data from the data compressing circuit 18 and the input terminal 14 should be used. The format changing circuit 36 is for changing the record format from the first format to a second format, or vice versa. The format changing circuit 36 also changes a data train generated by a multiplexer 15 in accordance with the selected format and at the same time, sends a command to the format detection signal generator 38 to generate a signal indicating the selected format. At the error-correcting code adding circuit 9, an error-correcting code is added to the above data, and the output of the circuit 9 is supplied to the multiplexer 15 together with output signals from the error-correcting code adding circuit 5 and the error-correcting code adding circuit 7. A recording data train composed of video data, audio data and addition data is generated in accordance with a track format of a first type at the multiplexer 15 and is converted into a pattern signal to be recorded on a tape, at a record encoding circuit 17. After being amplified by a record amplifier 19, this pattern signal passes through a recording/ reproducing switch 18 and is then recorded on a magnetic tape T by a head 21. In FIG. 7, the above-described mode is represented by M1 and the record format is F1. In both of switches 45 and 46, terminals c and a are connected to each other. The conditions of switches 47, 48, 49 and 50 may be disregarded.

Figure 6B:
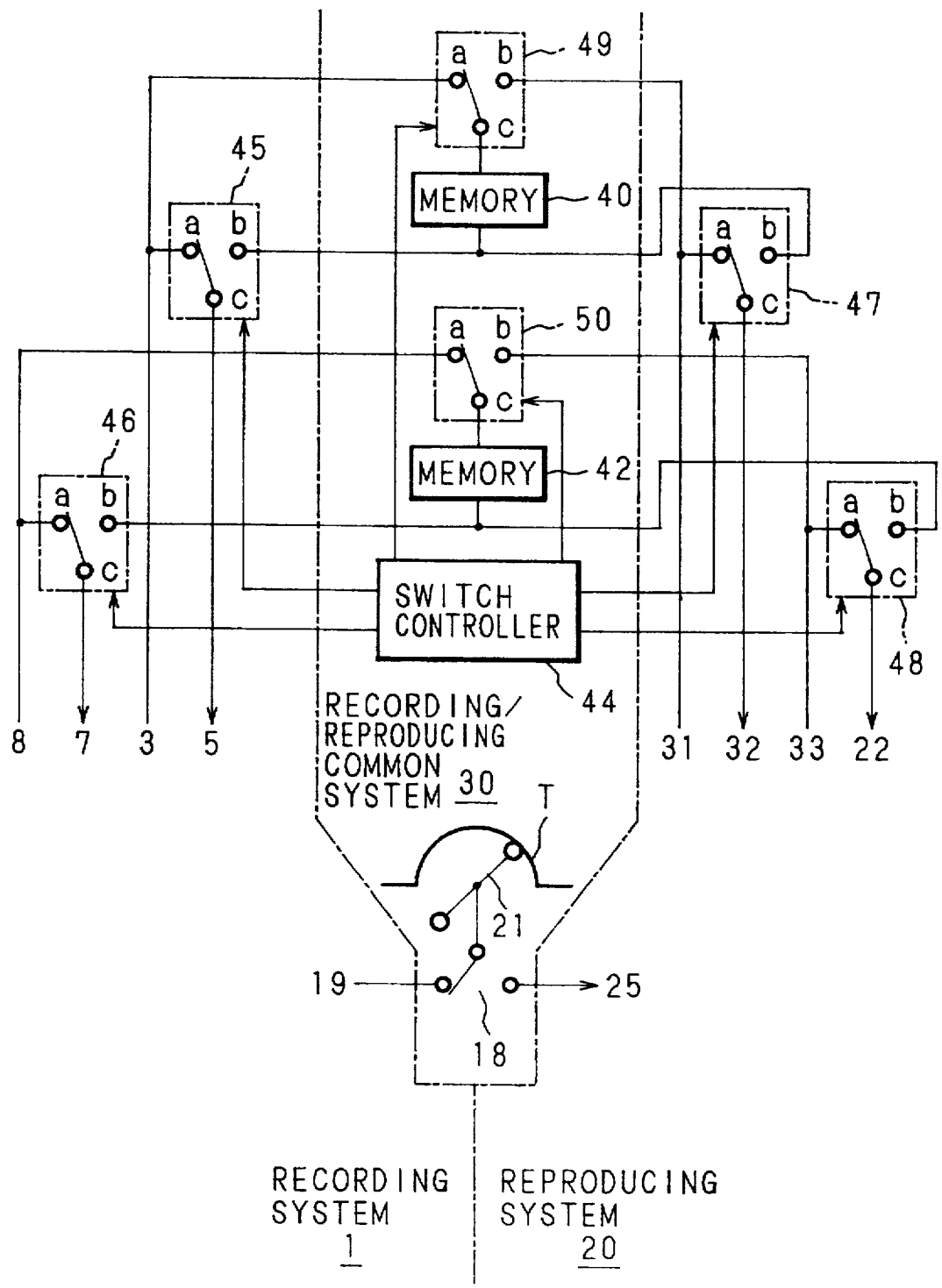
FIG. 6(b) is a circuit block diagram of a part of a recording and reproducing apparatus according to the invention.
Figure 6C:
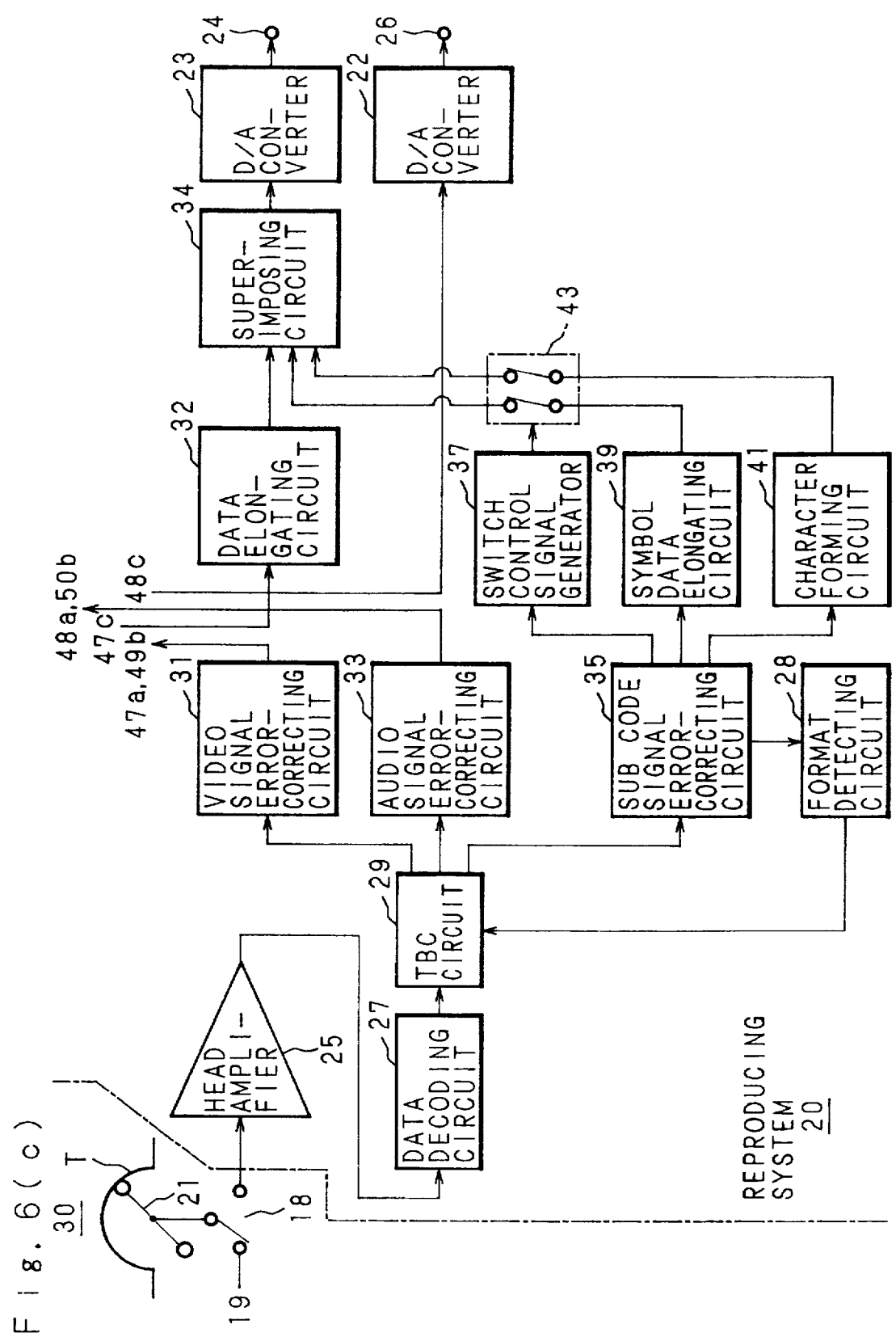
FIG. 6(c) is a circuit block diagram of a part of a recording and reproducing apparatus according to the invention.

When "reproducing" mode is selected, in FIG. 6(c), the head 21 first reads data recorded on the magnetic tape T. After passing through the recording/reproducing switch 18, the read-out data are supplied to and amplified by a head amplifier 25 in the reproducing system 20. The amplified data are supplied to a data decoding circuit 27 where the data are decoded to a digital signal. At a TBC circuit 29, jitter, which has been generated at the time of recording on the tape or reproducing therefrom, is eliminated from the digital signal, and this digital signal is converted to digital data to which a sync byte is applied. Such digital data are then supplied to a video signal error correcting circuit 31, an audio signal error correcting circuit 33 and a sub code signal error correcting circuit 35 respectively. In the video signal error correcting circuit 31, errors of the video data are corrected, and after passing through the switch 47, the data thus corrected are changed back to the signal before compression at a data elongating circuit 32. The signal is then supplied to a superimposing circuit 34.

In the audio signal error correcting circuit 31, errors of the audio data are corrected, and after passing through the switch 48, the data thus corrected are converted into an audio signal by a D/A converter 22 to be supplied to an output terminal 26. In the sub code signal error correcting circuit 35, errors of the sub code signal are corrected. Addition data are supplied to a symbol data elongating circuit 39 or a character forming circuit 41, and the recorded addition data are restored so as to be sent to a switch 43. The switch 43 is opened or closed upon receipt of a signal from a switch control signal generator 37, and has a switching function to determine whether or not the addition signal should be added to the video signal at the superimposing circuit 34. The output of the superimposing circuit 34 is converted into a video signal by a D/A converter 23 and is then sent to an output terminal 24. A reproduced signal for indicating a format is sent from the sub code signal error correcting circuit 35 to a format detecting circuit 28. The format detecting circuit 28 detects whether the record of the magnetic tape T is in the first format or the second format and sends the result of the detection to the TBC circuit 29. In the TBC circuit 29, the sync byte of the digital data is automatically switched according to the detected format.

In FIG. 7, the above-described mode is represented by M2. The tape format is automatic change-over of F1 or F2. In both of the switches 47, 48, the terminals c and a are connected to each other. The conditions of the switches 45, 46, 49 and 50 may be disregarded.

When writing reproduced video and audio signals in the memory, in the "reproducing" mode described with reference to FIG. 6(c), output video data of the video signal error correcting circuit 31 are written in a memory 40 after passing through the switch 49, and output audio data of the audio signal error correcting circuit 33 are written in a memory 42 after passing through the switch 50. In FIG. 7, the above mode is represented by M8. The tape format is automatic change-over of F1 or F2. In both of the switches 47, 48, the terminals c and a are connected to each other whilst in both of the switches 49 and 50, terminals c and b are connected to each other. The conditions of the switches 45, 46 may be disregarded.

When data are recorded on a tape in a second format, the video and audio data in the memory are read out and recorded, but the operation in this case differs from the ordinary "recording" mode M1 in the following point. In FIG. 6(c), the output of the high-efficiency encoding circuit 3 is not used, but the video data are read out of the memory 40 and supplied to the error-correcting code adding circuit 5 after passing through the switch 45. The output of the A/D converter 8 for audio signals is not used, but the audio data read out of the memory 42 are supplied to the error-correcting code adding circuit 7 after passing through the switch 46. The format changing circuit 36 switches the multiplexer 15 and the format detection signal generator 38 so as to record the data in the second format. In FIG. 7, the above mode is represented by M11, and the tape format is F2. In both of the switches 45, 46, the terminals c and b are connected to each other. The conditions of the switches 47, 48, 49 and 50 may be disregarded.

When the video and audio data written in the memory are read out and reproduced, the operation in this case differs from "reproducing" mode in the following point. In FIG. 6, the output of the video signal error correcting circuit 31 is not used, but the video data are read out of the memory 40 and supplied to the data elongating circuit 32 after passing through the switch 47. The output of the audio signal error correcting circuit 33 is not used, but the audio data are read out of the memory 42 and supplied to the D/A converter 22 after passing through the switch 48. In FIG. 7, the above mode is represented by M14, and the tape format does not matter. In both of the switches 47, 48, the terminals c and b are connected to each other. The conditions of the switches 45, 46, 49 and 50 may be disregarded.

A switch controller 44 is a control circuit for the switches 45, 46, 47, 48, 49 and 50, and has the function of connecting the terminal c to either of the terminal a or b in the respective switches in accordance with the condition of the apparatus.

FIG. 7 shows the relation between the operation mode, switch condition, and tape format of the apparatus according to this embodiment. In addition to the above-mentioned modes M1, M2, M8, M11 and M14, there are provided a mode M3 for writing output video data of the high-efficiency encoding circuit 3 in the memory 40; a mode M4 for writing output audio data of the A/D converter 8 for audio signals in the memory 42; a composite mode M5 in which M3 and M4 are combined; a mode M6 for writing only reproduced video data in the memory; a mode M7 for writing only reproduced audio data in the memory; a mode M9 for reading only video data from the memory to record on the tape; a mode M10 for reading only audio data from the memory to record on the tape; a mode M12 for reading only video data from the memory and reproducing them; a mode M13 for reading only audio data from the memory and reproducing them.

Figure 8A:
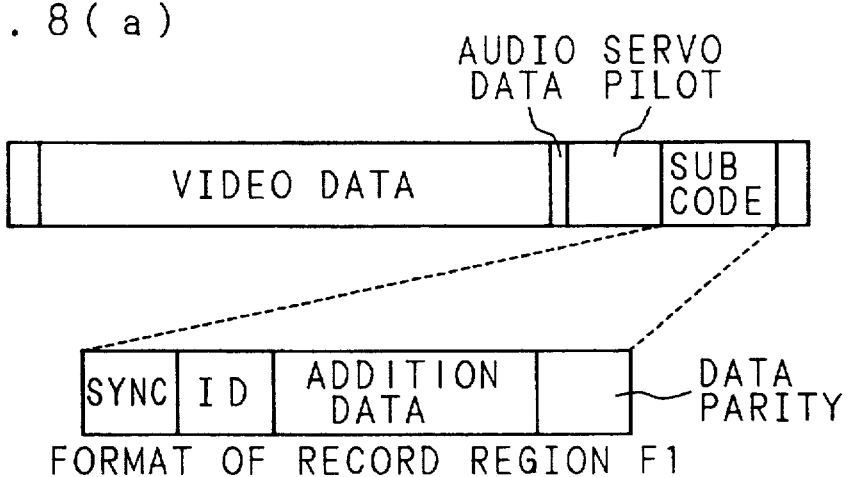
FIG. 8(a) is a diagram showing an arrangement of recording regions of the recording and reproducing apparatus shown in FIG. 6.
Figure 8B:
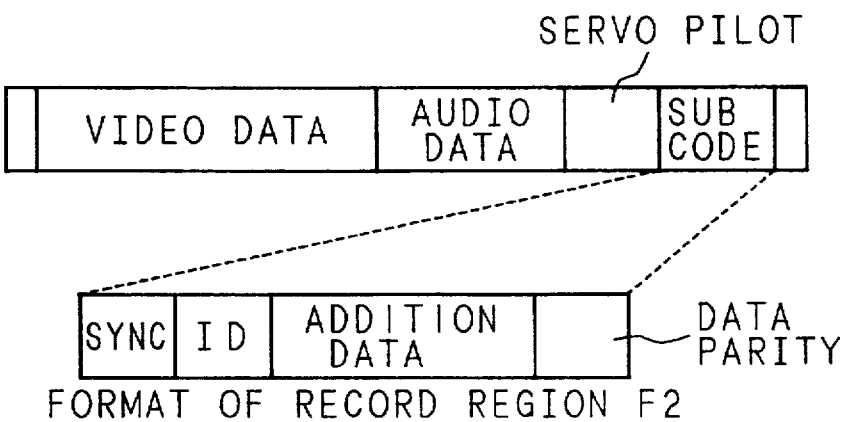
FIG. 8(b) is a diagram showing an arrangement of recording regions of the recording and reproducing apparatus shown in FIG. 6.

FIG. 8 shows tape formats for the apparatus of the embodiment. FIG. 8(a) is a first record format F1 in which one track is divided into several regions. Specifically, inward from the starting part of the track are a video data region; an audio data region; a servo-pilot signal region; and a sub-code region. The sub code region is further divided into a region for data detection synchronization (SYNC); a region for track numbers etc. (ID); a region for symbol and character data etc. (addition data); and a recording region for error-correcting codes (parity). In the (ID) region, a signal representing the format F1 is recorded. FIG. 8(b) is a second record format F2 which differs from the format F1 of FIG. 8(a) in the lengths of the video data region and the audio data region In the (ID) region of the format F2, a signal representing the format F2 is recorded. The proportion of the audio data region to the video data region in the second format F2 is larger than that of the first format F1. In the case where one frame of video signal is recorded as a characteristic scene of a program, the data amount of the signal is calculated as follows: Suppose a video signal of ⅟30 second is set as one frame, and a Y signal, an R-Y signal and a B-Y signal of 8 bits are sampled with sampling rates of 13.5 MHz, 6.75 MHz and 6.75 MHz respectively. The data amount in the above condition is described by:

$$(13.5M+6.75M+6.75M) \times 8 \text{ bits}/30 = 7.20 \text{ Mbits}$$

On the other hand, when one channel of audio signal of 16 bits is sampled with a sampling rate of 48 kHz, in the respective cases where the sampling cycle is ⅟30 second and where the sampling cycle is 5 seconds, the data amounts are obtained by the following equations.

$$48\text{k} \times 16 \text{ bits} \times (\tfrac{1}{30}) = 25.6 \text{ kbits}$$

$$48\text{k} \times 16 \text{ bits} \times 5 = 3.84 \text{ Mbits}$$

The record format may be set with the above data amounts on condition that the same amount of data can be recorded in the same area of the magnetic tape. The proportion of the amount of video data to the amount of audio data in each case is as follows.

$$7.20 : 0.0256 = 281.25 : 1$$

$$7.20 : 3.84 = 1.875 : 1$$

Specifically, the above equations describe the proportion of the length of the video data region to the length of the audio data region in one track in the first format F1 and in the second format F2. If the amount of video data greatly decreases in the high-efficiency encoding circuit 3, or if data compression is performed in the audio system too, the proportion obtained in those cases may be used instead of the above calculated values.

Figure 8C:
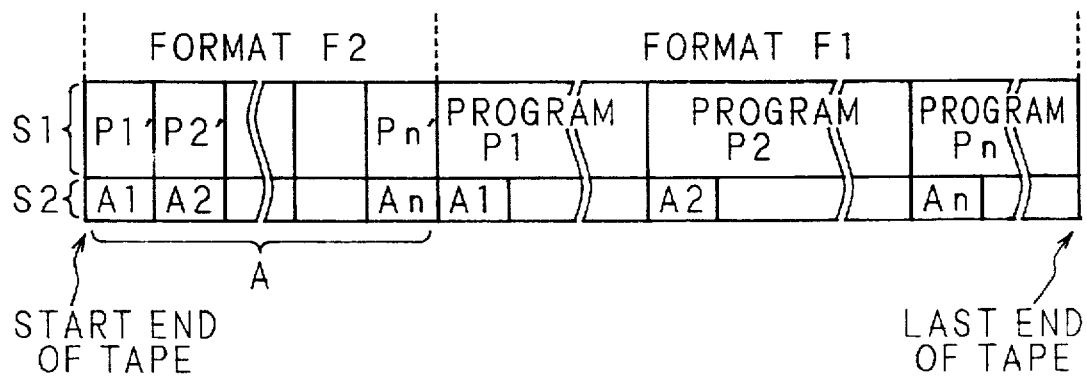
FIG. 8(c) is a diagram showing a location of recording regions of the recording and reproducing apparatus shown in FIG. 6.

FIG. 8(c) shows the arrangement of recording regions for record signals in the entire tape. Roughly speaking, the tape is divided length-wise into a region (A) for the second format F2 and a region for the first format F1 which follows the region (A). There are a region (P1') and a region (A1) in the front part of the region (A). The region (P1') is for recording the video signal and audio signal of one scene which represents a characteristic feature of a program (P1). The region (A1) is for recording addition data such as characters or symbols corresponding to the program (P1). Regions (Pn') and (An) are similar to the above regions (P1) and (A1).

Reference is made to FIG. 8(c) for explaining the case where the region (A) is prepared with the apparatus of the embodiment. When a first program has been already recorded in the region (P1) for example, this program is reproduced and video and audio sample data are written in the memory, in Mode M8. Then, insert recording is performed in Mode M11 at the starting part of the tape. At that time, addition data are entered from the input terminal 10 or 14 to be recorded at the same time. The above operation is applied to each program, thereby preparing the region (A) shown in FIG. 8(c).

According to the 1st embodiment, in a VTR capable of recording signals for a long time, the contents can be confirmed and retrieval information can be obtained from video signals, audio signals and addition data recorded in the starting part of the tape, those signals and data representing a program recorded on the tape. This provides much convenience such as achieved by a table of contents for a book.
(Embodiment 2)

Figure 9:
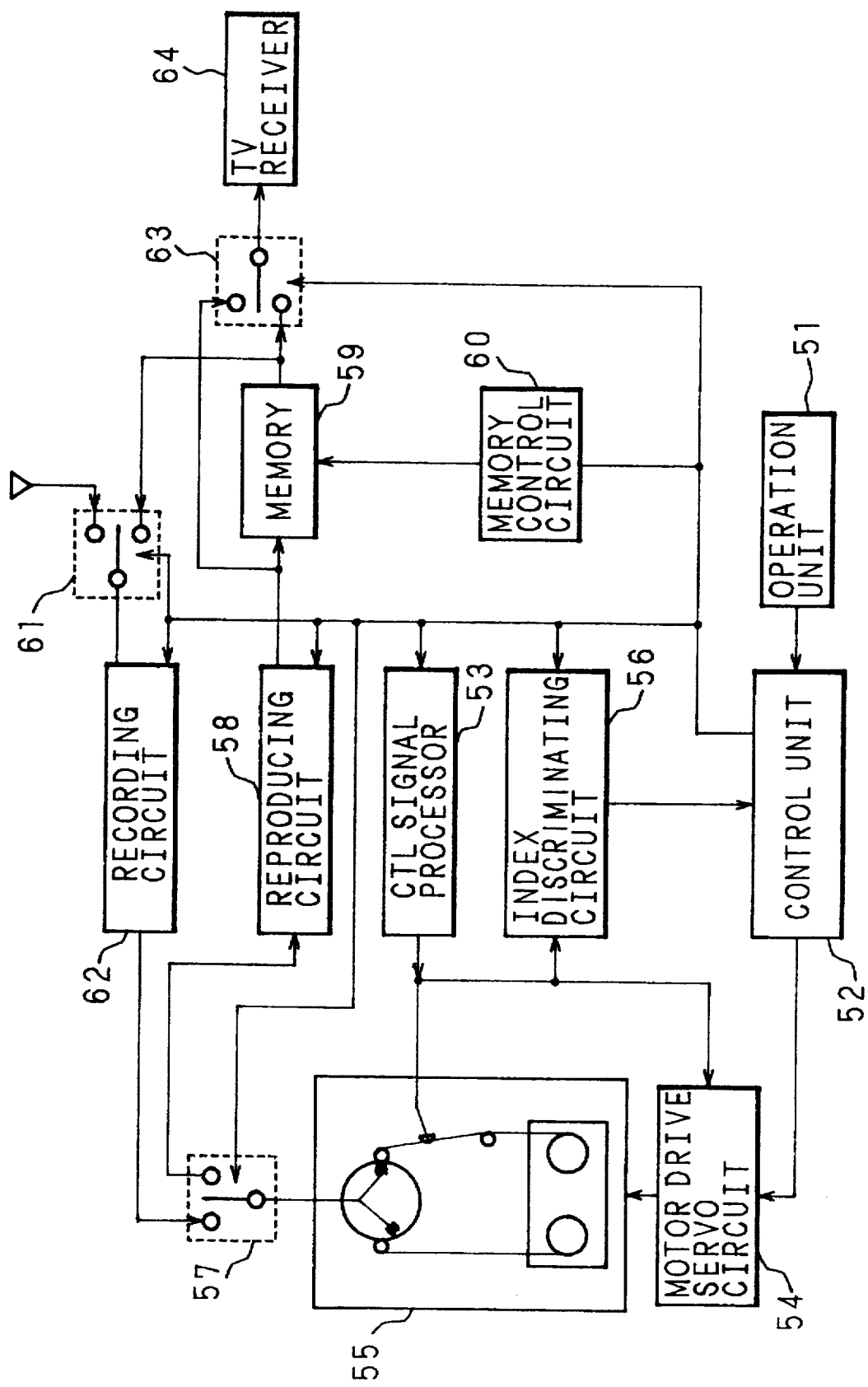
FIG. 9 is a block diagram of another magnetic recording and reproducing apparatus according to the invention.

Referring to FIG. 9, a second embodiment of the invention will be explained below.

Figure 2:
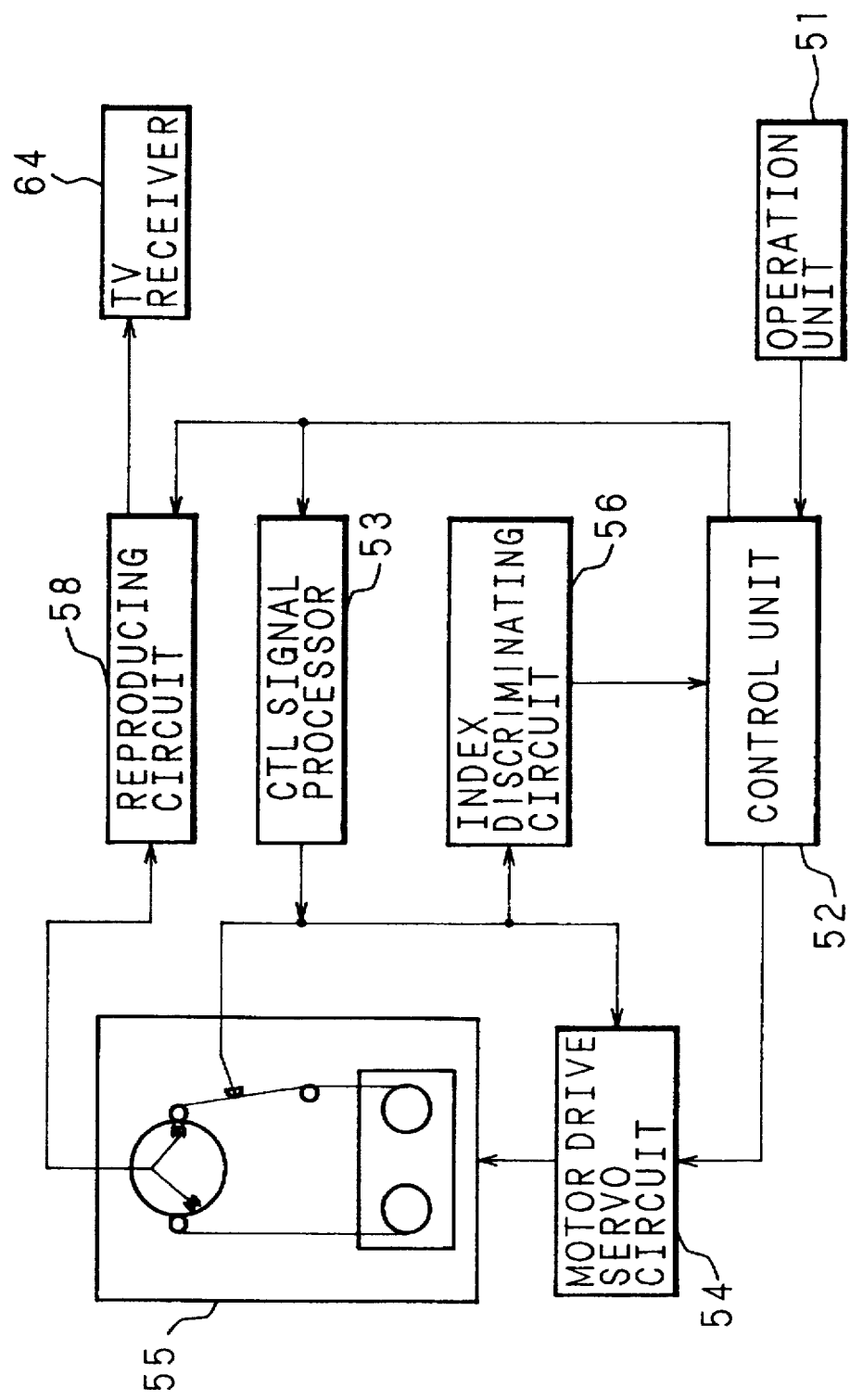
FIG. 2 is a block diagram of a prior magnetic recording and reproducing apparatus.
Figure 3:
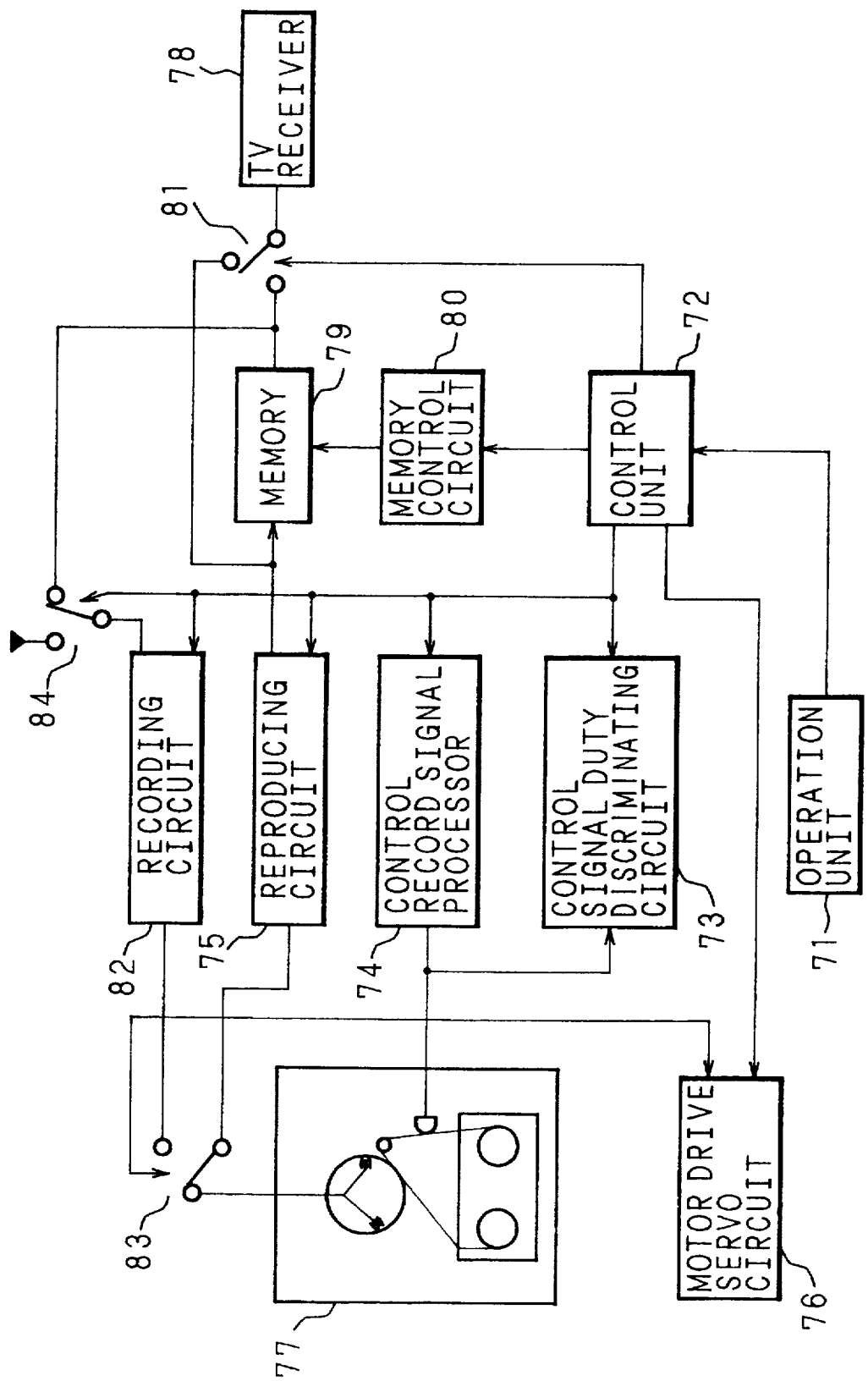
FIG. 3 is a block diagram showing a prior magnetic recording and reproducing apparatus.
Figure 4:
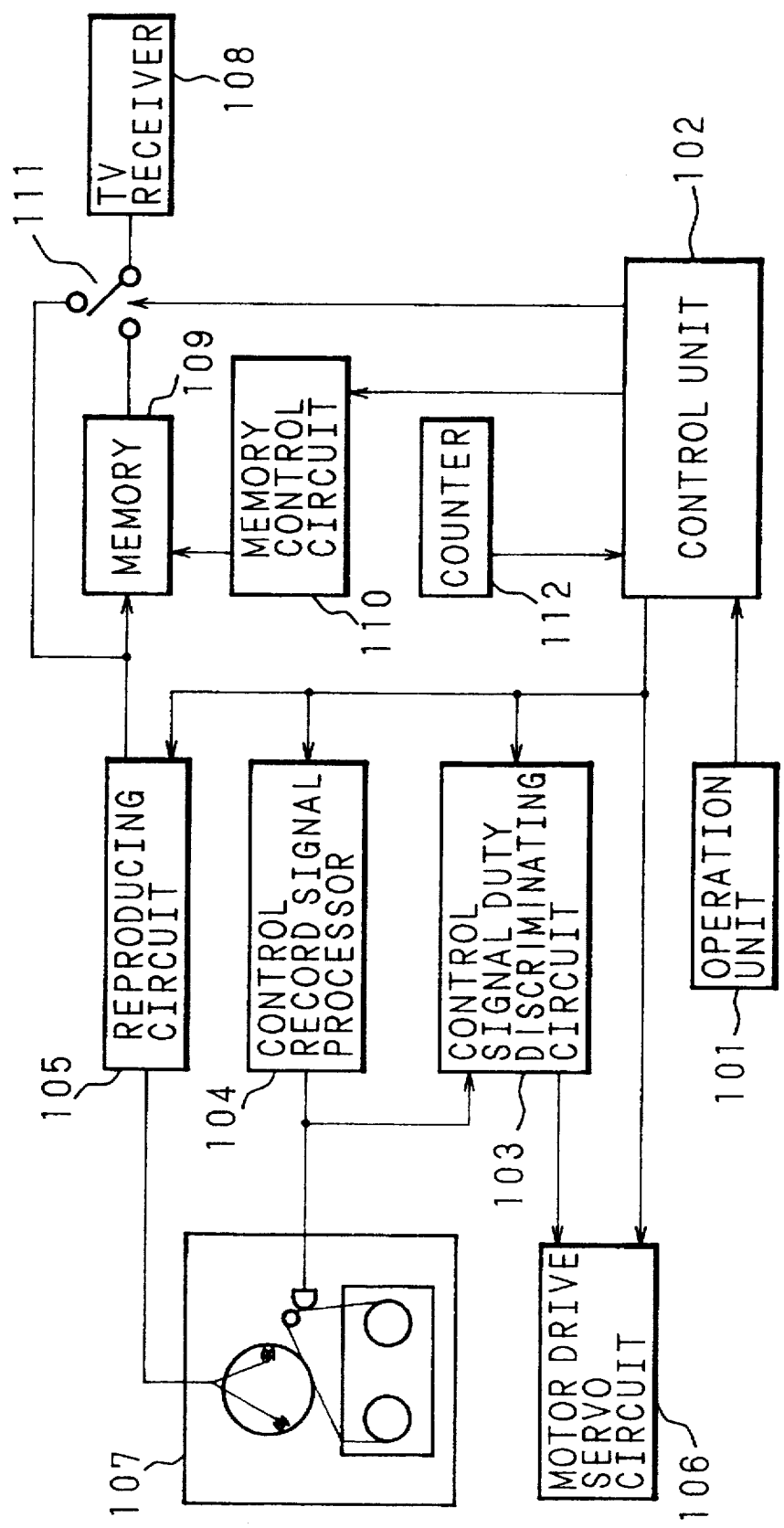
FIG. 4 is a block diagram of a prior magnetic recording and reproducing apparatus.
Figure 10:
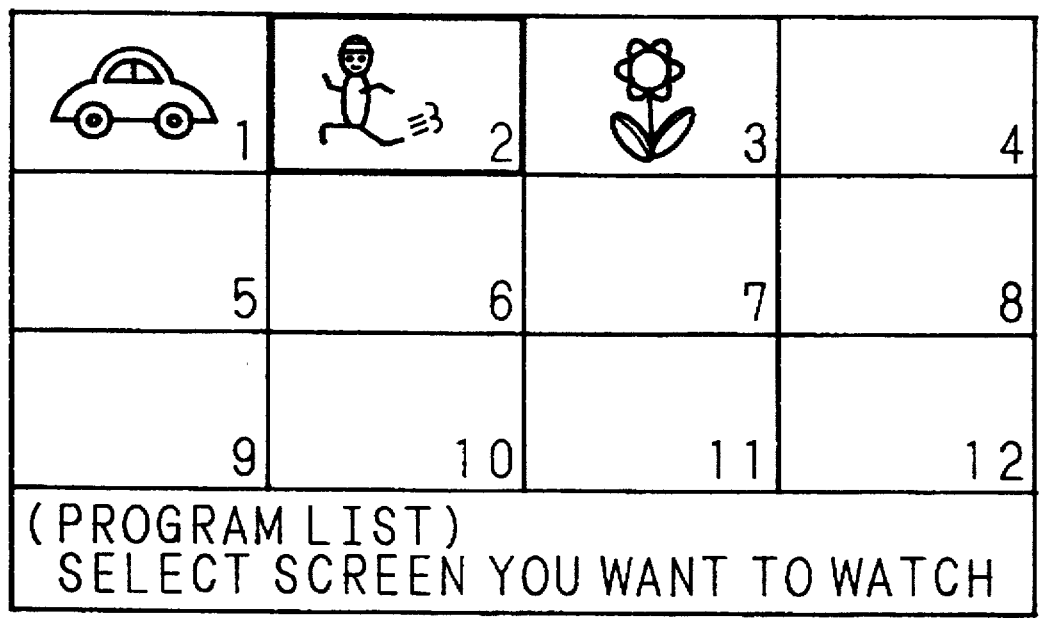
FIG. 10 is a diagram showing an example of a display of a multi-screen.

In FIG. 9, the members identical with those of FIG. 2 are represented by the same reference numerals as used for the latter. FIG. 10 shows one example of a display of a multi-screen.

In this embodiment, the conventional method is employed for dividing one tape into a plurality of programs with index signals, and therefore its description will be omitted. The description of this embodiment will be started with an explanation on multi-screen preparation in which the beginning of each program is displayed on a multi-screen. A method for preparing a multi-screen will be explained below. There have been proposed a number of multi-screen preparation methods. One of them is such that: retrieval is started from the last end of a tape by searching an index signal; an image at the beginning of a program is reduced in size by a reproducing circuit 58; a memory control circuit 60 controls a memory 59 to store the reduced image in the memory 59; and the above procedure is repeated until the start end of the tape is reached. The programs detected at that time are sequentially stored in the memory 59 starting from the program located at the last end of the tape, but upon detection of the start end of the tape, the memory control circuit 60 controls such that the recording order is reversed. With this arrangement, it can be judged where each program on the multi-screen exists from the start end of the tape. The multi-screen is stored for example at the start end of the tape and can be displayed later on by reproducing it. The multi-screen is possibly stored at either of the start end or the last end. In reality, it is stored at the start end, since a first program is generally recorded at the start end of a tape. This is because when programs are recorded halfway on a tape on which the multi-screen is recorded at its last end, retrieval takes more time compared with the case where the multi-screen is recorded at the start end.

Next, the reference position of a tape will be explained. The reference position could be a position which exists in any tape, for example, the start end or last end of a tape. Taking the recording contents of an actual tape into an account like the above case, the start end is appointed as the reference position in this embodiment. For example, when retrieval has been performed up to the start end of the tape in the course of the multi-screen preparation, or when the multi-screen recorded at the start end of the tape is reproduced, the start end of the tape is detected by the running control unit 55, and the detection data are sent to the control unit 52. The control unit 52 determines that the reference position of the tape is currently accessed.

The operation for recording the multi-screen will be hereinafter described. The recording of the multi-screen is controlled by the control unit 52. Following is a description of the control operation of the control unit 52. The multi-screen stored in the memory 59 is input in a recording circuit 62 by turning a record change-over switch 61. A record signal is recorded on the magnetic tape by turning a recording/reproducing change-over switch 57 to a "record" side. At that time, the motor drive servo circuit 54 controls the running control unit 55 to perform recording from the start end of the magnetic tape.

Next, retrieval operation will be explained. Firstly, the multi-screen is displayed. The user inputs retrieval operation data by the operation unit 51. The data are sent to the control unit 52. The control unit 52 controls the motor drive servo circuit 54, the reproducing circuit 58 and the memory control circuit 60 as follows. The motor drive servo circuit 54 rewinds the tape for reproducing as far as the start end is reached. The reproducing circuit 58 sends reproduced data to the memory 59 and the memory 59 is controlled by the memory control circuit 60 to store the multi-screen. The multi-screen is read from the memory 59 and displayed on the TV receiver 64.

Looking at the multi-screen as shown in FIG. 10, the user selects a reduced screen corresponding to a program which he wishes to watch and enters input data by the operation unit 51. The input may be carried out by selecting a number allocated to the reduced screen, or alternatively specifying the selected reduced screen with an outer frame such as shown by a program No. 2 in FIG. 10 so as to be distinguished from other reduced screens.

One example will be explained. Suppose the program No. 2 is now selected. The selection data are sent through the operation unit 51 to the control unit 52. The control unit 52 is set in "index retrieval" mode. The start end (i.e., reference position) of the tape is accessed at the time when the multi-screen is displayed. In order to retrieve the program No. 2 from the start end, retrieval operation is performed in the rapid traverse direction until two indexes have been found. The retrieval method of this embodiment is the same as that of the prior art. It should be noted that whichever program is selected, the same operation may be applied.

(Embodiment 3)

In the 2nd embodiment, retrieval operation is started from the reference position and a selected program No. is retrieved by counting the number of reproduced index signals. This means that it is essential to go back to the reference position in order to perform retrieval. In contrast with this, according to a 3rd embodiment, the control unit 52 identifies where the program currently reproduced exists from the reference position of the tape, based on the number of index signals which have been detected and the rotating direction of the tape at that time. With this arrangement, once the multi-screen has been prepared, the user can search a program any number of times from any position, using the multi-screen.

An example will be explained. Suppose that the user retrieved the program No. 2 and has been continuously watching reproduced images up to the middle of a program No. 3. The control unit 52 detected an index signal at the beginning of the program No. 3 in the course of the reproducing. At that time, the control unit 52 judged that the operation had been shifted from the program No. 2 to the program No. 3 since the control unit 52 had detected an index signal in the forward rotation of the tape. The user then executes rewinding operation in the middle of the program No. 3 so that the tape is rewound up to the program No. 1. At that time, the control unit 52 judges that the operation has been shifted from the program No.3 to the program No. 1 since it has detected two index signals in the backward rotation of the tape. At this stage, if the user extracts the multi-screen from the memory 59 and executes retrieval operation, selecting e.g. a program No. 4, the control unit 52 performs retrieval until three index signal are found in the forward direction. As has been described above, the control unit 52 always determines which number of the programs is currently accessed, whereby a desired program can be retrieved any number of times from any position.

(Embodiment 4)

Figure 11:
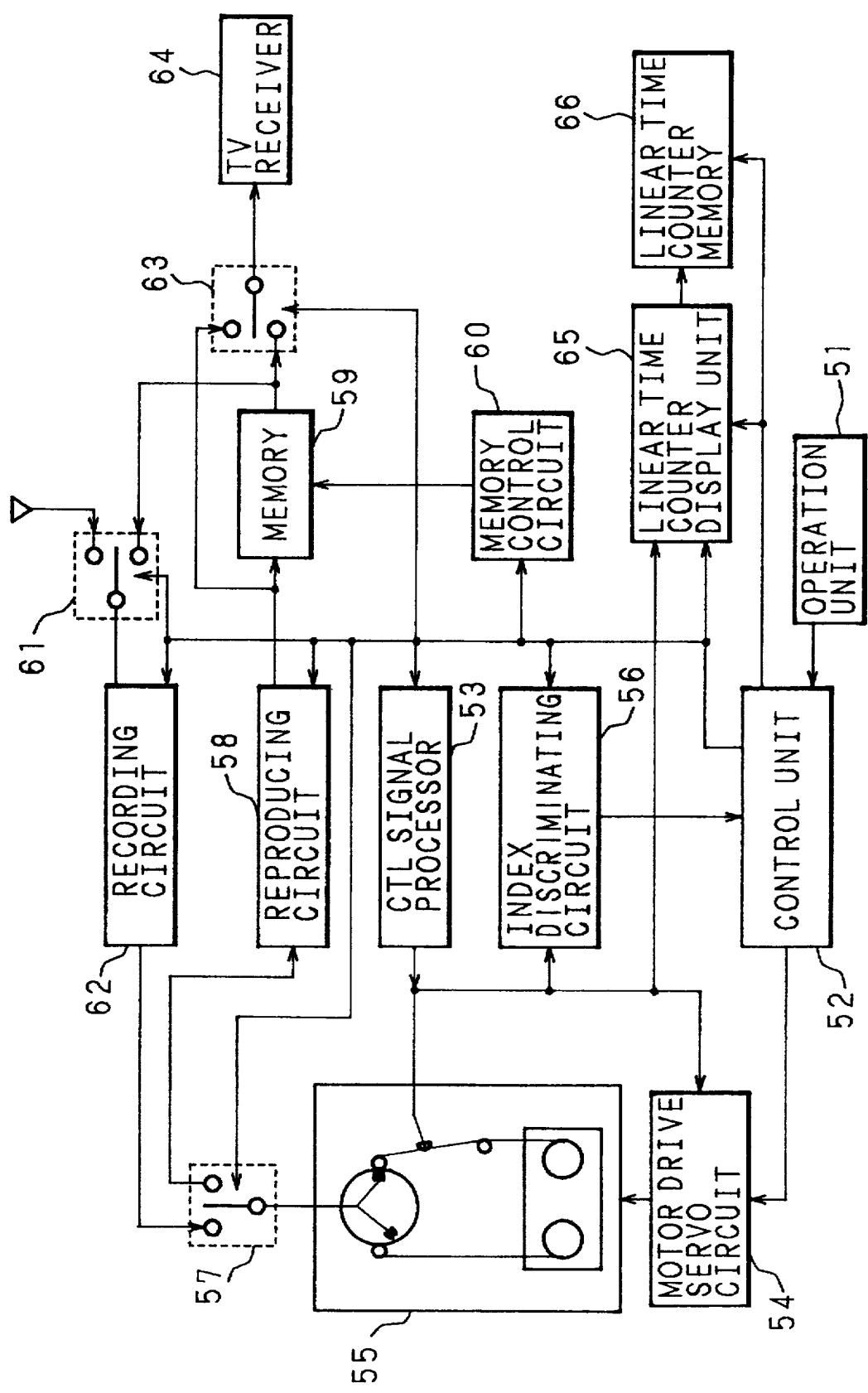
FIG. 11 is a block diagram of still another magnetic recording and reproducing apparatus according to the invention.

There will be explained the apparatus of a 4th embodiment with reference to FIG. 11 which shows its structure. In FIG. 11, the members identical with those of FIGS. 2 and 9 are represented by the same reference numerals as used for the latter. FIG. 12 shows one example of the contents of data in a linear time counter memory 66 according to the 4th embodiment.

The multi-screen preparation of the 4th embodiment is the same as that of the 2nd embodiment, and the fact that the reference position of a tape is the start end of the tape is common to these embodiments. Therefore, an explanation on these points will be omitted. In this embodiment, when preparing a multi-screen, a linear time counter value for the beginning of each program is stored in the linear time counter memory 66. At that time, it is important to reset the linear time counter at the reference position, i.e., the start end of the tape, before starting multi-screen preparation. This allows the value of the linear counter to indicate a recording time counted from the start end of the tape.

An operation for storing the linear time counter value will be explained. The user inputs data For multi-screen display operation by the operation unit 51. Then, the data are sent to the control unit 52. The control unit 52 controls the motor drive servo circuit 54 to actuate the running control unit 55 such that the tape is rewound up to its start end. After a linear time counter display unit 65 has been reset, the multi-screen is prepared in the similar way to that of the 2nd embodiment. At this stage, the counter value obtained when an index signal is detected and the screen of the beginning of a program is reduced is stored in the linear time counter memory The linear time counter memory 66 stores, for example, the linear time counter value for the beginning of each program which is shown in FIG. 12. In this example, the number of programs stored in one tape is seven, but it may be increased according to the capacity of the memory. Although counter data are stored in the memory in this embodiment, alternatively, counter data may be recorded at the start end of the tape together with the multi-screen and stored in the linear time counter memory 66 when the multi-screen is reproduced. In a known magnetic recording and reproducing apparatus such as DAT, tape management is conducted. This management may be achieved by storing tape Nos.(such as addresses 0E, 0F shown in FIG. 12), the number of programs recorded on the tape and the recording dates etc. In this case, a currently used tape itself needs the data of tape Nos. There are several ways for identifying a tape. For example, tape No. data may be recorded on a tape, or alternatively, a tape is labeled with an "identification label" to be read.

The retrieval operation will be explained below. In this embodiment, when displaying the multi-screen, counter resetting is executed upon detection of the start end (reference position) of the tape. A program No. to be retrieved is selected in the same way as that of the 2nd embodiment, and therefore its description will be omitted. Suppose the program No. 2 has been selected. The selection data from the operation unit 51 are sent to the control unit 52 so that the control unit 52 is set in "program retrieval" mode. The control unit 52 reads the counter value for the beginning of the program No. 2 from the linear time counter memory 66. Thereafter, the motor drive servo circuit 54 controls the running control unit 55 to perform rapid traverse. During the rapid traverse, the linear time counter display unit 65 displays its linear time obtained from counting of CTL signals. The counter value is also supplied to the control unit 52. The control unit 52 controls the running control unit 55 so as to start reproducing operation from the instant at which the linear time counter value currently counted becomes coincident with the counter value for the beginning of the program No. 2 which has been read out. The retrieval is completed upon start of the reproducing operation. Note that whichever program is retrieved, the same operation can be applied.

(Embodiment 5)

The structure of the magnetic recording and reproducing apparatus of a 5th embodiment is the same as that of the 4th embodiment shown in FIG. 11. FIG. 13 shows one example of the contents of data in the linear time counter memory 66 of the 5th embodiment.

Firstly, the embodiment will be outlined. According to this embodiment, a program is searched up to its vicinity with a linear time counter value and then the head end of the program is searched with an index signal. This arrangement enables accurate program searching even if the amount of data to be stored in the linear time counter memory 66 is reduced and the "second" digit is represented in 10 seconds as shown in FIG. 13. Further, it reduces the possibility of deviation of the linear time counter, the deviation being caused by the skipped-reading of index signals and the skipped-reading of CTL signals.

The operation will be explained below. The multi-screen is prepared in the same way as that of the 4th embodiment, and therefore its explanation will be omitted. In this embodiment, the "second" digit of a counter value to be stored in the linear time counter memory 66 may be represented in 10 seconds as mentioned above, but each counter value has to precede the counter value for an index signal.

The retrieval operation will be described below. A program No. to be retrieved is selected in the same way as that of the 4th embodiment, and therefore its description will be omitted. Suppose the program No. 2 has been selected. The selection data are sent from the operation unit 51 to the control unit 52 so that the control unit 52 is set in "program retrieval" mode. The retrieval operation following thereafter is similar to that of the 4th embodiment, and therefore its description will be partly omitted. The control unit 52 controls the running control unit 55 so as to start reproducing from an instant at which the current counter value becomes coincident with the counter value which has been read out of the linear time counter memory 66. Since an index signal is always recorded after this counter value, an index signal will be found within 10 seconds after the start of the reproducing. A reproduced CTL signal is supplied to the index discriminating circuit 56, and upon detection of the index signal, an index discovery signal is sent to the control unit 52. The control unit 52 allows the reproducing circuit 58 and an output change-over switch 63 to be in "reproducing" mode, thereby completing the retrieval. It is understood that whichever program is retrieved, the same operation can be applied.

Although retrieval is performed with a counter value of the linear time counter represented in 10 seconds, the same effects can be achieved by counting in minutes. In this case, it takes one minute in maximum after the running control unit 55 has been set in "reproducing" mode until an index signal is found. Since retrieval operation takes time, the mode is switched to "index retrieval" mode with "rapid traverse" unchanged, even when the current linear time counter value becomes coincident with the counter value stored in the linear time counter memory 66. After that, program searching is performed in the same manner as that of the 2nd embodiment.

(Embodiment 6)

Figure 14:
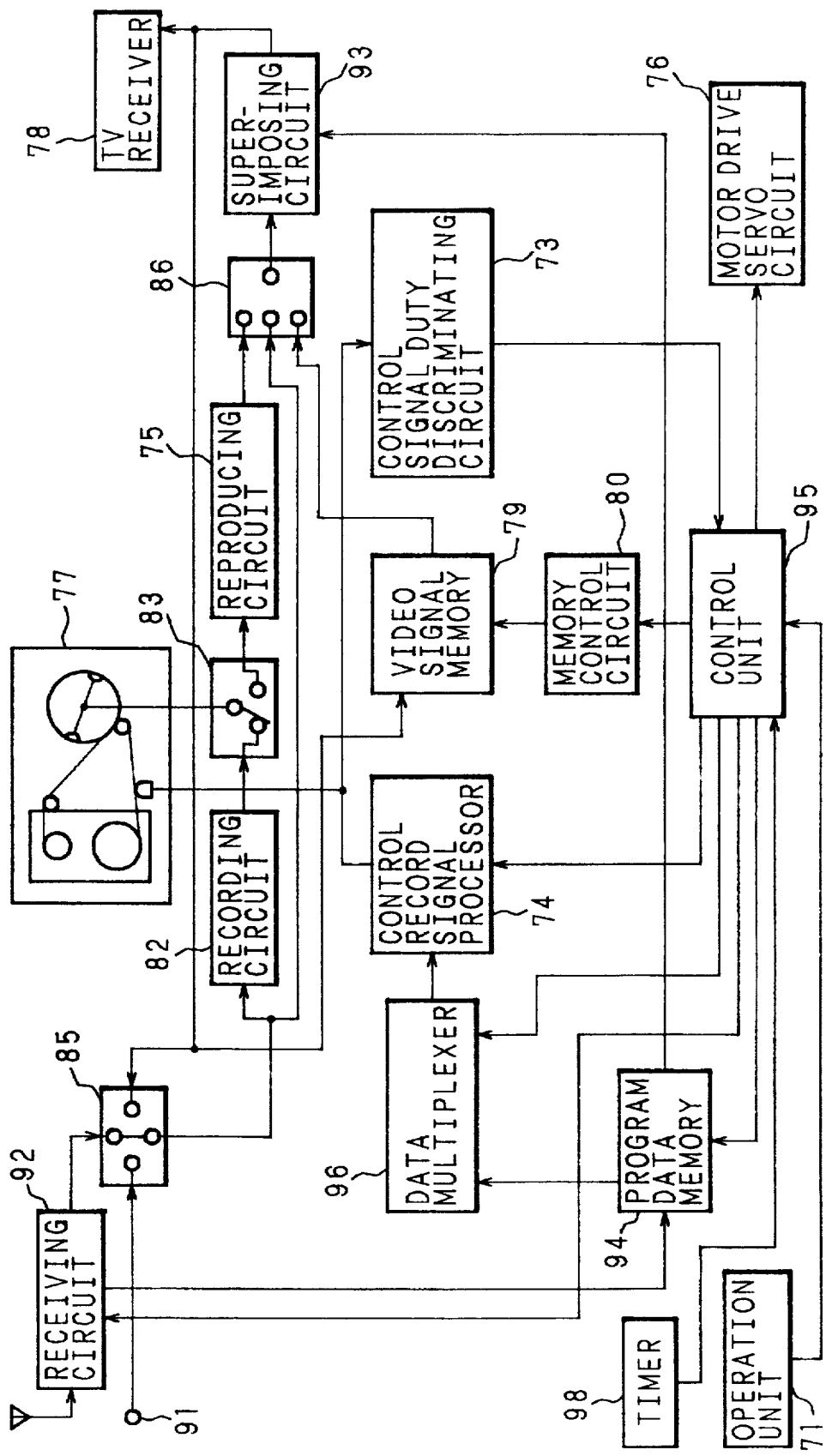
FIG. 14 is a block diagram of the structure of yet another magnetic recording and reproducing apparatus according to the invention.

The structure of the magnetic recording and reproducing apparatus of a 6th embodiment is as shown in FIG. 14. When recording data on a tape, a record signal selection switch 85 selects, as an input signal, (i) a signal from an external input terminal 91, (ii) a signal from a receiving circuit 92 for TV broadcast, or (iii) an output signal coming from a video signal memory 79 by way of a switch 86 and a superimposing circuit 93. The output of the record signal selection switch 85 is supplied to a recording circuit 82 where the signal is converted into a record signal to be recorded on the magnetic tape. After passing through the recording/reproducing change-over switch 83, the signal is supplied to a head in the running control unit 77 and recorded on the tape. A control unit 95 controls a motor drive servo circuit 76 to drive a motor in the running control unit 77, thereby starting tape running for recording and generating, at the same time, a control pulse which is a reference signal used for the speed control of the tape running.

Data from a program data memory 94 and an index signal released periodically from he control unit 95 are multiplexed into a time train by means of a data multiplexer 96 and superimposed on a control signal, as a change in duly, in the control record signal processor 74. This signal is then recorded on the tape by means of the control head of the running control unit 77. The above-mentioned data from the program data memory 94 are a cassette tape No., the number of programs, recording time and date, TV channel, class, record starting address, character code and others. The data multiplexer 96 merges a part of data from the program data memory 94 on an index signal from the control unit 95 by time-division multiplexing with a specified format.

Figure 15:
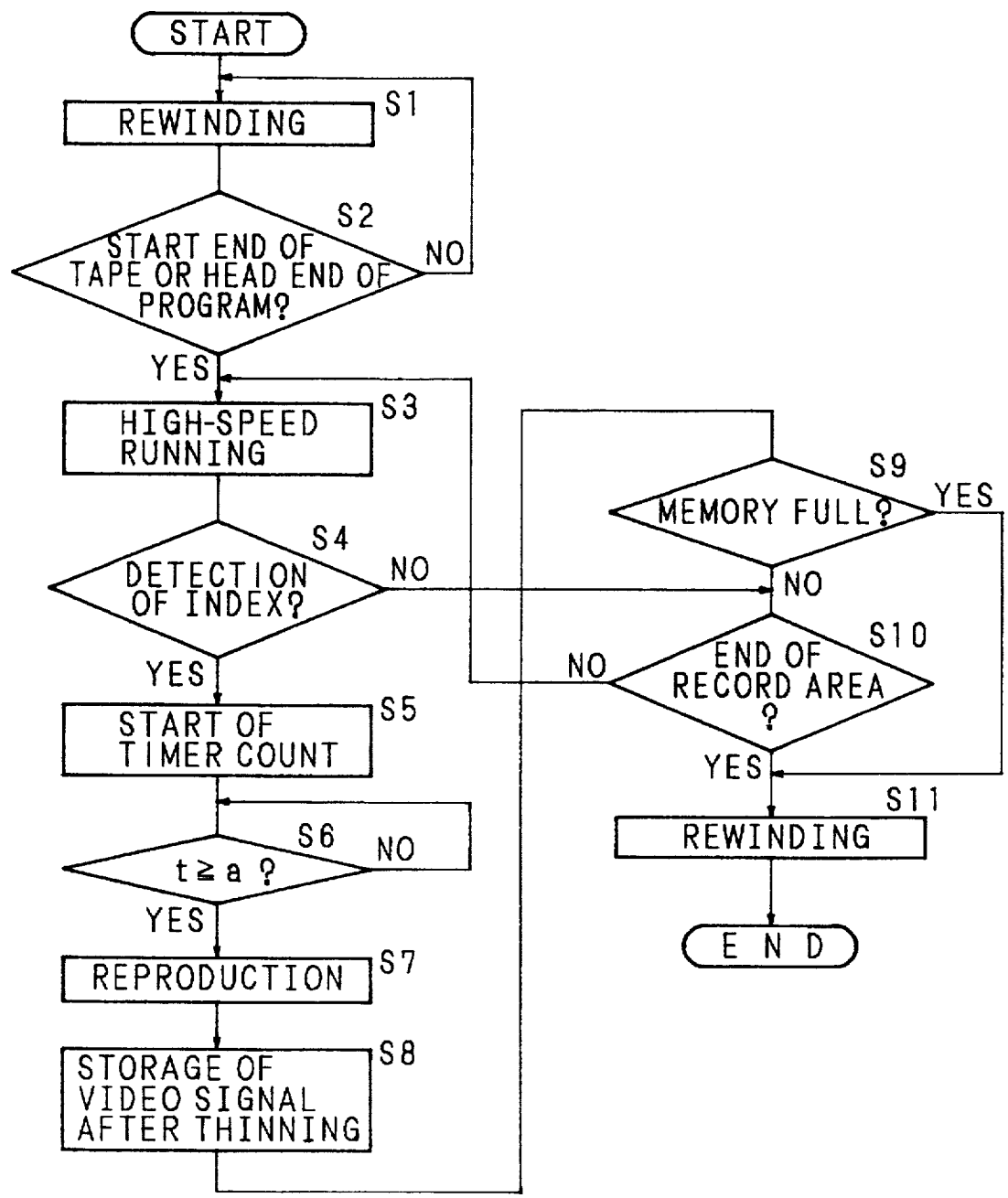
FIG. 15 is a flow chart showing a control flow at the time of preparing the multi-screen.

In the magnetic recording and reproducing apparatus of this embodiment, just after the tape has started its running for recording, the control unit 95 generates an index signal and data are recorded or, the tape in the above-described manner. Since the process, in which the control unit 95 prepares a multi-screen rot retrieval from a tape having programs recorded thereon, constitutes a characteristic feature of this embodiment, it will be hereinafter described in detail with reference to the flowchart of FIG. 15 showing the control process of the control unit 95.

The control unit, 95 controls the motor drive servo circuit, 76 to actuate the running control unit 77 such that a tape in which programs are recorded is rewound up to the head end of a program or the state end of the tape (S1). The rewinding is completed upon detection of an index signal from the head end of the program or a leader provided at the start end of the tape (S2). Thereafter, reproducing or high-speed running is executed (S3), and signals from the control head of the running control unit 77 are supplied to the control signal duty discriminating circuit 73 where detection of an index signal is performed (S4). Upon detection of an index signal, the control unit 95 allows a timer for running-time provided in a timer 98 to start counting, after being reset (S5). The output t of the timer for running time is compared with a specified value a (S6), and when the former exceeds the latter, the control unit 95 allows the apparatus to be in "reproducing" mode (S7). A signal from the head of the running control unit 77 is supplied to the reproducing circuit 79 by way of the recording/reproducing change-over switch 83. At the reproducing circuit 75, the signal is converted into a video signal to be released. After passing through the output change-over switch 86, the signal is supplied to the superimposing circuit 93 where a video signal of a character pattern corresponding to data from the program data memory 94 is added to the signal. Thereafter, the signal is supplied to the TV receiver 78 and stored in the video signal memory 79 (S8).

The above constant a is a time difference corresponding a distance on the tape between the position where an index has been detected and the position where an image, to be stored in the memory is sampled. The purpose of setting the constant a is to prepare a multi-screen which does not include commercials. In a tape in which broadcasts are recorded by timer recording, the starting part of a broadcast is mostly occupied by commercial images. When preparing a multi-screen from such a tape, in order to avoid including commercial images on a multi-screen, the following method is taken: an index is automatically recorded at the start of recording, and in reproducing, after tape running has been executed for a predetermined time after detection of an index, a video signal is stored in the memory to prepare a multi-screen. Further, the the screen of a program can be stored in the multi-screen, by appropriately setting the value of the constant a in accordance with the program. This arrangement eliminates the need for index input operation which is required for a previous apparatus, so that the multi-screen preparation for retrieval can be greatly simplified. When storing a video signal in the memory, the memory control circuit 80 thins data to be written in the memory, so that the reduced video signal is stored in the memory. Thereafter, the tape is run again, and when an index is detected in the tape running, the memory control circuit 80 allows an reproduced video signal to be stored at a different address in the video signal memory 79, and the multi-screen is accordingly arranged. When all the addresses are filled with images (S9) or when the signal recording regions of the tape are used up (S10), the control unit 95 rewinds the tape up to the head end of a program or the start end of the tape (S11), thereby completing the multi-screen preparation. Whether or not the recording regions or the tape are used up is determined by a known method for detecting the presence/absence of a control signal, or a method for detecting the presence/absence of a video synchronization signal in a reproduced signal.

In the case where the data stored in the video signal memory 79 are non-volatile, the multi-screen prepared with the above procedure can be immediately displayed for retrieval operation even if the power source is turned on after turning off. Even in the case of volatile data, if the data are stored in e.g., the start end of the tape, the multi-screen can be reproduced repeatedly. Program retrieval using the multi-screen can be easily carried out with a known method. One example is such that one of the screens to which numbers are allocated is specified, and then high-speed running is performed until an index whose position from the start end of the tape is indicated by the number of the specified screen is reached.

FIG. 16 slows the screens according to the 5th embodiment. FIG. 16(a) shows a screen in which part of data in the program data memory 94 is displayed in a list. Specifically, program data in a part of the memory are displayed in order with a cassette number and this list is used for selecting a cassette having a desired program from a plurality of cassette tapes. On the screen, the data of 4 cassette tapes are displayed, and the display items are a cassette No., recording date, class and character data when named from the left.

Figure 16B:
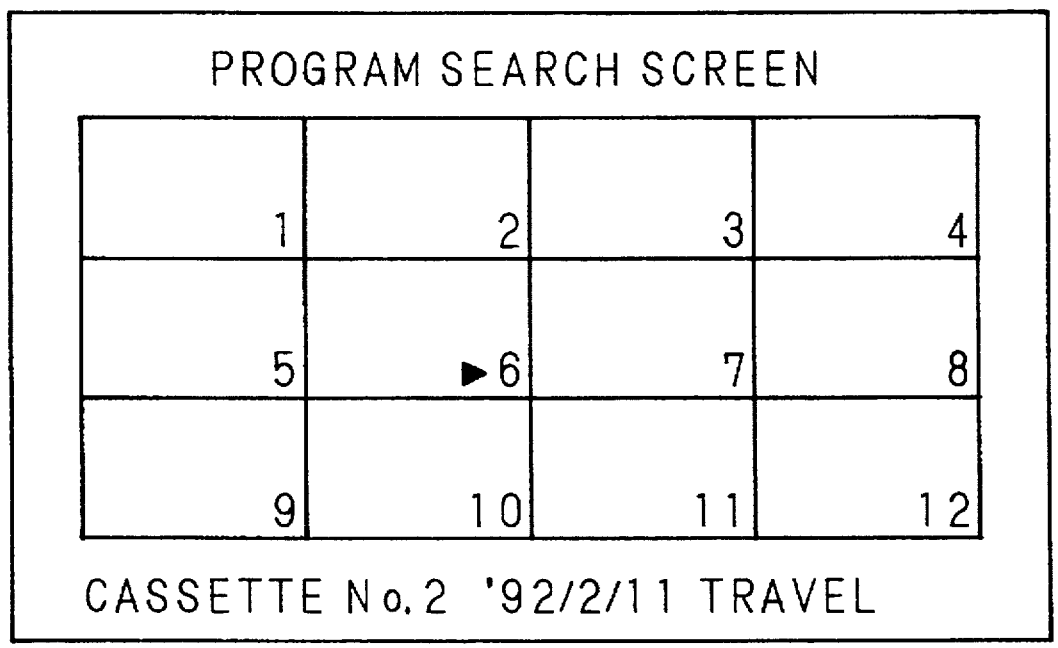
FIG. 16(b) is a diagram showing a screen.

FIG. 16(b) shows a display by the use of a multi-screen. The multi-screen has small screen areas to which 1 to 12 are allocated. In each small screen, a part of video signals constituting a program which has been recorded on a tape is displayed. A screen showing a desired program is selected from the list, thereby retrieving the program. In FIG. 16(b), the 6th small screen is selected and if retrieval is started in this situation, the tape is run until the 6th index from the start end of the tape is reached. The characters displayed at the bottom space are created by superimposing a part of data in the program data memory 94 on the video signal at the superimposing circuit 93. In addition to the data of the multi-screen, character data are displayed, thereby offering more convenience for retrieval.

(Embodiment 7)

Figure 17:
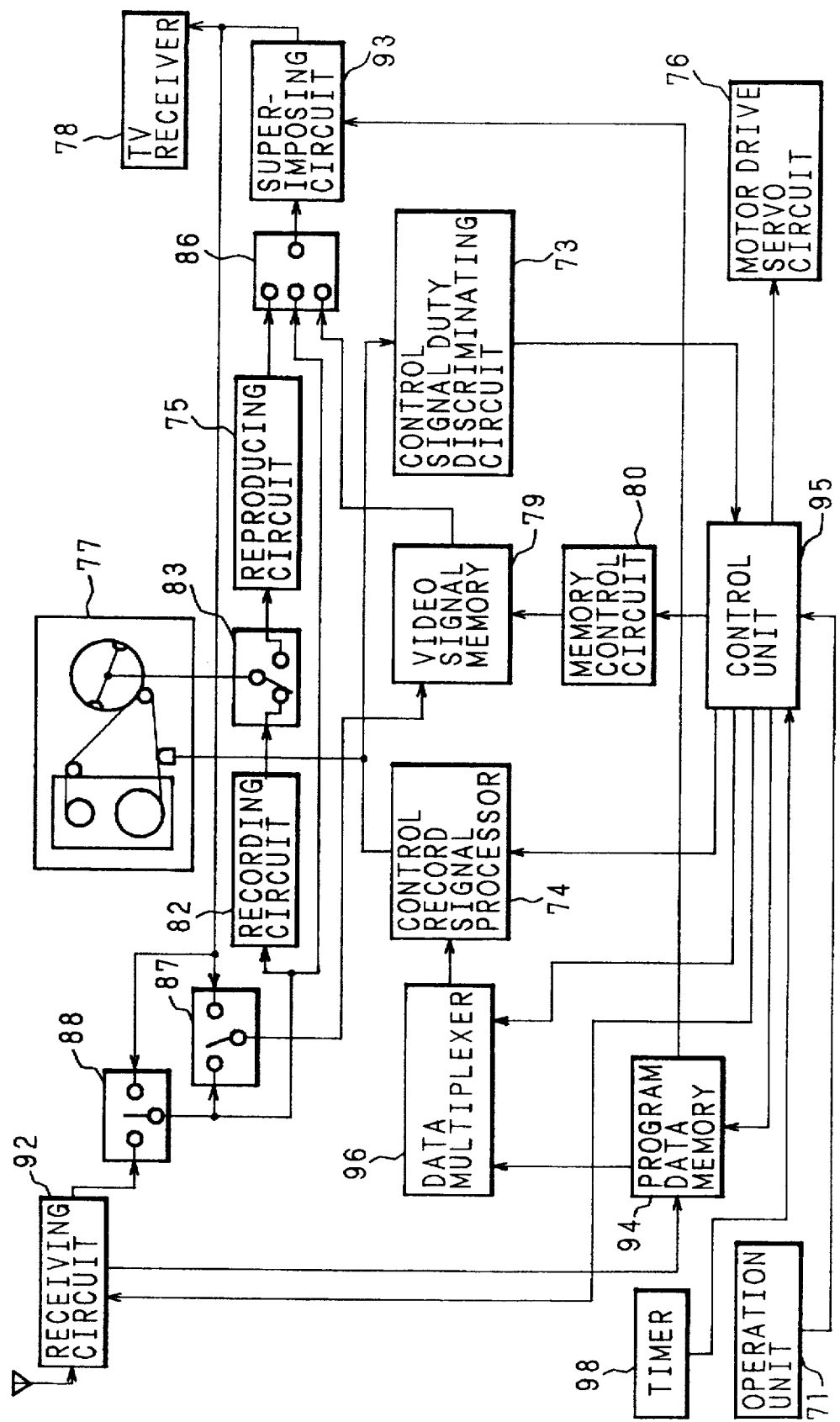
FIG. 17 is a block diagram showing the structure of still another magnetic recording and reproducing apparatus according to the invention.

The structure of the magnetic recording and reproducing apparatus of a 7th embodiment is as shown in FIG. 17. When recording broadcast signals on a tape, a record signal selection switch 88 selects (i) a signal from the receiving circuit 92 for TV broadcast, or (ii) an output signal coming from the video signal memory 79 by way of the switch 86 and the superimposing circuit 93. The output of the record signal selection switch 88 is supplied to the recording circuit 82 where the signal is converted into a record signal to be recorded on the magnetic tape. After passing through the recording/reproducing change-over switch 83, the signal is supplied to the head in the running control unit 77 and recorded on the tape. The control unit 95 controls a motor drive servo circuit 76 to drive the motor in the running control unit 77, thereby starting tape running for recording and generating, at the same time, a control pulse which is a reference signal used for the speed control of the tape running.

Data from the program data memory 94 and an index signal released on occasion from the control unit 95 is multiplexed into a time train by means of the data multiplexer 96 and superimposed on a control signal, as a change in duty, in the control record signal processor 74. This signal is recorded on the tape by means of the control head of the running control unit 77. The above-mentioned data from the program data memory 94 are a cassette tape No., the number of programs, recording time and date, TV channel, class, record starting address, character code and others. The data multiplexer 96 merges a part of data from program data memory 94 on an index signal from the control unit 95 by time-division multiplexing with a specified format.

The receiving circuit 92 demodulates a video signal and audio signal of a TV broadcast at the same time. At that time, the receiving circuit 92 detects whether the audio mode of the broadcast is "monophonic", "stereo" or "bilingual" and sends the detection result to the control unit 95. In one program, the broadcast audio mode is generally unchanged, for example, a news program is broadcast in "monophonic" mode without a change, a musical program is in "stereo" mode and a foreign film is in "bilingual". The mode is changed only at the start of a commentary or a commercial, or upon completion of them, such a commentary and commercial being inserted before and/or after the program. On the other hand, when recording a program for the purpose of a time shift, records generally include commercials. For this reason, an image taken from the record starting point cannot be used for a multi-screen for retrieval. However, it is understood that the time when the audio mode is changed is the starting point of a program. Taking a foreign film for example, the film starts at the time when the audio mode is changed to "bilingual" mode from any other mode. Therefore, a multi-screen may be prepared using an image taken from the above changing point.

Figure 18:
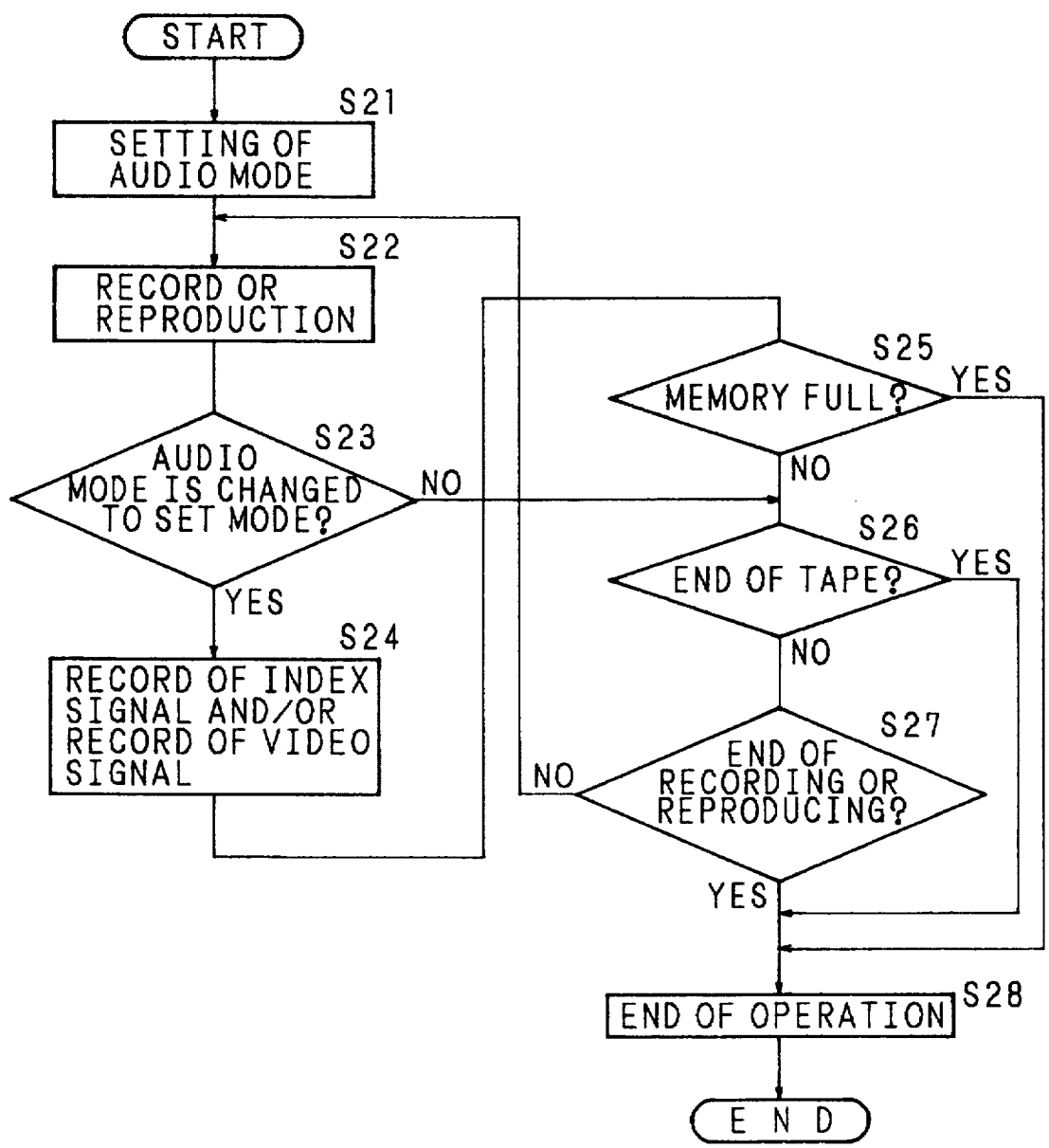
FIG. 18 is a flow chart of another control flow at the time of preparing the multi-screen.

Since the process, in which the control unit 95 prepares a multi-screen for retrieval during recording or reproducing of a program, constitutes a characteristic feature of this embodiment, it will be hereinafter described in detail with reference to the flowchart of FIG. 18 showing the control process of the control unit 95. There are 3 ways for preparing a multi-screen as follows:

1. during recording operation, recording of indexes and multi-screen preparation are performed;
2. recording of indexes is performed during recording operation and a multi-screen is prepared using reproduced images of indexed positions during reproducing operation; and
3. during reproducing operation, recording of indexes and multi-screen preparation are performed. Of the above ways, the second multi-screen preparation method is widely known and therefore, other two will be described together referring to FIG. 18. In the first method, a multi-screen is prepared from record signals so that it has a better image quality than that of the case where a multi-screen is prepared from reproduced signals. In the second method, it is possible to prepare multi-screen after confirming the presence/absence of an index and its position. This convenient particularly when the broadcast audio mode is unknown. The third method is suited for the case where one multi-screen is prepared from programs which have been recorded a plurality of times. One of these methods is suitably selected by the user, and according to the selection, a memory input change-over switch 87 selects a record signal or reproduced signal as a source signal for the multi-screen.

When preparing a multi-screen, firstly an audio mode is set for recording indexes (S21). Then, recording or reproducing is performed (S22) and the change of audio mode is detected (S23). In recording, the control unit 95 detects the change of audio mode by an audio mode signal from the receiving circuit 92 and in reproducing it detects the change by the change of audio mode data superimposed on e.g. a control signal. When the audio mode is changed to a specified mode, an index signal is recorded and/or a video signal is reduced and stored in the memory (S24). When all the memory is filled with images (S25), or when the signal recording regions of the tape is used up (S26), or when the recording or reproducing is completed (S27), the control unit 95 records an index and/or terminates the reduced-recording of video signals in the memory (28).

In the case where the data stored in the video signal memory 79 are non-volatile, the multi-screen prepared with the above procedure can be immediately displayed for retrieval operation even if the power source is turned on after turning off. Even in the case of volatile data, if the data are stored in e.g., the start end of the tape, the multi-screen can be reproduced repeatedly. Program retrieval using the multi-screen can be easily carried out with a known method. One example is such that one of the screens to which numbers are allocated is specified, and then high-speed running is performed until an index whose position from the start end of the tape is indicated by the number of the specified screen is reached.

The above-described display screen of the magnetic recording and reproducing apparatus of the 7th embodiment is similar to that shown in FIG. 16 which illustrates the 6th embodiment. Its structure and functions are also identical with those of the 6th embodiment.

(Embodiment 8)

Figure 19:
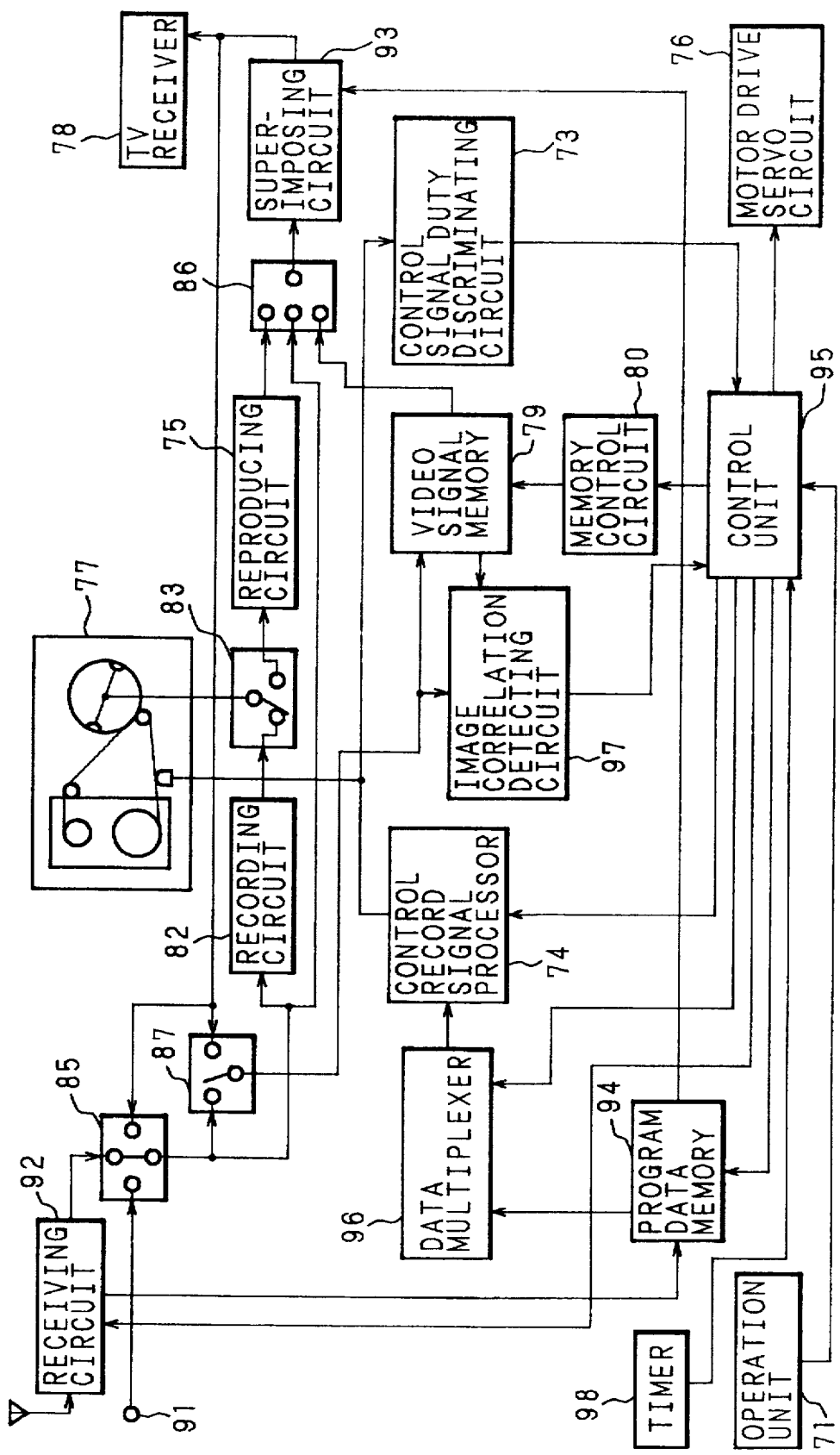
FIG. 19 is a block diagram showing the structure of still another magnetic recording and reproducing apparatus according to the invention.

The structure of the magnetic recording and reproducing apparatus of an 8th embodiment is as shown in FIG. 19. When recording data on tape, the record signal selection switch 85 selects, as an input signal, (i) a signal from an external input terminal 91, (ii) a signal from the receiving circuit 92 for TV broadcast, or (iii) an output signal coming from the video signal memory 79 by way of the switch 86 and the superimposing circuit 93. The output of the record signal selection switch 85 is supplied to the recording circuit 82 where the signal is converted into a record signal to be recorded on the magnetic tape. After passing through the recording/reproducing change-over switch 83, the signal is supplied to the head in the running control unit 77 and recorded on the tape. The control unit 95 controls a motor drive servo circuit 76 to drive the motor in the running control unit 77, thereby starting tape running for recording and generating, at the same time, a control pulse which is a reference signal used for the speed control of the tape running.

Data from the program data memory 94 and an index signal released periodically from the control unit 95 are multiplexed into a time train by means of the data multiplexer 96 and superimposed on a control signal, as a change in duty, in the control record signal processor 74. This signal is recorded on the tape by means of the control head of the running control unit 77. The above-mentioned data from the program data memory 94 are a cassette tape No., the number of programs, recording time and date, TV channel, class, record starting address, character code and others. The data multiplexer 96 merges a part of data from the program data memory 94 on an index signal from the control unit 95 by time-division multiplexing with a specified format.

The signal selected by the memory input change-over switch 87 is supplied to the video signal memory 79 and an image correlation detecting circuit 97. The image entered in the video signal memory 79 is stored in an unused recording region in the memory, and is released after one frame to the image correlation detecting circuit 97. The image correlation detecting circuit 97 obtains a correlation between a signal from the memory input change-over switch 87 and a signal from the video signal memory 79, and sends the obtained value to the control unit 95.

Figure 20:
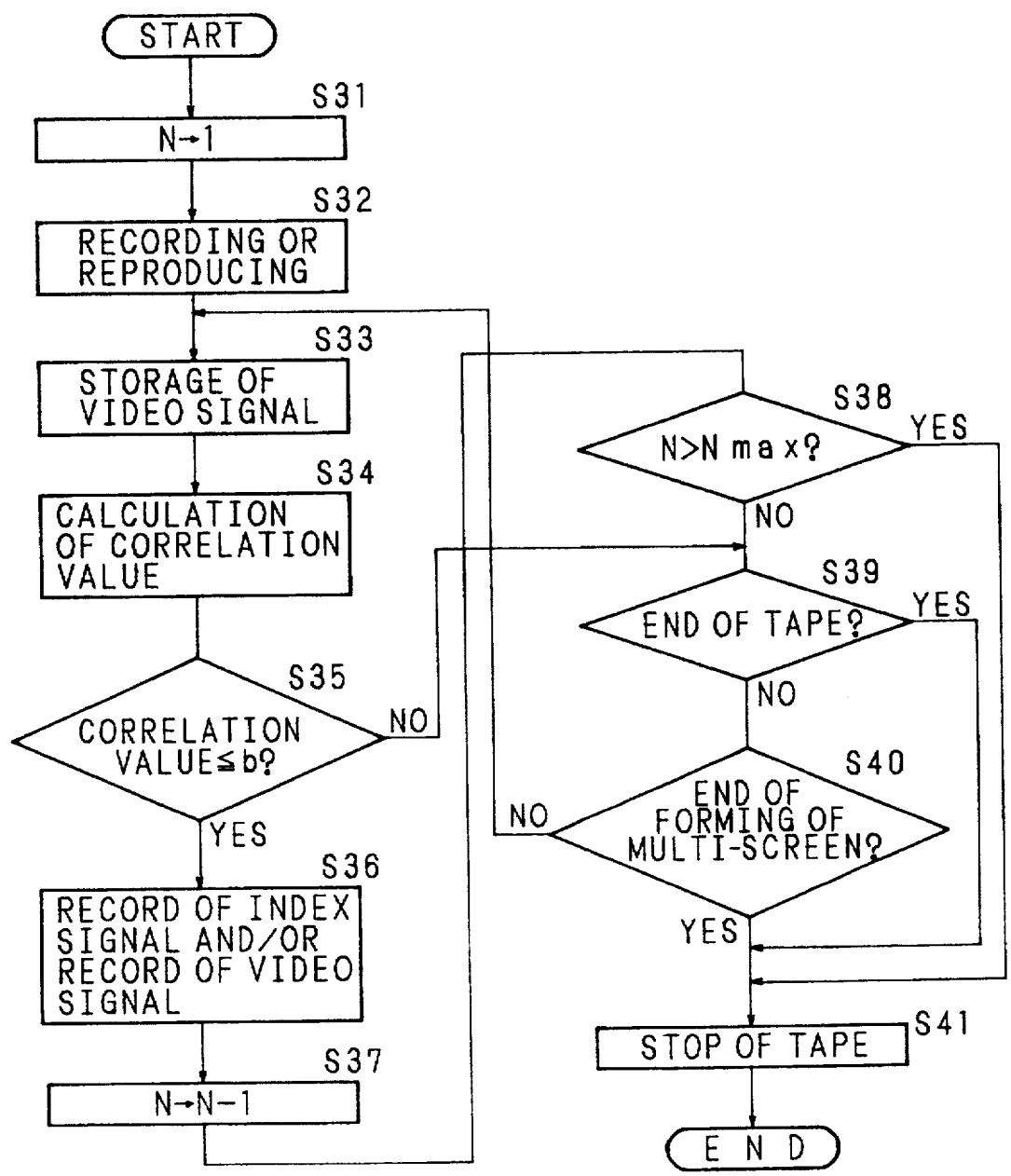
FIG. 20 is a flow chart of still another control flow at the time of preparing the multi-screen.

Since the process, in which the control unit 95 prepares a multi-screen for retrieval during recording or reproducing of a program, constitutes a characteristic feature of this embodiment, it will be hereinafter described in detail with reference to the flowchart of FIG. 20 which shows the control process of the control unit 95. There are 3 ways for preparing a multi-screen as follows:

1. during the recording operation, the recording of indices and multi-screen preparation are performed;
2. recording of indices is performed during the recording operation and a multi-screen is prepared using reproduced images of indexed positions during reproducing operation; and
3. during the reproducing operation, recording of indexes and multi-screen preparation are performed.

Of the above methods, the second multi-screen preparation method is widely known and therefore, the other two methods will be described together referring to FIG. 20.

In the first method, a multi-screen is prepared from record signals so that it has a better image quality than that of the case where a multi-screen is prepared from reproduced signals. It has another advantage in that it does not need extra time for the multi-screen preparation.

In the second method, it is possible to prepare a multi-screen after confirming the presence/absence of an index and its position. This is convenient particularly when the contents of a program are unknown.

The third method is suited for the case where one multi-screen is prepared from programs which have been recorded a plurality of times. One of these methods is suitably selected by the user, and according to the selection, the memory input change-over switch 87 selects a record signal or reproduced signal as a source signal for the multi-screen.

When preparing a multi-screen, the number of small screens Nmax in the multi-screen is specified and the value N of an order number counter for small screens in which data are to be written (S31). Then, recording or reproducing is performed (S32), and a signal to be supplied to the video signal memory 79 is stored in an N-th small screen of the memory (S33).

The data which have been stored in the N-th small screen of the video signal memory 79 are released to the image correlation detecting circuit 97, the timing of which coincides with the timing of the next image frame. The image correlation detecting circuit 97 obtains a correlation between a signal from the memory input change-over switch 87 and a signal from the video signal memory 79 (S34), and the correlation value is sent to the control unit 95. The control unit 95 determines whether or not the image correlation value supplied from the image correlation detecting circuit 97 is not more than a specified value b (S35). If it is no more than the specified value b, an index is recorded on the tape and/or the following video signal is stored in the N-th small screen of the memory (S36), 1 is added to the order number counter N for the small screens (S37), and it is determined whether or not the counter value at that time exceeds Nmax (S38). If not, it is determined whether the tape end has been reached (S39). If the tape end is not reached, it is determined whether or not recording or reproducing is completed (S40). If not, the process goes back to S33, and the multi-screen preparation is continued. When the operation is completed at S40, when the counter value exceeds Nmax at S38, and when the tape end is reached at S39, the tape running is stopped (S41), thereby completing the multi-screen preparation.

In the case where the data stored in the video signal memory 79 are non-volatile, the multi-screen prepared with the above procedure can be immediately displayed for retrieval operation even if the power source is turned on after turning off. Even in the case of volatile data, if the data are stored in e.g., the start end of the tape, the multi-screen can be reproduced repeatedly. Program retrieval using the multi-screen can be easily carried out with a known method. One example is such that one of the screens to which numbers are allocated is specified, and then high-speed running is performed until an index whose position from the start end of the tape is indicated by the number of the specified screen is reached.

The above-described display screen of the magnetic recording and reproducing apparatus of the 8th embodiment is similar to that shown in FIG. 16 which shows the 6th embodiment. Its structure and functions are also identical with those of the 6th embodiment.

(Embodiment 9)

Figure 21:
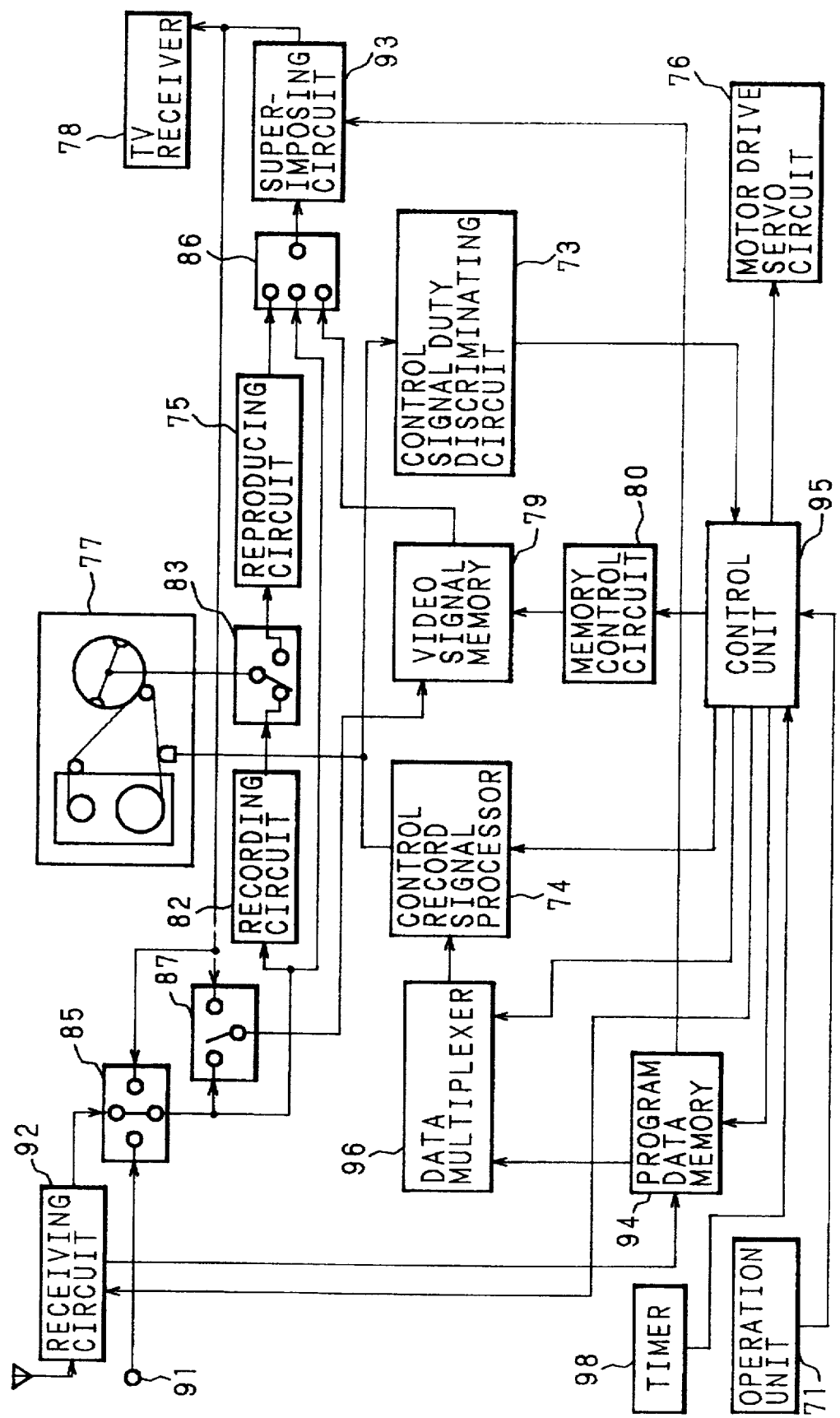
FIG. 21 is a block diagram showing the structure of yet another magnetic recording and reproducing apparatus according to the invention.

The structure of the magnetic recording and reproducing apparatus of a 9th embodiment is as shown in FIG. 21. When recording data on a tape, the record signal selection switch 85 selects, as an input signal, (i) a signal from an external input terminal 91, (ii) a signal from the receiving circuit 92, or (iii) an output signal coming from the video signal memory 79 by way of the switch 86 and the superimposing circuit 93. The output of the record signal selection switch 85 is supplied to the recording circuit 82 where the signal is converted into a record signal to be recorded on the magnetic tape. After passing through the recording/reproducing change-over switch 83, the signal is supplied to the head in the running control unit 77 and recorded on the tape. The control unit 95 controls a motor drive servo circuit 76 to drive the motor in the running control unit 77, thereby starting tape running for recording and generating, at the same time, a control pulse which is a reference signal used for the speed control of the tape running.

Data from the program data memory 94 and an index signal released on occasion From the control unit 95 are multiplexed into a time train by means of the data multiplexer 96 and superimposed on a control signal as a change in the duty ratio in the control record signal processor 74 so as to be recorded on the tape by means of the control head of the running control unit 77. The above-mentioned data from the program data memory 94 are a cassette tape No., the number of programs, recording time and date, TV channel, class, record starting address, character code and others. The data multiplexer 96 merges a part of data in the program data memory 94 with an index signal from the control unit 95 by time-division multiplexing with a specified format. A signal selected by the memory input change-over switch 87 is supplied to the video signal memory 79 to be stored therein. In the case of timer recording, a starting time and a completion time for timer recording and a TV channel are input through the operation unit 71, and such data are stored in the program data memory 94. Of the above data, the time data are compared with a time obtained from the timer circuit 98 at the control unit 95, and when they coincides with a time from the timer, specified control operations are respectively performed.

Figure 22:
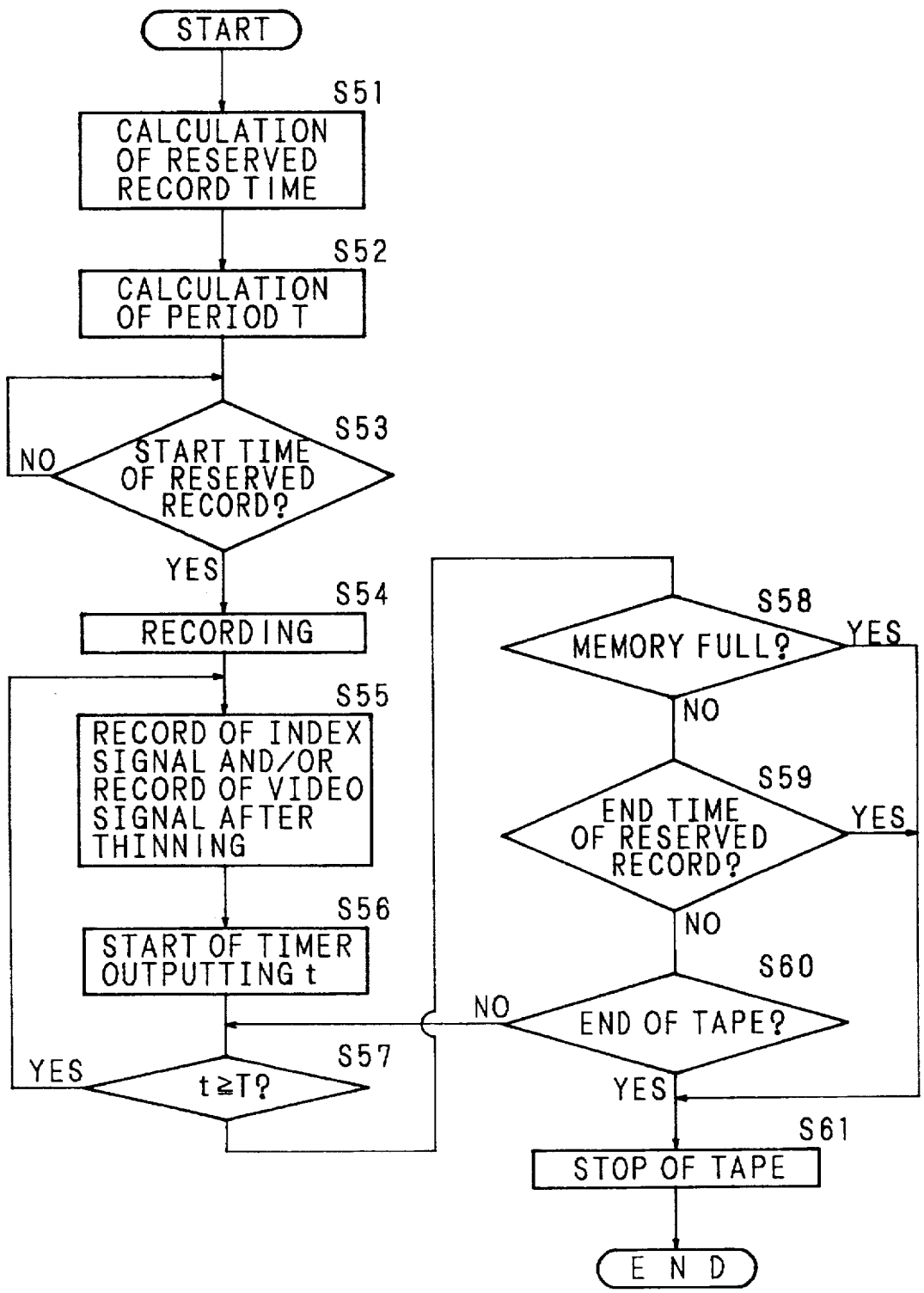
FIG. 22 is a flow chart of still another control flow at the time of preparing the multi-screen.

Since the process, in which the control unit 95 prepares a multi-screen for retrieval during recording or reproducing of a program, constitutes a characteristic feature of this embodiment, it will be hereinafter described in detail with reference to the flowchart of FIG. 22 which shows the control process of the control unit 95. There are 2 ways for preparing a multi-screen as follows:

1. during recording operation, recording of indexes and multi-screen preparation are performed; and
2. recording of indexes is performed during recording operation and a multi-screen is prepared using reproduced images of indexed positions during reproducing. Of these ways, the second multi-screen preparation method is widely known and therefore, the other method will be described referring to FIG. 22.

In the first method, a multi-screen is prepared from record signals so that it has a better image quality than that of the case where a multi-screen is prepared from reproduced signals. It has another in that it does not need extra time for the multi-screen preparation.

The second method is convenient particularly in the case where the data in the video signal memory are volatile. One of these methods is suitably selected by the user, and according to the selection, a memory input change-over switch 87 selects a record signal or reproduced signal as a source signal for the multi-screen.

When preparing a multi-screen from programs to be recorded by timer recording, a timer recording time firstly is obtained from the starting time and completion time for timer recording (S51). Then, (timer recording time/the number of small screens in the multi-screen) is calculated and the answer is set to be a cycle T (S52). After a wait-time has been elapsed (S53), recording is started (S54), and an index is recorded and/or a video signal is stored in an unused recording region of the memory, being reduced (S55). At this stage, a timer whose output is t is reset to start its operation (S56). The output t is compared with the cycle T (S57), and if t exceeds T, the procedure proceeds to S55, whereby indexes are arranged at equal intervals and/or the multi-screen is prepared. If t is less than T, it is determined whether or not there is an unused recording region in the video memory (S58), and if it exists, it is determined whether or not the completion time for the timer-recording is reached (S59). If not, it is determined whether or not the last end of the recording tape is reached (S60), and if not, the procedure proceeds to S57. When it is determined that there is no unused recording region at S58, when the completion time for the timer recording is reached at S59, and when the last end of the tape is reached at S60, the recording is completed (S61).

In the case where the data stored in the video signal memory 79 are non-volatile, the multi-screen prepared with the above procedure can be immediately displayed for retrieval operation even if the power source is turned on after turning off. Even in the case of volatile data, if the data are stored in e.g., the start end of the tape, the multi-screen can be reproduced repeatedly. Program retrieval using the multi-screen can be easily carried out with a known method. One example is such that one of the screens to which numbers are allocated is specified, and then high-speed running is performed until an index whose position from the start end of the tape is indicated by the number of the specified screen is reached.

The above-described display screen of the magnetic recording and reproducing apparatus of the 9th embodiment is similar to that shown in FIG. 16 which illustrates the 6th embodiment. Its structure and functions are also identical with those of the 6th embodiment.

(Embodiment 10)

Figure 23:
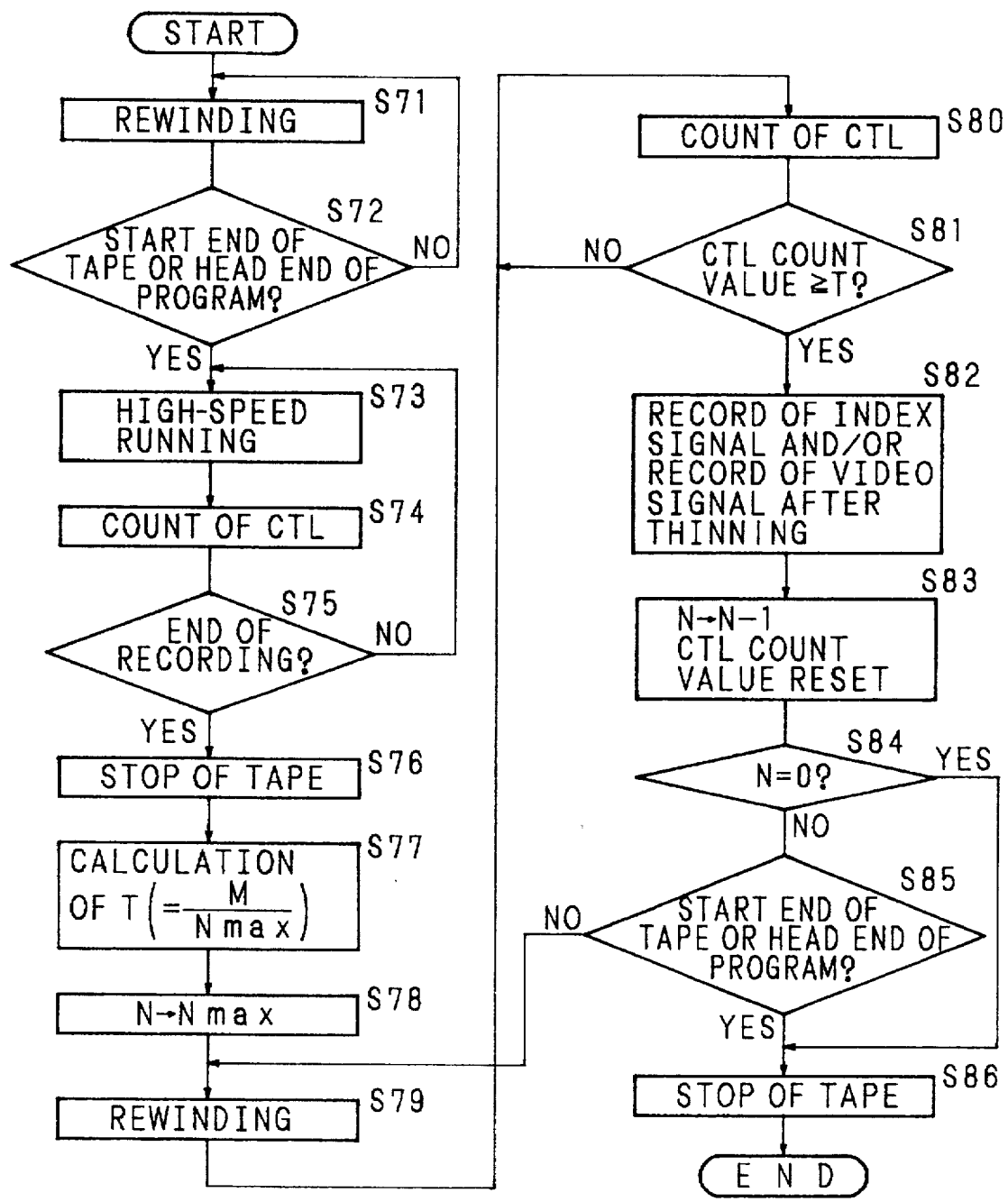
FIG. 23 is a flow chart of still another control flow at the time of preparing the multi-screen.

The structure of the magnetic recording and reproducing apparatus of a 10th embodiment is substantially similar to that of the 9th embodiment shown in FIG. 21. Therefore, the description of members having the same functions will be omitted and members having different functions will be explained hereinbelow. Just after program recording has been started, the control unit 95 generates an index signal and sends it to the data multiplexer 96. The data multiplexer 96 merges data such as a cassette No. sent from the program data memory 94 with the index signal by time-division multiplexing. The data are then supplied to the control record signal processor 74 where they are converted into a control record signal to be recorded on the magnetic tape. The above procedure enables the tape to have programs each of which has an index recorded at the head end thereof. During program reproducing, the control unit 95 prepares a multi-screen and this procedure is characteristic of the invention. Therefore, it will be hereinafter described in detail with reference to the flowchart of FIG. 23 which illustrates the control process of the control unit 95.

After program recording has been completed, the tape is rewound (S71), and the start end of the tape or the head end of a program is detected (S72). It is selectable which the start end or the head end will be detected. The head end of a program is detected by an index. When either of them is detected, high-speed running is executed (S73), counting of control signals is executed (S74), and the last end of the program is detected (S75). Upon detection of the last end, the system is stopped (S76) and the value T is obtained from the following equation (S77): T=(a product count value M of the above control signals)−(the number of small screens Nmax in the multi-screen). Then, the value of a write-in small screen number counter N is set to Nmax (S78), and the rewinding of the tape is executed (S79) while the control signals are counted (S80). Thereafter, the count value is compared with the value T (S81). If the count value is T or more, an index is recorded and/or image is a reproduced thinned to be stored in the N-th screen of the video signal memory (S82), and 1 is subtracted from the value N and the control signal counter is reset (883). Then, it is determined whether or not the valise N is zero (S84), and if not, the start end of the tape or the head end of the program is detected (S85). If either of them is not detected, the program goes back to S79. When N=0 at S84 and when the start end or the head end is detected at S85, the tape running is stopped (S86), thereby completing the multi-screen preparation.

There are the following two cases at S82:

(1) the multi-screen is stored at the same time that an index is recorded; and (2) the multi-screen is stored.

The first case is suitable particularly when one of a plurality of programs is intended to be confirmed and retrieved, and when a tape whose recording contents are not known and on which no index is recorded is used. Even in such as case, a multi-screen which enables viewing and retrieving of the contents can be prepared. The second case is suited for the case where a specified program is not retrieved but the contents of records in the tape are confirmed, and does not require recording of indexes. Either of these cases can be selectively used.

In the case where the data stored in the video signal memory 79 are non-volatile, the multi-screen prepared with the above procedure can be immediately displayed for retrieval operation even if the power source is turned on after turning off. Even in the case of volatile data, if the data are stored in e.g., the start end of a program, the multi-screen can be reproduced repeatedly. Program retrieval using the multi-screen can be easily carried out with a known method. One example is such that one of the screens to which numbers are allocated is specified, and then high-speed running is performed until an index whose position from the start end of the tape is indicated by the number of the specified screen is reached.

The above-described display screen of the magnetic recording and reproducing apparatus of the 10th embodiment is similar to that shown in FIG. 16 which illustrates the 6th embodiment. Its structure and functions are also identical with those of the 6th embodiment.

(Embodiment 11)

Figure 24:
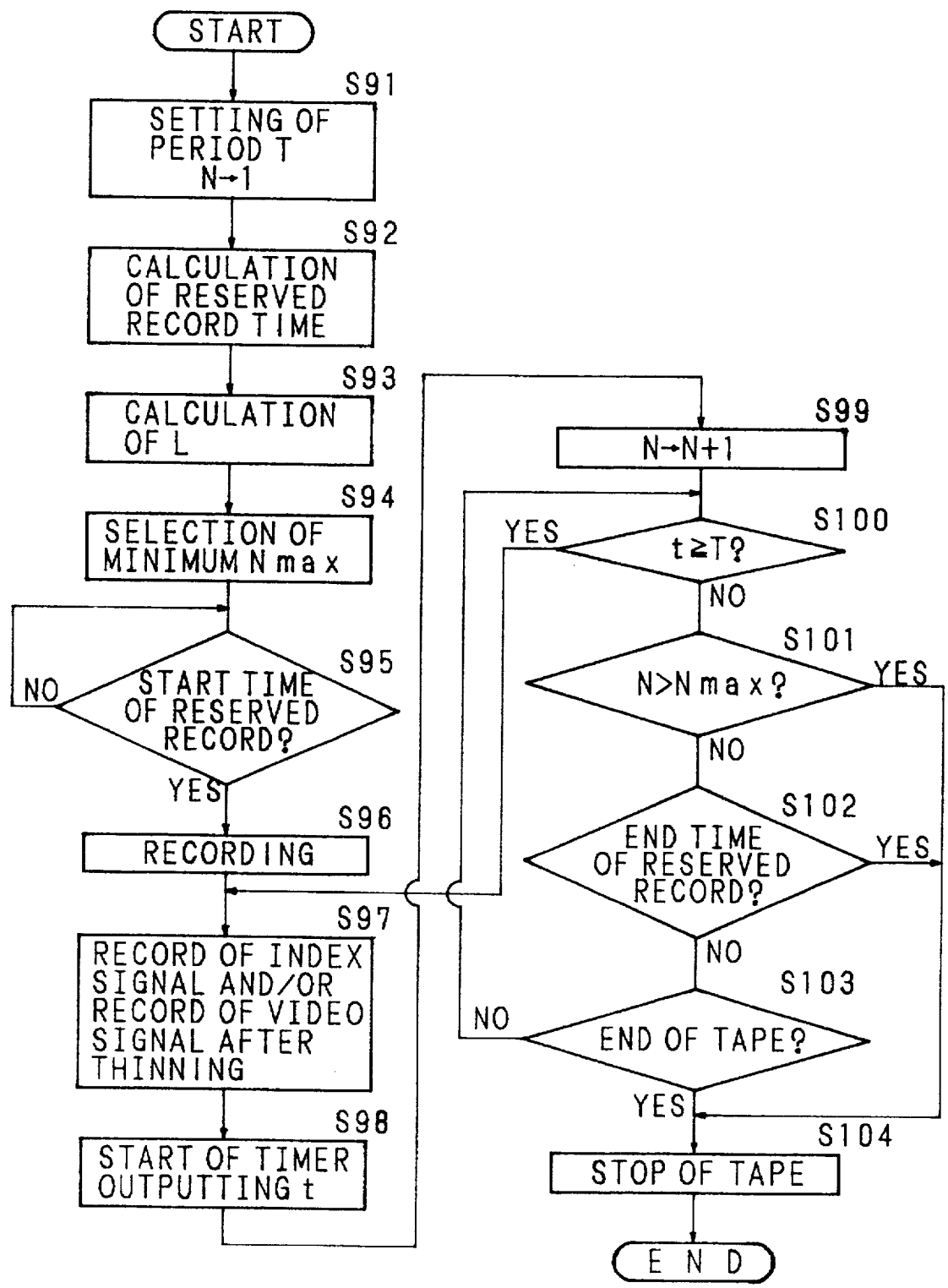
FIG. 24 is a flow chart of still another control flow at the time of preparing the multi-screen.

The structure of the magnetic recording and reproducing apparatus of an 11th embodiment is substantially similar to that of the 9th embodiment shown in FIG. 21. Therefore, the description of members having the same functions will be omitted and members having different functions will be explained hereinbelow. When executing timer recording, a starting time and a completion time for timer recording, and a TV channel are input through the operation unit 71. The above data are then stored in the program data memory 94. The procedure, in which the control unit 95 prepares a multi-screen for retrieval in timer recording, is characteristic of the invention, and therefore, it will be described in detail with reference to the flowchart of FIG. 24 which illustrates the control process of the control unit 95.

Firstly, the time cycle T for storing the multi-screen is set and the value of the small screen counter N is set to 1 (S91). A timer recording time is obtained from the timer recording starting time and completion time (S92), and L is obtained from the following equation: L=timer recording time/time cycle T (S93). The integer of L indicates the number of operations for storing data in the multi-screen. A maximum Nmax (L≦Nmax) is selected (S94). In the cases of the small screens as shown in FIG. 25, the values of Nmax are 4, 9 and 16 respectively. When L is 12.4 for example, 16 is selected as Nmax and the multi-screen shown in FIG. 25(c) is prepared. After a wait-time has elapsed (S95), recording is started (S96) and an index is recorded and/or a video signal is reduced to be stored in the N-th small screen of the memory (S97). The timer whose output is L is reset, thereby starting its operation (S98), and the small screen counter value N is incremented by 1 (S99). The timer value t is compared with the time cycle T (S100), and if t exceeds the cycle T, the procedure goes back to S97, whereby indexes are arranged at equal intervals and/or the multi-screen is prepared. If t is less than T, the small screen counter value N is compared with Nmax (S101). If N≦Nmax, it is determined whether or not the completion time for the timer recording is reached (S102). If not, it is determined whether or not the last end of the tape is reached (S103). If not, the procedure goes back to S100. When N>Nmax at S101, when the completion time for the timer recording is reached at S102, and when the last end of the tape is reached at S103, the timer recording is completed (S104).

There are the following two cases at S97:
(1) the multi-screen is stored at the same time that an index is recorded; and
(2) the multi-screen is stored.

The first case is suited for the case where one of programs to be recorded by timer recording is intended to be confirmed and retrieved. The second case is suited for the case where a specified program to be recorded by timer recording is not retrieved but the contents of records in the tape are confirmed, and does not require recording of indexes. Either of those cases can be selectively used.

In the case where the data stored in the video signal memory 79 are non-volatile, the multi-screen prepared with the above procedure can be immediately displayed for retrieval operation even if the power source is turned on after turning off. Even in the case of volatile data, if the data are stored in e.g., the start end of a program, the multi-screen can be reproduced repeatedly. Program retrieval using the multi-screen can be easily carried out with a known method. One example is such that one of the screens to which numbers are allocated is specified, and then high-speed running is performed until an index whose position from the start end of the tape is indicated by the number of the specified screen is reached.

In the display screen of the above-described magnetic recording and reproducing apparatus of the 11th embodiment, the number of small screens is varied as shown in FIG. 25, according to the lengths of programs to be recorded by timer recording and the recording cycle T of the multi-screen. For this reason, compared with the case where the number of small screens is fixed, the number of unnecessary small screens (i.e., the number of small screens which are not to be used) can be reduced, whereby the TV screen can be effectively used. Further, when there are a small number of small screens, the size of a small screen can be increased, thereby enabling easy confirmation of a program.

(Embodiment 12)

Figure 26:
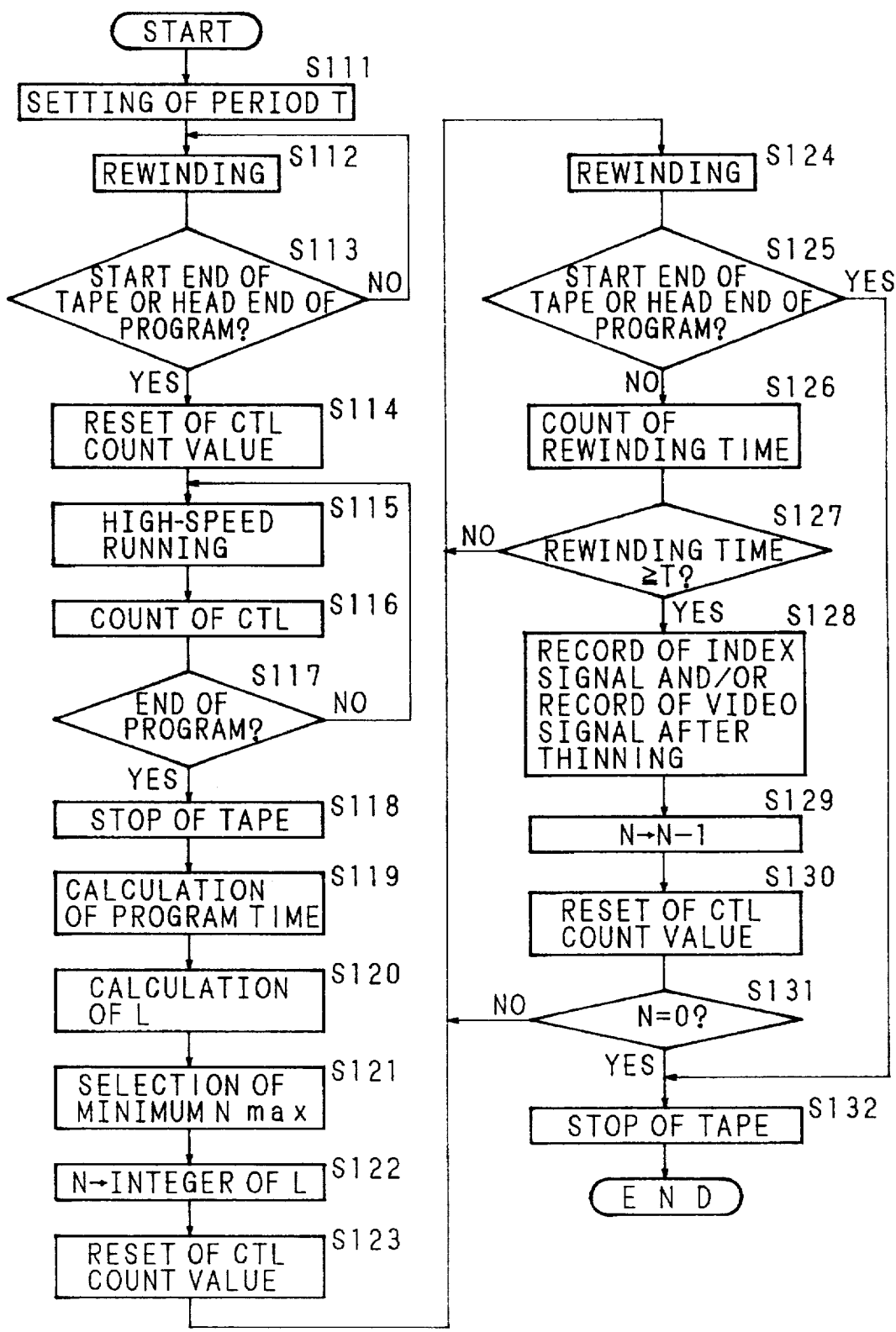
FIG. 26 is a flow chart of still another control flow at the time of preparing the multi-screen.

The structure of the magnetic recording and reproducing apparatus of a 12th embodiment is substantially similar to that of the 9th embodiment shown in FIG. 21. Therefore, the description of members having the same functions will be omitted and members having different functions will be explained hereinbelow. The control unit 95 generates an index signal just after the start of program recording and sends it to the data multiplexer 96. The data multiplexer 96 merges data such as a cassette No. etc. from the program data memory 94 with the above signal by time-division multiplexing and supplies it to the control record signal processor 74. The control record signal processor 74 converts the merged data into a control record signal to be recorded on the magnetic tape. With the above procedure, a tape in which an index is provided only at the head end of each program can be obtained. During reproducing of the program, the control unit 95 prepares a multi-screen and this procedure is characteristic of the invention. Therefore, it will be described in detail with reference to the flow chart of FIG. 26 which illustrates the control process of the control unit 95.

Firstly, the time cycle T for storing the multi-screen is set (S111). Then, rewinding of the tape is executed (S112) and the start end of the tape or the head end of a program is detected (S113). It is selectable which the start end or the head end is detected. The head end of a program is detected by an index. When either of these ends is detected, a control pulse counter is reset (S114), high-speed running is executed (S115), control signals are counted (S116) and the last end of the program is detected (S117). After detection of the last end, the system is stopped (S118) and a program time is obtained from the above count value of control signals (S119). Then, L is obtained from the equation L=(program time/time cycle T) (S120). The integer of L indicates the number of operations for storing data in the multi-screen. Then, the minimum value of Nmax (L≦Nmax) is selected (S121). The values of Nmax for the small screens shown in FIG. 25 are 4, 9 and 16 respectively. When L is 12.4 for example, Nmax=16 is selected and the multi-screen shown in FIG. 25(c) is prepared. Thereafter, the small screen counter value N is set to the integer of L (in the above example, the counter value is set to 12) (S122), and the control pulse counter is reset (S123). Then, rewinding of the tape is executed (S124), the start end of the tape or the head end of the program is detected (S125). If the start end or the head end is not detected, control signals are counted and from the count value, rewinding time is obtained (S126). It is determined whether or not the rewinding time is the time cycle T or more (S127), and if yes, an index is recorded and/or a video signal is reduced and stored in the N-th small screen of the memory (S128). Then, the small screen counter value N is decremented by 1 (S129), the counter for control signals is reset (130). It is determined whether or not the small screen counter value N is zero (S131), and if not, the procedure goes back to S124. When the start end of the tape or the head end of the program is detected at S125 and when the small counter value is zero at S131, the system is stopped (S132), thereby completing the multi-screen preparation.

There are the following two cases at S128:

(1) the multi-screen is stored at the same time that an index is recorded; and (2) the multi-screen is stored.

The first case is suited for the case where one of a plurality of programs which have been recorded is intended to be confirmed and retrieved. The second case is suited for the case where a program is not retrieved but the contents of records in the tape are confirmed, and does not require recording of indexes. Either of these cases can be selectively used.

In the case where the data stored in the video signal memory 79 are non-volatile, the multi-screen prepared with the above procedure can be immediately displayed for retrieval operation even if the power source is turned on after turning off. Even in the case of volatile data, if the data are stored in e.g., the head end of a program, the multi-screen can be reproduced repeatedly. Program retrieval using the multi-screen can be easily carried out with a known method. One example is such that one of the screens to which numbers are allocated is specified, and then high-speed running is performed until an index whose position from the head end of a program is indicated by the number off the specified screen is reached.

In the display screen of the above-described magnetic recording and reproducing apparatus according to the 12th embodiment, the number of small screens is varied as shown in FIG. 25 according to the lengths of programs to be recorded by timer-recording and the recording cycle T of the multi-screen. For this reason, compared with the case where the number of small screens is fixed, the number of small screens which are not to be used can be reduced, thereby effectively using the TV screen. Further, when there are a small number of small screens, the size of a small screen can be increased, thereby enabling easy confirmation of a program.

(Embodiment 13)

Figure 27:
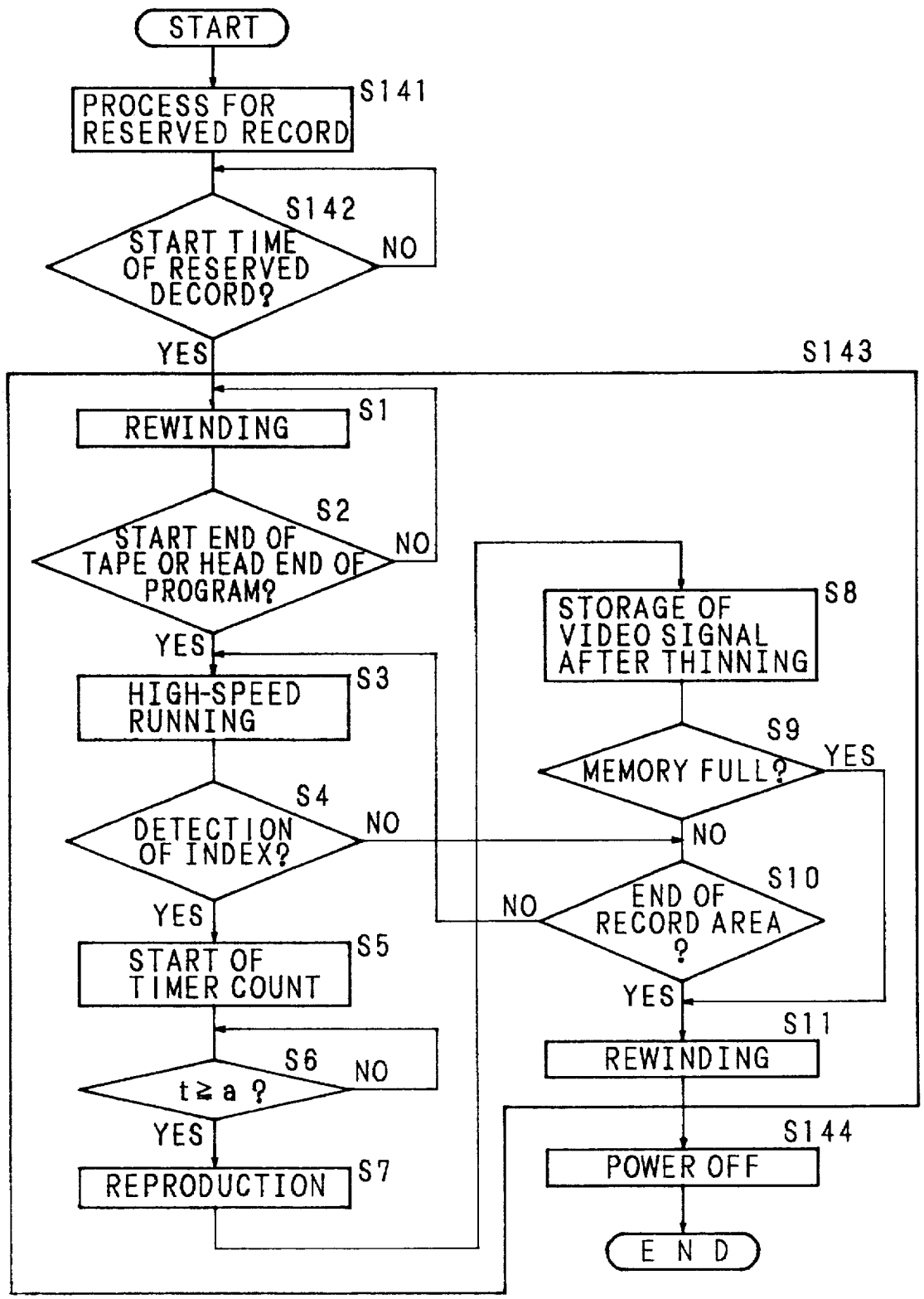
FIG. 27 is a flow chart of still another control flow at the time of preparing the multi-screen.

The magnetic recording and reproducing apparatus of a 13th embodiment is the same as any one of the magnetic recording and reproducing apparatus of the 6th to 12th embodiments, except, that it has the timer recording function and after setting of timer recording, the reproducing steps are automatically executed. The reproducing steps are the same as those which are executed during reproducing, and described in the multi-screen preparation performed by the control unit 95 in any one of the 6th to 12th embodiments. The structure of the apparatus of the 13th embodiment is shown in any one of FIGS. 14, 17, 19 and 21 which illustrate the 6th to 12th embodiments. The case where the 13th embodiment is applied to the 6th embodiment will be described with reference to FIG. 14. The description of members having the same functions as those of the 6th embodiment will be omitted and members having different function will be explained hereinbelow. The process, in which the control unit 95 prepares a multi-screen for retrieval, is characteristic of the invention, and therefore it will be described in detail referring to the flowchart of FIG. 27 which illustrates the control process of the control unit 95.

In timer recording, the control unit 95 generates an index signal just after the tape has started its running for recording. The data of the program data memory 94 and an index signal from the control unit 95 are merged by time-division multiplexing at the data multiplexer 96, and superimposed on a control signal, as a change in the duty ratio, at the control record signal processor 74. The above signal is recorded on the tape by the control head of the running control unit 77.

The above procedure is the same as that of the magnetic recording and reproducing apparatus of the 6th embodiment. The series of control processes performed by the control unit 95 in timer recording is represented by S141 in FIG. 27. After the step of S141, it is detected whether the timer recording is completed (S142). If the completion is detected, the power source is generally turned off, but in this invention, the procedure proceeds to S143. S143 is a step where a multi-screen is prepared from reproduced signals. In this example, S143 includes the flow of FIG. 15 which is shown as the control process of the control unit 95 of the 6th embodiment. After completion of S143, the power source is turned off (S144). When a plurality of programs are recorded by timer recording, the procedure proceeds to S143 after timer recording of the last program has been completed. In the 6th embodiment, S143 is executed by directing the system by the user to perform multi-screen preparation during other normal operation time than timer recording, and therefore the user has to wait until the multi-screen is prepared. However, in this embodiment, the multi-screen preparation is completed at the time when a normal operation is started by turning the power source on. This eliminates the need for such a wait-time.

In the case where the data stored in the video signal memory 79 are non-volatile, the multi-screen prepared with the above procedure can be immediately displayed for retrieval operation even if the power source is turned on after turning off. Even in the case of volatile data, if the data are stored in e.g., the start end of the tape, the multi-screen can be reproduced repeatedly. Program retrieval using the multi-screen can be easily carried out with a known method. One example is such that one of the screens to which numbers are allocated is specified, and then high-speed running is performed until an index whose position from the start end of the tape is indicated by the number of the specified screen is reached.

According to the 6th to 13th embodiments, a multi-screen used for program retrieval is automatically selected and stored so that such a troublesome operation that an index is manually input while reproducing a program and confirming its contents is no longer necessary. In the case where a multi-screen is prepared during recording with the procedure disclosed in the invention, the image quality does not deteriorate compared with the case where the multi-screen is prepared from reproduced signals. In the case where a multi-screen is prepared during an idle time after completion of timer recording with the procedure disclosed in the invention, the user does not need to wastefully wait until the multi-screen is prepared. In consequence, a very convenient magnetic recording and reproducing apparatus can be achieved.

In the 6th to 13th embodiments, the cases where the invention is applied to a video tape recorder having a control track have been described, but the invention can be applied to a video recorder of any type on condition that it is capable of recording and reproducing index signals. Further, the method for recording video signals and the method for recording index signals are not limited to the above examples, and those signals may be recorded in digital form or analog form.

(Embodiment 14)

Figure 28:
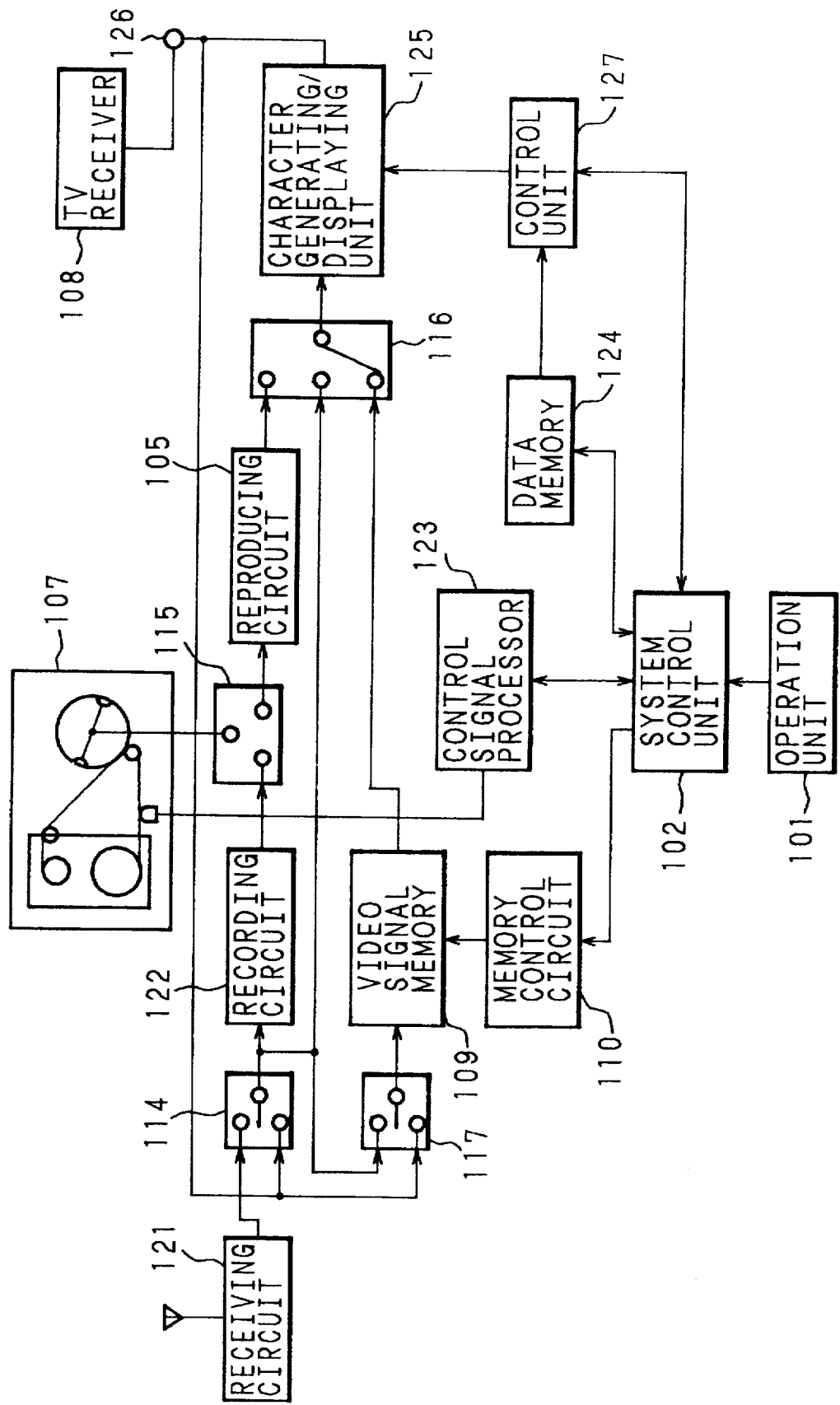
FIG. 28 is a block diagram showing the structure of yet another magnetic recording and reproducing apparatus according to the invention.

Since video signals and index signals recorded on a recording medium may be in analog form or digital form, a 14th embodiment can be applied to both of a digital video tape recorder and an analog video tape recorder. FIG. 28 shows a block diagram of the apparatus when the embodiment is applied to an analog video tape recorder having a control track.

In FIG. 28, in recording, a receiving circuit 121 for TV broadcast releases a receiving signal to a switch 114. Thereafter, the signal is supplied to a recording circuit 122 and converted into a signal to be recorded on the magnetic tape. After passing through a switch 115, the signal is recorded on the tape by the video head of a running control unit 107. At the start of recording, a system control unit 102 releases a write-in signal to a control signal processor 123, indicating to write an index signal for program retrieval. Upon receipt of the write-in signal, the control signal processor 123 superimposes an index signal on a control signal by changing the duty ratio of the control signal and releases it to the running control unit 107. The control head of the running control unit 107 records the signal on the tape. At the control signal processor 123, the product of control pulses from the start end of the tape is obtained to release to the system control unit 102. The system control unit 102 converts the product into an address value and stores it with the number of the corresponding program in a data memory 124, as address data for the start position of a program.

During program recording, when tape running has been temporarily suspended by the operation of the operation unit 101, or when index recording has been instructed, the system control unit 102 supplies a sub-index write-in signal to the control signal processor 123 so that a sub-index signal is recorded. In this case, the address value of the position where the sub-index is recorded is not stored in the data memory. The number of sub-indexes recorded in each program is counted at the system control unit 102, and upon completion of program recording, the number of sub-indexes is stored with the corresponding program No. in the data memory 124.

FIG. 29(a) shows part of the items of data in the data memory 124. The data memory 124 is provided with a data region for cassettes on which programs have been recorded, and in this data region, there are provided a data item region 162 for storing data of cassettes and a data item region 163 for storing data of programs. Program data in the region 163 are controlled by memory addresses 164 which correspond to program Nos. FIG. 29(b) shows one example when programs are recorded on a cassette having No. 18. A numerical value composed of 4 digits is stored in each column of "address" and the number of sub-indices in each program is stored in each column of "number of sub-indices". The 8th and later programs are not recorded and therefore the storage spaces for them remain initialized. Since the number of programs recorded on the cassette is seven, the data of the above spaces is not needed as a matter of course. The data memory 124 has regions as described above the number of which corresponds to the number of cassettes dealt by the system.

In FIG. 28, when preparing a screen used for retrieval from the recording positions of index signals on a cassette on which programs have been recorded, the operation unit 101 supplies an instruction signal to the system control unit 102. The tape starts its running in high-speed running mode from the start end, whilst the control signal processor 123 reproduces control signals and supplies the product of control pulses, which have been generated from the start end of the tape, to the system control unit 102. The system control unit 102 calculates addresses during tape running and at the same time, reads the address of the start of a first program from the data of the data memory 124. When the difference between the currently counted address and the address of the start of the first program is not more than a specified value, the running speed of the tape decreases. After the running speed has decreased, the control signal processor 123 discriminates the duty ratio of a reproduced control signal, thereby detecting an index signal to be supplied to the system control unit 102. Upon detection of the index of the start of a program, the system control unit 102 allows the system to be in "reproducing" mode. Then, the running control unit 107 reproduces a signal with its video head to supply to the switch 115. Thereafter, the signal is supplied to a reproducing circuit 105 and converted into a video signal. After passing through a switch 116, the signal is supplied to a character generating/displaying unit 125. At the character generating/displaying unit 125, no character is added to the signal. The signal is then supplied to a TV receiver 108 through a signal output terminal 126 of the system. After passing through a switch 117, the signal is supplied to a video signal memory 109. Upon receipt of the write-in signal from the system control unit 102, a memory control circuit 110 controls the video signal memory 109 to store video signal data corresponding to one screen of image at an indexed position.

Figure 30A:
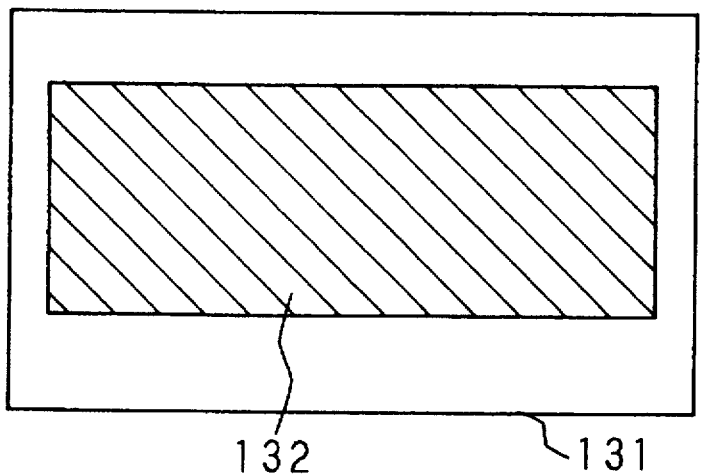
FIG. 30(a) is a diagram showing one example of a screen display.

After an image has been stored in the video signal memory 109, the system control unit 102 rewinds the tape up to its start end and sets the system in "recording" mode. Then, the data of the video signal memory 109 are read out and the data are released as a video signal to the switch 116. The image signal then passes through the character generating/displaying unit 125 and the switch 114, and is supplied to the recording circuit 122. The system control unit 102 allows the running control unit 107 to run the tape for a short time, thereby recording the image to be used for the retrieval of the first program at the start end of the tape. An index is recorded at the same time. FIG. 30(a) shows the image recorded on the tape at that time. Specifically, an image 132 at the indexed position of the first program is displayed in a TV screen frame 131. Images to be used for the retrieval of other programs are likewise recorded at the start end of the tape. Outside the image 132 is an area for flat signals which are added by reading a specified data from the video signal memory 109.

FIG. 31(a) shows the recording regions of a tape on which programs and images to be used for retrieval have been recorded with the above procedure. There is provided a region 152 for images to be used for retrieval at the start end of a magnetic tape 151. Inward from the image region 152 are a first program recording region 153 and a second program recording region 154 etc. There is an index I1 at the beginning of the control track of the first program, and three indexes J1, J2 and J3 in the middle thereof. Similarly, the control tracks of the second and later programs have indexes. FIG. 31(b) is an enlarged view of the image region 152. In the region 152, there are an image 156 to be used for the retrieval of the first program and the index I1 which follow a margin 155 positioned immediately after a leader tape 154. Then, an image 157 for the retrieval of the second program and an index I2 follow. The later programs are similarly arranged. Disposed after an image 159 for the retrieval of a 7th program and an index 17 is a recording region 160 for programs which have not been recorded.

In program retrieval, a control unit 127 controls the character generating/displaying unit 125 shown in FIG. 28, and this process is characteristic of the invention. Therefore, an example of the arrangement of the character generating/displaying unit 125 associated with the above process will be first explained, and then the control unit 127 will be explained.

Figure 32:
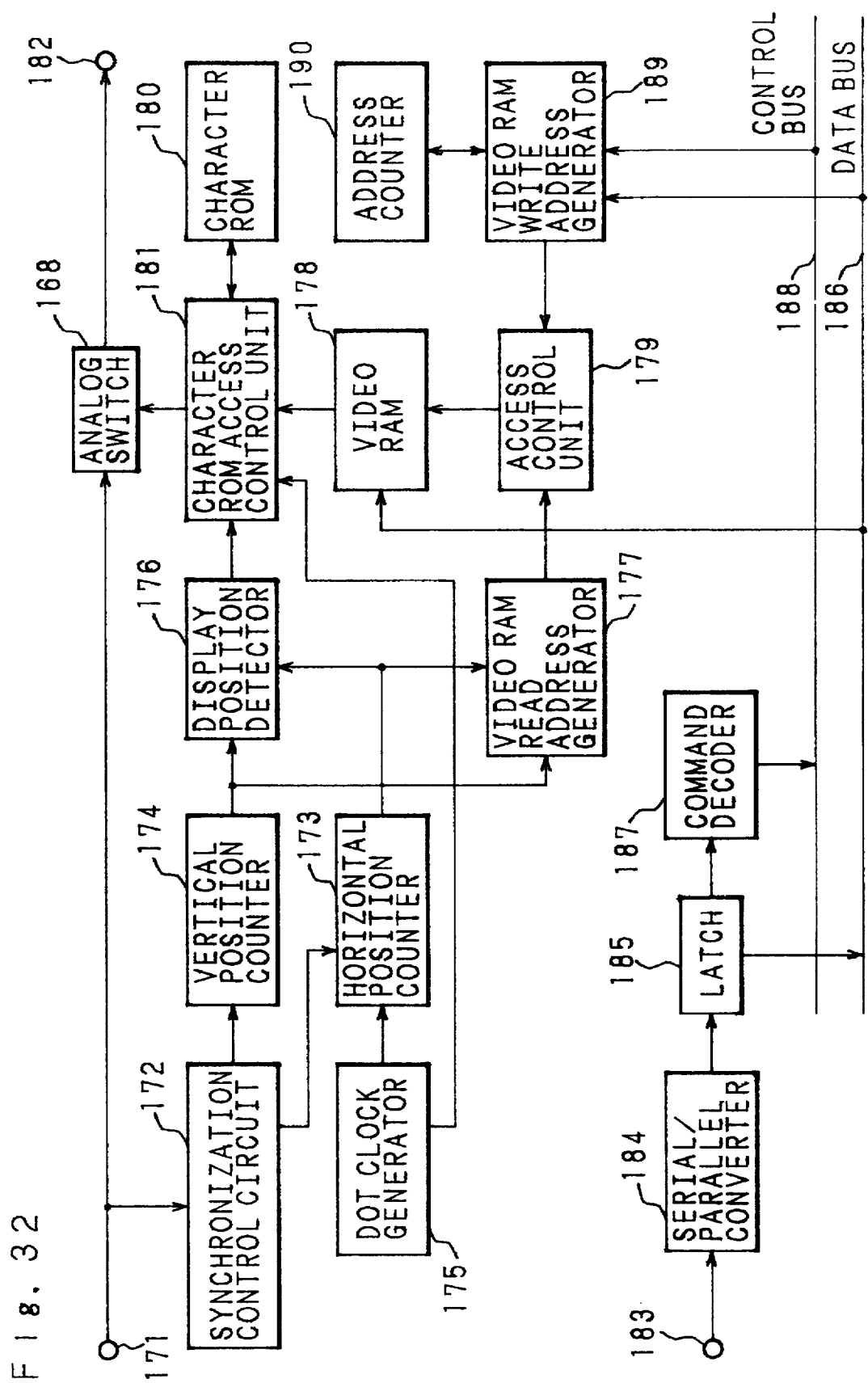
FIG. 32 is a block diagram showing the structure of the character generating and displaying unit shown in FIG. 28.

FIG. 32 shows an example of the arrangement of the character generating/displaying unit, 125. A video signal which has been entered from an input terminal 171 is supplied to a synchronization control circuit 172 and an analog switch 168. The synchronization control circuit 172 separately takes a horizontal synchronization signal and vertical synchronization signal from the video signal to supply to a horizontal position counter 173 and a vertical position counter 174. A dot clock generator 175 generates a time reference clock used for displaying a character on the screen and supplies it to the horizontal position counter 173. The horizontal position counter 173 is reset upon receipt of the horizontal synchronization signal and starts its counting operation upon receipt of the time reference clock. The count value of the horizontal position counter 173 is supplied to a display position detector 176 and a video RAM read address generator 177. The vertical position counter 174 supplies a count value corresponding to the scan line of the video signal to the display position detector 176 and the video RAM read address generator 177. The video RAM read address generator 177 generates a read address for a video RAM 178 and supplies it to an access control unit 179.

FIG. 33 shows the memory arrangement of the video RAM 178. It has storage units represented by "columns" 191 and "rows" 192. Each storage unit 193 stores a specific code for a character. The specific code of a character is specified by an address number represented by "column" 194 and "row" 195 in FIG. 34 which shows the data arrangement of a character ROM 180. For example, the character "T" is represented by "7-1" and stored in the position of the 1st column and the 9th row in the video RAM 178. Each piece of data stored in the character ROM 180 is composed of e.g. binary data of 16×16 dots. The data of the character ROM 180 includes a character 196, blank (no display) 197, selection code 198 and scale code 199 etc. The display position detector 176 is provided with the number of scan lines from the vertical position counter 174 and the horizontal position count value from the horizontal position counter 173, and specifies a read-out dot address in the respective character regions of the character ROM 180. Of data for a character at a character code address of the character ROM supplied from the video RAM 178, a character ROM access control unit 181 reads dot address data supplied from the display position detector 176 with the timing of a dot clock sent from the dot clock generator 175, and then supplies it to the analog switch 168. The analog switch 168 displays a character, by switching part of the image signal sent from the input signal 171 to a black or white level signal in accordance with the character data supplied from the character ROM access control unit, 181, and then sends it to an output terminal 182.

Setting of a character to be displayed and alternation of a character on the screen are performed upon receipt of an instruction entered from an external control means. Taking the case where one character to be displayed is set for example, serial data from the external control means are supplied to a serial/parallel converter 184 by way of a terminal 183. The converter 184 converts the serial data into parallel data to release to a latch 185. The latch 185 lumps a specified amount of data together to send to a data bus 186, and at the same time, supplies specified bit data to a command decoder 187. The command decoder 187 decodes the destination of the transfer of the data and the instruction from the external control means to release to a control bus 188. Upon receipt of a signal from the control bus 188, a video RAM write address generator 189 is provided with a video RAM address from the data bus 186, and supplies it to an address counter 190 and the access control unit 179. The address counter 190 stores the address upon receipt, of it, whilst the access control unit 179 allows the character address of the video RAM 178 to be "write-in" state. At that time, the video RAM 178 is provided with character code data from the data bus 186 and stores it at a specified address.

FIG. 35 shows part of the serial data used for setting of a character to be displayed and alternation of a character displayed on the screen. Numeral 201 represents a series of data for displaying "title" in the 1st column and the symbols "▶" and "1" in the 2nd column (see FIG. 33). Numeral 202 represents the data for displaying the symbol "▶" in the 2nd column, the 6th raw, whilst the symbol in the 2nd column, the 1st raw is deleted (see FIG. 33). The deletion of characters is executed by storing "4-4" which represents "no display" in the character data region of the video RAM. Although there are arranged 12 symbols "▶" in FIG. 33, they are alternately arranged in an actual memory and their positions are shifted with the procedure explained in connection with the data 202.

When retrieving a program, the control unit 127 controls the screen display and supplies an instruction signal to the system control unit 102 at the same time. Upon receipt of the instruction signal, the system control unit 102 controls the system. The system control unit 102 also receives a key input signal from the operation unit 101 and data from the control signal processor 123, and releases an output to the control unit 127.

Figure 30B:
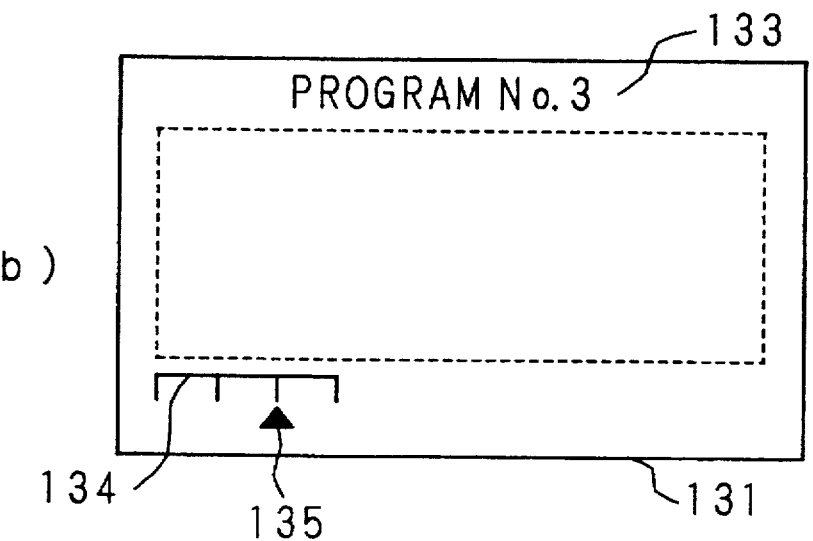
FIG. 30(b) is a diagram showing one example of a screen display.
Figure 36:
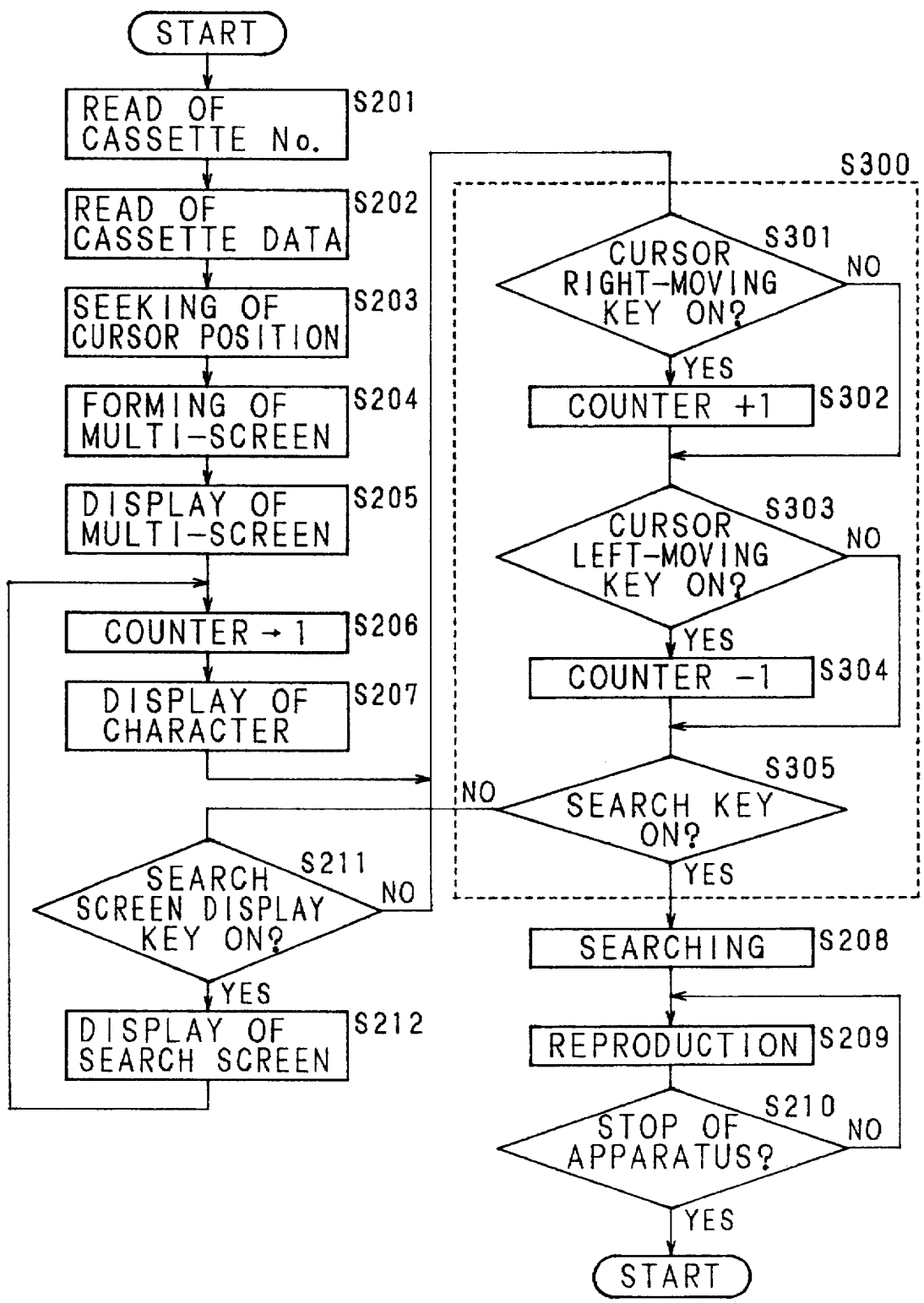
FIG. 36 is a flow chart showing a control flow of the control unit shown in FIG. 28.
Figure 37A:
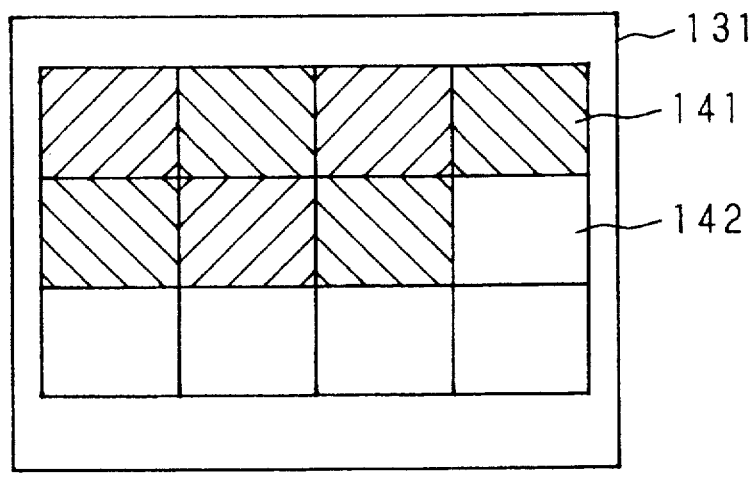
FIG. 37(a) is a diagram showing one example of a screen display.

FIG. 36 is a flowchart showing the control flow of the control unit 127 according to the embodiment. When a cassette is mounted on the system, its cassette number is read (S201). At this stage, a known method wherein the cassette number is superimposed on a control signal is taken. Based on the data of the cassette number, the control unit 127 reads data from the region for the above cassette number the data memory (S202), and a location to which the symbol "▶" (hereinafter referred to as "cursor") can be moved. FIG. 29(b) shows an example of the data of the data memory 124. In this example, the cassette number is 18, the number of programs is 7, the number of sub-indices in the 3rd program is 3. From the above data, the control unit 127 obtains a location on the screen to which the cursor can be moved (203). In FIG. 33 showing the data arrangement of the video RAM of the character generating/displaying unit 125, when the number of programs is 7, the cursor can be shifted to the following 7 locations represented by the columns and rows of the coordinates: 2-1, 2-6, 2-11, 2-16, 5-1, 5-6 and 5-11. Those coordinate values are alternately used for the display of the cursor in accordance with the value of a cursor position counter which is to be described later. The character display of FIG. 33 corresponds to the multi-screen display shown in FIG. 37(a). When the screen display is as shown in FIG. 30(a), the character display is FIG. 30(b) and the cursor can be moved to the location of which coordinate value is 12 and in column and a variable row number. The row is varied according to the number of sub-indices.

The control unit 127 releases an instruction signal to the system control unit 102 so that a multi-screen is prepared from a plurality of screens for retrieval, reproducing data from the start end of the tape (S204). Upon receipt of the instruction signal, the system control unit 102 reproduces a screen to be used For retrieval of the first program recorded in a region 156 at the start end of the tape. A reproduced signal is released from time reproducing circuit 105. After passing through the switch 116, the character generating/displaying unit 125 and time switch 117, the reproduced signal is reduced and stored in the video signal memory 109. For example, in the case of a 4th program, the data of the video signal memory 109 are stored at the address corresponding to a screen region 141 shown in FIG. 37(a). Since the 8th program is not recorded on-the tape, a screen region 142 in FIG. 37(a) and other non-hatched regions are displayed as a blue plain screen etc. After the screen to be used for retrieval of the 7th program has been reproduced and stored in the video signal memory 109, the multi-screen preparation is completed and the video signal memory 109 releases a signal. This signal is supplied to the character generating/displaying unit 125 by way of the switch 116 (S205).

Figure 37B:
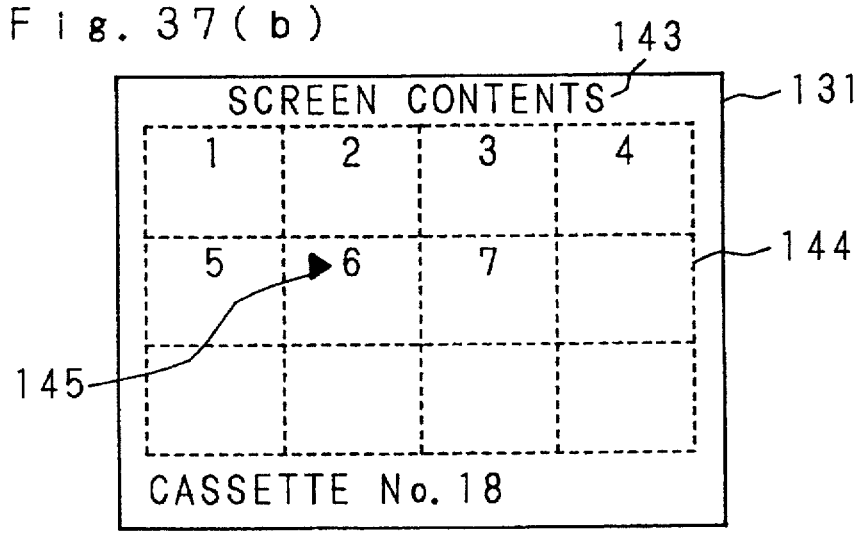
FIG. 37(b) is a diagram showing one example of a screen display.
Figure 37C:
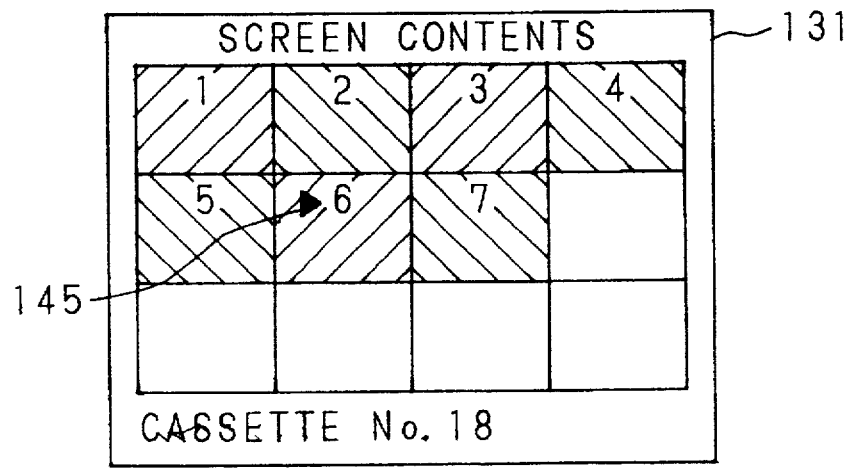
FIG. 37(c) is a diagram showing one example of a screen display.

The control unit 127 sets the value of the cursor position counter to the initial value of 1 (S206), and controls the character generating/displaying unit 125 so that the display characters shown in FIG. 37(b) are superimposed on the multi-screen which has been input. In FIG. 37(b), characters 143 are explanatory characters for the multi-screen, and a broken line 144 is an imaginary line for defining a frame of the multi-screen in which characters are superimposed. A cursor 145 is positioned at the left of "6" in FIG. 37(b), but the cursor 145 is positioned at the left of "1" when it is in the initial state. The character generating/displaying unit 125 releases a video signal the pattern of which is shown in FIG. 37(c). FIG. 37(c) is obtained by superimposing the pattern of FIG. 37(b) on the pattern of FIG. 37(a). This signal passes through an output terminal 126 and is displayed on the TV receiver 108 (S207).

Figure 38A:
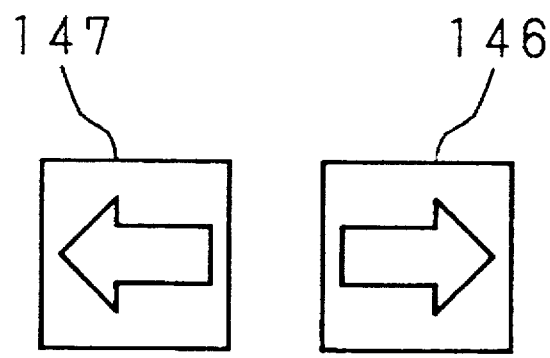
FIG. 38(a) is a diagram showing an operation button.
Figure 38B:
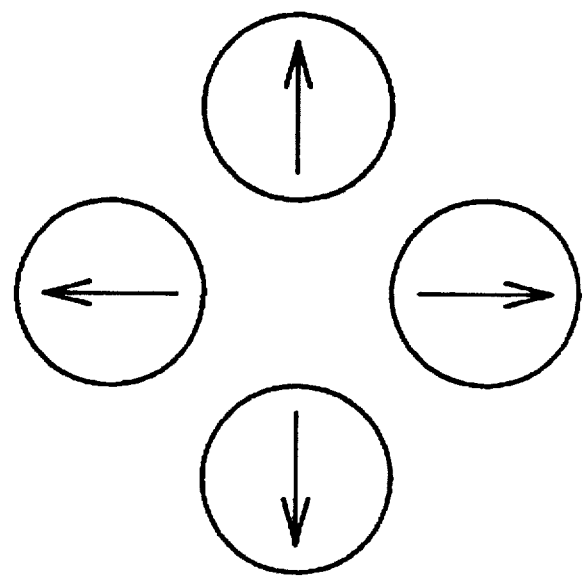
FIG. 38(b) is a diagram showing an operation button.

It can be readily understood by checking the display of the TV receiver 108 that there are 7 programs recorded on the cassette No. 18. While watching the multi-screen, the cursor is moved to a small screen which is intended to be reproduced (S300). As means for moving the cursor, various types of devices can be used. For example, right/left move keys as shown in FIG. 38(a), or up-down right/left move keys as shown in FIG. 38(b) may be used. A known receiving channel change key may be shared, or alternatively, a joy stick or mouse etc. may be used. According to the cursor moving means selected from the above devices, the flow in S300 is altered. The cursor moving means is disposed at the operation unit 101 or a remote control unit (not shown). In the case of the keys shown in FIG. 38(a), it is determined whether or not a cursor right move key 146 has been depressed (S301), and if yes, the value of the cursor counter is incremented by 1 (S302). Then, it is determined whether or not a cursor left move key 147 has been depressed (S303), and if yes, the value of the cursor counter is decremented by 1 (S304).

Retrieval of a desired program is executed by moving the cursor and selecting a screen from the multi-screen. FIG. 37(c) shows a state in which the 6th program is selected. At this stage, it is determined whether or not a retrieval key has been depressed (S305), and if yes, an indexed position is retrieved (S208) and reproduced (S209). The execute key for retrieval may be a button which is not used for any other purpose, or may be a button which also serves as a reproducing button. Alternatively, the function of the execute key may be achieved by depressing the right/left move keys at the same time. After the desired program has been confirmed executing reproducing operation, it is determined whether the system should be stopped (S210), and if yes, the reproducing is suspended.

If it is judged at the determination of S305 that the retrieval key has not been depressed, and if it is judged at the determination of S211 that the screen alter key has been depressed, the screen for retrieval shown in FIG. 30(a) is displayed on one screen instead of a multi-screen (S212). FIG. 30(a) shows a display obtained by depressing a screen alter key after the 3rd program has been selected with the cursor on the screen shown in FIG. 37(c). The video signal displayed at this stage has been obtained by reproducing a screen 158 for retrieval of the 3rd program from the start end of the tape and is displayed in "temporary suspension" mode. The character generating/displaying unit 125 changes to the screen shown in FIG. 30(b), thereby showing a display indicating that the program No. is 3, a scale display 134 indicating that the number of sub-indexes is 3, and a cursor 135 for selecting the lateral position of a scale. In this figure, the cursor is positioned in the middle of the scale, but its initial value is 1 (the first sub-index) (S206). The screen shown in FIG. 30(c), on which characters are superposed on images, is displayed on the TV receiver 108 (S207).

Figure 30C:
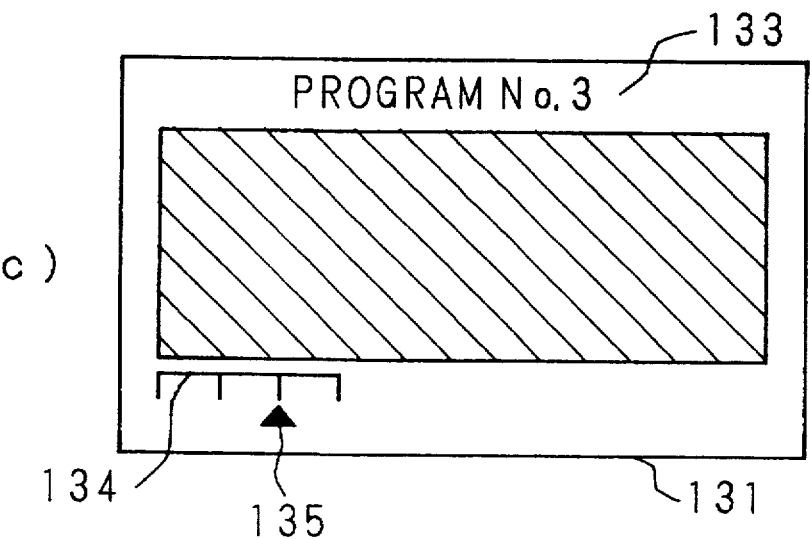
FIG. 30(c) is a diagram showing one example of a screen display.

The cursor 135 on the display of FIG. 30(c) is moved by the right/left move keys, thereby selecting a sub-index in the 3rd program (S300) and executing retrieval (S208). In this figure, there are 4 marks in the scale 134. From the left, there are the 1st mark corresponding to a program index I3, the 2nd to the 1st sub-index J1, the 3rd to the 2nd sub-index J2 and the 4th to the 3rd sub-index J3. By moving the cursor to one of the marks, a desired indexed position in the region 155 shown in FIG. 31(a) can be retrieved. When executing retrieval of a sub-index, high-speed retrieval is performed up to the first indexed position of the program, using an address, and after detection of the first indexed position, a sub-index is retrieved in the recording region of the program.

As has been described above, according to the 14th embodiment, an image at an indexed position of each program recorded on the tape is displayed as a screen to be used for retrieval, and data such as a programs No. and the number of sub-indexes are superimposed on the screen. There is provided control means for moving a selection symbol on the screen in order to select a desired program and a sub-index in the desired program, and retrieving and reproducing the selected data. The provision of the control means remarkably facilitates the basic operation of an image recording and reproducing apparatus, namely, a specified part of a specified program can be watched by easy operation with a small number of buttons.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A recording and reproducing apparatus provided with a function for recording and reproducing index signals, comprising:
   a memory storing video data;
   memory control means for thinning the video data and writing them in a part of said memory, thereby preparing a multi-screen containing a plurality of video data items;
   correlation detecting means for obtaining a correlation between images from the data stored in said memory and the data of a video signal to be recorded or reproduced; and
   control means for performing recording of an index signal and/or storing of the video signal in said memory when the correlation is not more than a specified value.

2. A recording and reproducing apparatus according to claim 1, wherein a power source is turned off after said memory control means, said correlation detecting means and said control means have been operated after completion of timer recording.

3. An apparatus for preparing a multi-screen, comprising:
   a video input,
   a video data head for writing to and reading from a tape,
   a record selecting switch selecting a signal to be recorded from a plurality of recording input signals,
   a recording circuit inputting a signal from said record selecting switch and supplying a record signal to said video data head,
   a reproducing circuit receiving a signal from said video data head and outputting reproduced video data,
   a recording/reproducing switch switching the video data head between said recording circuit and said reproducing circuit,
   a memory receiving reproduced video data from said reproducing circuit,
   a memory controller thinning video data frames in said memory and writing thinned video data frames to said memory to prepare the multi-screen,
   an image correlation circuit correlating video data from said reproducing circuit and video data already stored in said memory, and
   a control unit storing the video data from said reproducing circuit in said memory as part of the multi-screen if said correlation is not more than a predetermined value.

4. The apparatus of claim 3 wherein said recording circuit records said multi-screen on the tape.

5. The apparatus of claim 3, further comprising a display displaying images including the multi-screen, reproduced video data from said reproducing circuit, and input video signals.

6. The apparatus of claim 3 further comprising a program data memory storing data including tape number, number of programs on tape, recording time, data, channel, class, record starting address, record ending address, and character codes.

7. The apparatus of claim 6 further comprising a data multiplexer for merging data from said program data memory and an index signal and a superimposing circuit superimposing the multiplexed data onto a video signal to be recorded by said video data head.

8. The apparatus of claim 3 wherein said record selecting switch switches between data output from said reproducing circuit and an input signal.

9. The apparatus of claim 8 further comprising:
   a memory input switch switching the input of said memory between data from said record selecting switch and data from said reproducing circuit wherein the switching of the input of said memory to data from said record selecting switch results in said memory controller preparing a multi-screen from data to be recorded.

10. The apparatus of claim 3 further comprising a timer recording starting times and ending times of a program being recorded on the tape.

11. The apparatus of claim 3 further comprising timer recording means for automatically executing a preset timer recording program and shutting off a power source to said apparatus after completion of the preset timer recording program.

12. The apparatus of claim 3 further comprising:
   a selector selecting a frame of said multi-screen,
   an identifier identifying a location of a recorded program on the tape corresponding to the selected frame of said multi-screen, and
   a controller controlling a tape motor drive circuit to drive the tape to the identified location and controlling said reproducing circuit to reproduce the recorded program.

13. The apparatus of claim 3 further comprising a control unit storing an index signal on the tape if said correlation is not more than a predetermined value.

14. The apparatus of claim 3 wherein said record selecting switch switches between data from said reproducing circuit and an input signal.

15. An apparatus for preparing a multi-screen, comprising:
   a video input,
   a video data head for writing to and reading from a tape,
   a record selecting switch selecting a signal to be recorded from a plurality of recording input signals,
   a recording circuit inputting a signal from said record selecting switch and supplying a record signal to said video data head,
   a reproducing circuit receiving a signal from said video data head and outputting reproduced video data,
   a recording/reproducing switch switching the video data head between said recording circuit and said reproducing circuit,
   a memory receiving reproduced video data from said reproducing circuit,
   a memory controller thinning video data frames in said memory and writing thinned video data frames to said memory to prepare the multi-screen, and
   a controller controlling said memory to store video data from said memory input switch each time a specified time period elapses,
   wherein said specified time period is a program length of either a program to be recorded or of a recorded program.

16. The apparatus of claim 15 wherein said controller controls said recording circuit to record an index signal on the tape each time the specified time period elapses.

17. The apparatus of claim 15, further comprising
   a memory input switch switching between video data from said record selecting switch and video data from said reproducing circuit wherein the switching of the input of said memory to data from said record selecting switch results in said memory controller preparing a multi-screen from data to be recorded, wherein the specified time period is the difference between the starting time and the ending time of a program to be recorded divided by the number of small screens in said multi-screen.

18. The apparatus of claim 15 wherein the specified time period is the difference between the starting time and the ending time of a recorded program divided by the number of small screens in said multi-screen.

19. The apparatus of claim 15 wherein said control means sets the number of small screens in said multi-screen to be no less than a value which is obtained by dividing a program length by the specified time.

20. The apparatus of claim 15 wherein said recording circuit records said multi-screen on the tape.

21. The apparatus of claim 15, further comprising a display displaying images including the multi-screen, reproduced video data from said reproducing circuit, and input video signals.

22. The apparatus of claim 15 further comprising a program data memory storing data including tape number, number of programs on tape, recording time, data, channel, class, record starting address, record ending address, and character codes.

23. The apparatus of claim 22 further comprising a data multiplexer for merging data from said program data memory and an index signal and a superimposing circuit superimposing the multiplexed data onto a video signal to be recorded by said video data head.

24. The apparatus of claim 15 wherein said record selecting switch switches between data output from said reproducing circuit and an input signal.

25. The apparatus of claim 24 further comprising:

a memory input switch switching the input of said memory between data from said record selecting switch and data from said reproducing circuit wherein the switching of the input of said memory to data from said record selecting switch results in said memory controller preparing a multi-screen from data to be recorded.

26. The apparatus of claim 15 further comprising a timer recording starting times and ending times of a program being recorded on the tape.

27. The apparatus of claim 15 further comprising a timer recording means for automatically executing a preset timer recording program and shutting off a power source to said apparatus after completion of the preset timer recording program.

28. The apparatus of claim 15 further comprising:

a selector selecting a frame of said multi-screen, an identifier identifying a location of a recorded program on the tape corresponding to the selected frame of said multi-screen, and a controller controlling a tape motor drive circuit to drive the tape to the identified location and controlling said reproducing circuit to reproduce the recorded program.

29. An apparatus for preparing a multi-screen, comprising:

a video input, a video data head for writing to and reading from a tape, a record selecting switch selecting a signal to be recorded from a plurality of recording input signals, a recording circuit inputting a signal from said record selecting switch and supplying a record signal to said video data head, a reproducing circuit receiving a signal from said video data head and outputting reproduced video data, a recording/reproducing switch switching the video data head between said recording circuit and said reproducing circuit, a memory receiving reproduced video data from said reproducing circuit, a memory controller thinning video data frames in said memory and writing thinned video data frames to said memory to prepare the multi-screen, a detector detecting whether an audio mode of the video input changes, wherein said memory controller writes thinned data frames in said memory when said detector detects a change in the audio mode of the video input.

30. The apparatus of claim 29 further comprising:

wherein said recording circuit records an index signal on the tape when said detector detects a change in the audio mode of the video input.

31. The apparatus of claim 29 wherein said audio mode includes a monophonic mode, a stereo mode, and a bilingual mode.

32. The apparatus of claim 29 wherein said recording circuit records said multi-screen on the tape.

33. The apparatus of claim 29, further comprising a display displaying images including the multi-screen, reproduced video data from said reproducing circuit, and input video signals.

34. The apparatus of claim 29 further comprising a program data memory storing data including tape number, number of programs on tape, recording time, data, channel, class, record starting address, record ending address, and character codes.

35. The apparatus of claim 34 further comprising a data multiplexer for merging data from said program data memory and an index signal and a superimposing circuit superimposing the multiplexed data onto a video signal to be recorded by said video data head.

36. The apparatus of claim 29 wherein said record selecting switch switches between data output from said reproducing circuit and an input signal.

37. The apparatus of claim 36 further comprising:

a memory input switch switching the input of said memory between data from said record selecting switch and data from said reproducing circuit wherein the switching of the input of said memory to data from said record selecting switch results in said memory controller preparing a multi-screen from data to be recorded.

38. The apparatus of claim 29 further comprising a timer recording starting times and ending times of a program being recorded on the tape.

39. The apparatus of claim 29 further comprising a timer recording means for automatically executing a preset timer recording program and shutting off a power source to said apparatus after completion of the preset timer recording program.

40. The apparatus of claim 29 further comprising:

a selector selecting a frame of said multi-screen, an identifier identifying a location of a recorded program on the tape corresponding to the selected frame of said multi-screen, and a controller controlling a tape motor drive circuit to drive the tape to the identified location and controlling said reproducing circuit to reproduce the recorded program.

* * * * *